United States Patent [19]
Hoshino et al.

[11] Patent Number: 6,081,230
[45] Date of Patent: *Jun. 27, 2000

[54] NAVIGATION SYSTEM FURNISHED WITH MEANS FOR ESTIMATING ERROR OF MOUNTED SENSOR

[75] Inventors: Masatoshi Hoshino, Tsuchiura; Shigeru Oho, Hitachinaka; Yasuhiro Gunji, Hitachiota; Hiroshi Kuroda, Hitachi; Kenji Takano, Yokohama; Yoshimasa Nagashima, Miura; Mikihiko Onari, Kokubunji, all of Japan

[73] Assignees: Xanavi Informatics Corporation; Hitachi, Ltd., both of Japan

[*] Notice: This patent issued on a continued prosecution application filed under 37 CFR 1.53(d), and is subject to the twenty year patent term provisions of 35 U.S.C. 154(a)(2).

[21] Appl. No.: 08/349,172

[22] Filed: Dec. 2, 1994

[51] Int. Cl.⁷ ............................... H04B 7/185; G01S 5/02
[52] U.S. Cl. ...................................... 342/357.06; 701/214
[58] Field of Search ..................................... 342/357, 359, 342/357.06, 357.02; 364/449; 701/214, 216

[56] References Cited

U.S. PATENT DOCUMENTS

| | | |
|---|---|---|
| 4,680,715 | 7/1987 | Pawelek . |
| 4,725,843 | 2/1988 | Suzuki et al. ............................ 342/359 |
| 4,754,280 | 6/1988 | Brown et al. ............................ 342/357 |

(List continued on next page.)

FOREIGN PATENT DOCUMENTS

| | | |
|---|---|---|
| 0 061 674 A3 | 3/1982 | European Pat. Off. . |
| 0 453 726 A3 | 2/1991 | European Pat. Off. . |
| 0 496 508 A1 | 10/1992 | European Pat. Off. . |
| 60-133316 | 7/1985 | Japan . |
| 63-158408 | 7/1988 | Japan . |
| 63-302317 | 12/1988 | Japan . |
| 63-311115 | 12/1988 | Japan . |
| 1-219610 | 9/1989 | Japan . |
| 1-316607 | 12/1989 | Japan . |
| 3-188316 | 8/1991 | Japan . |
| 3-206913 | 9/1991 | Japan . |
| 3-279809 | 12/1991 | Japan . |
| 4-34310 | 2/1992 | Japan . |
| 4-121618 | 4/1992 | Japan . |
| 4-204168 | 7/1992 | Japan . |
| 4-238221 | 8/1992 | Japan . |
| 4-339213 | 11/1992 | Japan . |
| 06273509 | 9/1994 | Japan . |

OTHER PUBLICATIONS

Lapucha et al., "The Use of INS/GPS in a Highway Survey System", IEEE Plans '90 Position Location and Navigation Symposium Record, Las Vegas, Mar. 20–23, 1990, pp. 413–420.

English Abstract of JP 3–206913(A).

*Primary Examiner*—Theodore M. Blum
*Attorney, Agent, or Firm*—Pennie & Edmonds LLP

[57] ABSTRACT

A navigation system which can enhance the position determining accuracy of a mobile object without employing any high precision measuring instrument. The navigation system comprises a GPS range measuring device, an angular velocity measuring device, a velocity measuring device and an azimuth measuring device, which measure the motion of the mobile object; a GPS range error estimating device, an angular velocity error estimating device, a velocity error estimating device and an azimuth error estimating device, which estimate errors involved in the respectively corresponding measuring devices; and a position calculating device which calculates the position of the mobile object from the outputs of the error estimating devices. The error estimating devices are implemented by Kalman filters and averaging processes. The factors of the errors of the individual measuring devices are assumed, and the outputs thereof are corrected, so that the position of the mobile object can always be determined at a high accuracy without employing any high precision sensor.

9 Claims, 41 Drawing Sheets

U.S. PATENT DOCUMENTS

| | | | |
|---|---|---|---|
| 4,841,303 | 6/1989 | Anderson | 342/359 |
| 5,109,346 | 4/1992 | Wertz | 364/459 |
| 5,235,514 | 8/1993 | Matsuzaki | 364/454 |
| 5,281,901 | 1/1994 | Yardley et al. | 318/587 |
| 5,331,558 | 7/1994 | Hossfield et al. | 364/424.01 |
| 5,331,562 | 7/1994 | McGuffin | 364/449 |
| 5,343,209 | 8/1994 | Sennott et al. | 342/357 |
| 5,471,219 | 11/1995 | Rodeffer et al. | 342/359 |

FIG.35

$$\begin{bmatrix} X(k+1) \\ Y(k+1) \\ Z(k+1) \\ Vx(k+1) \\ Vy(k+1) \\ Vz(k+1) \end{bmatrix} = \begin{bmatrix} 1 & 0 & 0 & T & 0 & 0 \\ 0 & 1 & 0 & 0 & T & 0 \\ 0 & 0 & 1 & 0 & 0 & T \\ 0 & 0 & 0 & 1 & 0 & 0 \\ 0 & 0 & 0 & 0 & 1 & 0 \\ 0 & 0 & 0 & 0 & 0 & 1 \end{bmatrix} \begin{bmatrix} X(k) \\ Y(k) \\ Z(k) \\ Vx(k) \\ Vy(k) \\ Vz(k) \end{bmatrix} + \begin{bmatrix} Ax(k)T^2/2 \\ Ay(k)T^2/2 \\ 0 \\ Ax(k)T \\ Ay(k)T \\ 0 \end{bmatrix} + \begin{bmatrix} Nx(k) \\ Ny(k) \\ Nz(k) \\ Nvx(k) \\ Nvy(k) \\ Nvz(k) \end{bmatrix}$$

X(k), Y(k), Z(k) : THREE-DIMENSIONAL COORDINATES OF CAR POSITION
Vx(k), Vy(k), Vz(k) : THREE-DIMENSIONAL COORDINATES OF CAR VELOCITY
T : SAMPLING INTERVAL
Nx(k), Ny(k), Nz(k) : MODELED ERROR COMPONENTS OF POSITIONAL CHANGE
Nvx(k), Nvy(k), Nvz(k) : MODELED ERROR COMPONENTS OF VELOCITY CHANGE
Ax(k), Ay(k) : ACCELERATION COMPONENTS OF CAR

FIG.36

$$Ax(k) = \frac{d(k)\cos\theta g(k) - d(k-1)\cos\theta g(k-1)}{T}$$

d(k) : OUTPUT OF CAR VELOCITY SENSOR
$\theta$ g(k) : GYRO AZIMUTH OUTPUT

FIG.37

$$Ay(k) = \frac{d(k)\sin\theta g(k) - d(k-1)\sin\theta g(k-1)}{T}$$

FIG.38

$$Bc(k+1) = Bc(k) + Dc(k)T + Nbc(k)$$

FIG.39

$$Dc(k+1) = (1 - \frac{1}{Tc})Dc(k) + Ndc(k)$$

Bc(k) : CLOCK BIAS OF GPS RECEIVER
Dc(k) : CLOCK DRIFT OF GPS RECEIVER
Tc : TIME CONSTANT OF CLOCK DRIFT
Nbc(k), Ndc(k) : MODELED ERROR

FIG.40

$$\rho i(k) = \sqrt{(X(k)-Xsi(k))^2 + (Y(k)-Ysi(k))^2 + (Z(k)-Zsi(k))^2} + c\, Bc(k) + Npi(k)$$

$$(i=1, 2, \cdots)$$

FIG.41

$$\Delta \rho i(k) = \frac{\rho x(k) + \rho y(k) + \rho z(k)}{\sqrt{(X(k)-Xsi(k)) + (Y(k)-Ysi(k)) + (Z(k)-Zsi(k))}} + c\, Dc(k) + NDri(k)$$

$$(i=1, 2, \cdots)$$

$$\rho x(k) = (X(k) - Xsi(k))(Vx(k) - Vxsi(k))$$

$$\rho y(k) = (Y(k) - Ysi(k))(Vy(k) - Vysi(k))$$

$$\rho z(k) = (Z(k) - Zsi(k))(Vz(k) - Vzsi(k))$$

$\rho$ i(k) : RANGE TRANSMITTED FROM GPS SATELLITE $\Delta \rho$ (k) : RANGE RATE TRANSMITTED FROM GPS SATELLITE Xsi(k), Ysi(k), Zsi(k) : COMPONENTS OF POSITION OF iTH GPS SATELLITE
(AFTER TRANSFORMATION INTO GROUND COORDINATE SYSTEM)

Vxsi(k), Vysi(k), Vzsi(k) : COMPONENTS OF CHANGE RATE OF POSITION OF iTH
GPS SATELLITE
(AFTER TRANSFORMATION INTO GROUND COORDINATE SYSTEM)

c : VELOCITY OF LIGHT

N$\rho$i(k), N$\Delta \rho$i(k) : VALUES OF MEASUREMENT NOISE OF RANGE AND RANGE
RATE OF iTH GPS SATELLITE

FIG.42

$Bg(k+1) = Bg(k) + Nbg(k)$ $Bg(k)$ : GYRO BIAS
$Nbg(k)$ : MODELED ERROR

FIG.43

$\theta g(k) = \tan^{-1} \dfrac{Vy(k)}{Vx(k)} + Bg(k)S + N\theta g(k)$ $\theta g(k)$ : GYRO AZIMUTH (INTEGRATED VALUE OF ACCELERATION OUTPUT)
S : TIME PERIOD FOR INTEGRATING $\theta g$
$N\theta g(k)$ : MEASUREMENT NOISE

FIG.44

$Sod(k+1) = Sod(k) + Nsod(k)$

FIG.45

$Bod(k+1) = Bod(k) + Nbod(k)$ $Sod(k)$ : SCALE FACTOR ERROR OF CAR VELOCITY SENSOR
$Bod(k)$ : BIAS OF CAR VELOCITY SENSOR
$Nsod(k), Nbod(k)$ : MODELED ERRORS

FIG.46

$d(k) = (1 + Sod(k))\sqrt{Vx^2 + Vy^2} + Bod(k) + Nd(k)$ $d(k)$ : OUTPUT OF CAR VELOCITY SENSOR
$Nd(k)$ : MEASUREMENT NOISE

FIG.47

$$Mx(k+1) = Mx(k) + Nmx(k)$$

FIG.48

$$My(k+1) = My(k) + Nmy(k)$$

FIG.49

$$Rx(k+1) = Rx(k) + Nrx(k)$$

FIG.50

$$Ry(k+1) = Ry(k) + Nry(k)$$

$Mx(k)$ : MAGNETIZATION COMPONENT (x-AXIS)
$My(k)$ : MAGNETIZATION COMPONENT (y-AXIS)
$Rx(k)$ : CAR BODY EFFECT (x-AXIS)
$Ry(k)$ : CAR BODY EFFECT (y-AXIS)
$Nmx(k), Nmy(k), Nrx(k), Nry(k)$ : MODELED ERRORS

FIG.51

$$Ex(k) = M(1+Rx(k)) \cos \tan^{-1} \frac{Vy(k)}{Vx(k)} + Mx(k) + Nex(k)$$

FIG.52

$$Ey(k) = M(1+Ry(k)) \sin \tan^{-1} \frac{Vy(k)}{Vx(k)} + My(k) + Ney(k)$$

$Ex(k)$ : x-AXIAL OUTPUT OF GEOMAGNETISM SENSOR
$Ey(k)$ : y-AXIAL OUTPUT OF GEOMAGNETISM SENSOR
$M$ : GEOMAGNETISM GAIN
$Net(k), Ney(k)$ : VALUES OF MEASUREMENT NOISE

$x(k+1) = Fx(k) + u(k) + v(k)$ $$F = \begin{bmatrix} F_1 & 0 & 0 & 0 & 0 \\ 0 & F_2 & 0 & 0 & 0 \\ 0 & 0 & E^{2\times 2} & 0 & 0 \\ 0 & 0 & 0 & 0 & 0 \\ 0 & 0 & 0 & 1 & 0 \\ 0 & 0 & 0 & 0 & E^{4\times 4} \end{bmatrix}$$

$E^{n \times n}$ : UNIT MATRIX OF n×n $$F_1 = \begin{bmatrix} 1 & 0 & 0 & T & 0 & 0 \\ 0 & 1 & 0 & 0 & T & 0 \\ 0 & 0 & 1 & 0 & 0 & T \\ 0 & 0 & 0 & 1 & 0 & 0 \\ 0 & 0 & 0 & 0 & 1 & 0 \\ 0 & 0 & 0 & 0 & 0 & 1 \end{bmatrix}$$

$$F_2 = \begin{bmatrix} 1 & T \\ 0 & 1 - \dfrac{1}{T_c} \end{bmatrix}$$

$u = [\ A_xT^2/2\ \ A_yT^2/2\ \ 0\ \ A_xT\ \ A_yT\ \ 0\ :\ 0\ ]^T$ $v = [\ N_x\ N_y\ N_z\ N_{vx}\ N_{vy}\ N_{vz}\ N_{bc}\ N_{dc}\ N_{sod}\ N_{bod}\ N_{bg}\ N_{mx}\ N_{my}\ N_{rx}\ N_{ry}\ ]^T$

$$y = [\ \rho_1\ \cdots\ \rho_n\ \Delta\rho_1\ \cdots\ \Delta\rho_n\ d\ \theta_g\ E_x\ E_y\ ]^T$$

FIG.57

$$w = [\ N_{\rho_1}\ \cdots\ N_{\rho_n}\ N_{\Delta\rho_1}\ \cdots\ N_{\Delta\rho_n}\ N_d\ N_{\theta_g}\ N_{ex}\ N_{ey}\ ]^T$$

FIG.58

$$x(0|-1) = x_0,\quad P(0|-1) = P(0)$$

$x_d = [\ \theta\quad Bg\quad Mx\quad My\quad Rx\quad Ry\ ]^T$ $x_d$ = STATE VARIABLE OF AZIMUTH DETECTING KALMAN FILTER
$\theta$ = TRAVELING AZIMUTH

FIG.65

$x_p = [\ X\quad Y\quad Z\quad Vx\quad Vy\quad Vz\quad Bc\quad Dc\quad Sod\quad Bod\ ]^T$ $x_p$ = STATE VARIABLE OF POSITION DETECTING KALMAN FILTER

$x_p(k+1) = F_p x_p(k) + v_p(k)$ $$F_d = \begin{bmatrix} F_3 & 0 \\ 0 & E^{4 \times 4} \end{bmatrix} \quad F_3 = \begin{bmatrix} 1 & T \\ 0 & 1 \end{bmatrix}$$

$$F_p = \begin{bmatrix} F_1 & 0 & 0 \\ 0 & F_2 & 0 \\ 0 & 0 & E^{2 \times 2} \end{bmatrix}$$

$u_d = [\ \omega T\quad 0\quad 0\quad 0\quad 0\ ]^T$ $\omega$ : ANGULAR VELOCITY OUTPUT OF GYRO
T : SAMPLING INTERVAL
$v_d, v_p$ : MODELED ERRORS OF RESPECTIVELY CORRESPONDING STATE VARIABLES

FIG.68

$y_d = [\ E_x\ \ E_y\ \ \theta_g\ ]^T$ $y_d$ = OBSERVED VARIABLE OF AZIMUTH DETECTING KALMAN FILTER

FIG.69

$y_p = [\ \rho_1\ \cdots\ \rho_n\ \ \Delta\rho_1\ \cdots\ \Delta\rho_1\ \ d\ \ \theta\ ]^T$ $y_p$ = OBSERVED VARIABLE OF POSITION DETECTING KALMAN FILTER

FIG.70

$E_x(k) = M(1+R_x(k)) \cos\theta(k) + M_x(k) + N_{ex}(k)$

FIG.71

$E_y(k) = M(1+R_y(k)) \sin\theta(k) + M_y(k) + N_{ey}(k)$

FIG.72

$\theta_g(k) = \theta(k) + B_g(k)S + N\theta_g(k)$

FIG.73

$\theta(k) = \tan^{-1}\dfrac{V_y(k)}{V_x(k)} + N\theta(k)$ $\theta(k)$ : TRAVELING AZIMUTH ESTIMATED BY AZIMUTH DETECTING KALMAN FILTER $N\theta(k)$ : ESTIMATION ERROR OF $\theta(k)$

FIG.74

$y_p = [\ X_{gps}\ \ Y_{gps}\ \ Z_{gps}\ \ V_{xgps}\ \ V_{ygps}\ \ V_{zgps}\ \ d\ \ \theta\ \ ]^T$ Xgps, Ygps, Zgps : COMPONENTS OF POSITION BASED ON GPS SINGLE-POINT LOCATION Vxgps, Vygps, Vzgps : COMPONENTS OF VELOCITY BASED ON GPS SINGLE-POINT LOCATION

FIG.75

$D = d(k) - \sqrt{V_{xgps}(k)^2 + V_{ygps}(k)^2}$

FIG.76

$\sum_{k=1}^{n} d(k) = (1+Sod(k)) \sum_{k=1}^{n} \sqrt{V_{xgps}(k)^2 + V_{ygps}(k)^2} + n\ Bod(k)$

FIG.77

$\sum_{k=n+1}^{2n} d(k) = (1+Sod(k)) \sum_{k=n+1}^{2n} \sqrt{V_{xgps}(k)^2 + V_{ygps}(k)^2} + n\ Bod(k)$

FIG.78

$M = \sqrt{(Ex(k) - Mx(k))^2 + (Ey(k) - My(k))^2}$

FIG.79

$\sum_{k=1}^{n} Ex(k) = M(1+Rx(k)) \sum_{k=1}^{n} \cos \tan^{-1} \frac{V_{ygps}(k)}{V_{xgps}(k)} + n\ Mx(k)$

FIG.80

$$\sum_{k=n+1}^{2n} Ex(k) = M(1+Rx(k)) \sum_{k=n+1}^{2n} \cos \tan^{-1} \frac{Vygps(k)}{Vxgps(k)} + n\, Mx(k)$$

FIG.81

$$\theta 1 = \tan^{-1} \frac{y}{x}$$

FIG.82

$$\theta 2 = \tan^{-1} \frac{z}{\sqrt{x^2+y^2}}$$

$\theta 1$ : HORIZONTAL AZIMUTH
$\theta 2$ : ELEVATION ANGLE

FIG.83

$$\theta\, gps(k) = \tan^{-1} \frac{Vygps(k)}{Vxgps(k)}$$

$\theta\, gps(k)$ : TRAVELING AZIMUTH BASED ON GPS

FIG.84

$$X = [\ X\ \ Y\ \ Z\ \ Vx\ \ Vy\ \ Vz\ \ Bc\ \ Dc\ \ Sod\ \ Bod\ \ Bg\ ]^T$$

FIG.85

$$y = [\ \rho_1\ \cdots\ \rho_n\ \ \Delta\rho_1\ \cdots\ \Delta\rho_n\ \ d\ \ \theta g\ \ \theta gps\ ]^T$$

$$F = \begin{bmatrix} F_3 & 0 \\ 0 & E^{4 \times 4} \end{bmatrix} \quad F_3 = \begin{bmatrix} 1 & T \\ 0 & 1 \end{bmatrix}$$

$$u = [\ \omega T\ \ 0\ \ 0\ \ 0\ \ 0\ ]^T$$

$\omega$ : ANGULAR VELOCITY OUTPUT OF GYRO
T : SAMPLING INTERVAL
v : MODELED ERRORS OF RESPECTIVELY CORRESPONDING
    STATE VARIABLES

FIG.87

$$y = [\ Ex\ \ Ey\ \ \theta g\ ]^T$$

FIG.88

$$w = [\ Nex\ \ Ney\ \ N\theta g\ ]^T$$

FIG.89

$$\Delta r = \sqrt{Rx(k)^2 + Ry(k)^2} - \sqrt{(Ex(k) - Mx(k))^2 + (Ey(k) - My(k))^2}$$

FIG.90

$$\Delta r = 30 - \sqrt{(Ex(k) - Mx(k))^2 + (Ey(k) - My(k))^2}$$

NAVIGATION SYSTEM FURNISHED WITH MEANS FOR ESTIMATING ERROR OF MOUNTED SENSOR

BACKGROUND OF THE INVENTION

1. Field of the Invention

The present invention relates to a navigation system which is installed in a mobile object so as to detect at least one of the position and the traveling azimuth thereof.

2. Description of the Related Art

Known navigation systems for mobile objects include a radio navigation system wherein the position of the mobile object is directly determined using a radio wave signal sent from, e. g., a GPS (GLOBAL POSITIONING SYSTEM) satellite or a radio beacon, and an inertial navigation system wherein the traveling azimuth and movement distance of the mobile object are measured so as to find the position thereof on the basis of the measured values. There has also been known a navigation system wherein both the radio navigation system and the inertial navigation system are combined, and wherein they are changed-over depending upon circumstances. A navigation system which is endowed with the function of receiving a signal from a geostationary satellite, in addition to the signal from the GPS satellite revolving round the earth, has also been studied in order to enhance the performance of navigation.

The radio navigation system equipped with a GPS receiver which the radio wave signal from the GPS satellite (hereinbelow, this signal shall be called the "GPS signal") so as to obtain an absolute position of the mobile object. The GPS receiver detects a range (a pseudo range), a range rate (the change rate of the pseudo range) and information on the GPS satellite itself by receiving the GPS signal. Further, when the GPS receiver is capable of receiving GPS signals from four or more GPS satellites, it can calculate the absolute position of the mobile object uniquely on the basis of the received signals.

In the system having the radio navigation system and the inertial navigation system in combination, the absolute position obtained as stated above is commonly utilized for correcting the measurement error of the inertial navigation system. In an urban district, etc., however, the signals from the four GPS satellites are often unreceivable due to topography, buildings, etc. It is accordingly difficult to obtain the absolute position at all times.

An example of the inertial navigation system in the prior art includes a gyro sensor and a geomagnetism sensor employed as an azimuth sensor; and output values from both the sensors are passed through a filter, whereby an azimuth of high accuracy is obtained (Official Gazette of Japanese Patent Applications Laid-open No. 219610/1989 and No. 188316/1991).

In the example disclosed in the official gazette of Japanese Patent Application Laid-open No. 219610/1989, the filter is utilized for increasing the proportion of use of the gyro sensor when the precision of the gyro sensor is high, and for increasing the proportion of use of the geomagnetism sensor when the precision of the geomagnetism sensor is high. The proportions at which the individual sensors are used, are determined from the empirical statistical distributions of the errors of the respective sensors. On the other hand, in the example disclosed in the official gazette of Japanese Patent Application Laid-open No. 188316/1991, the filter employed is a Kalman filter, and a covariance matrix of error (noise) components of individual sensors are computed from measured values of the respective sensors, whereupon the property variations of the noise components of the respective sensors are considered.

Besides, in a case where signal from geostationary satellite is directly received by an antenna attached to a mobile object, it is important to control the attitude of the antenna normally toward the geostationary satellite in accordance with the turning of the mobile object. In this regard, a prior-art example is a navigation system as disclosed in the official gazette of Japanese Patent Application Laid-open No. 204168/1992, in which a turning angle sensor for detecting the azimuthal change of the mobile object is mounted and which has the antenna attitude control function of directing the antenna toward the geostationary satellite by the use of the turning angle sensor.

The prior-art examples, however, need to heighten the sensor precisions or to install a plurality of sensors for the purpose of enhancing the accuracy of the positioning (i. e., the determination of the position) of the mobile object, resulting in an increase of the cost of the navigation system.

In view of the above drawback, the present invention is intended to provide a navigation system which can efficiently enhance the positioning accuracy without employing any sensor of high precision. Concretely, it is intended to deal with the following five issues:

The first issue pertains to a navigation system equipped with a GPS receiver for receiving signals from GPS satellites.

In such a navigation system, when the signals from the four GPS satellites are receivable, pseudo ranges from the respective satellites to the GPS receiver and the change rates thereof ("ranges" and "range rates") are measured, and the absolute position of the GPS receiver, namely, the absolute position of a mobile object carrying the navigation system thereon, can be uniquely obtained from the ranges as well as the range rates and the positional information items of the respective satellites transmitted from these satellites.

However, where such a navigation system is installed in the mobile object which moves on the ground, the signal from the GPS satellite is interrupted by mountains or buildings in a mountainous district or an urban district. This leads to the problem that, although the ranges and the range rates concerning at most three of the GPS satellites can be measured, the signals from the four GPS satellites cannot be simultaneously received, so that position detection often becomes impossible.

The second issue pertains to a navigation system in which a plurality of sensors such as a GPS receiver, a gyro sensor, a car velocity sensor and a geomagnetism sensor are used.

Such a navigation system equipped with the plurality of sensors has the problem that errors involved in the respective sensors cause degradation in the accuracy of the system. As another problem, notwithstanding that the outputs of the sensors sometimes contain information items which are duplicated with respect to each other, such information items are not always utilized.

The third issue pertains to an azimuth sensor normally included in a navigation system.

Usually, the azimuth sensor consists of a gyro sensor and a geomagnetism sensor. Since the gyro sensor is an angular velocity sensor, the output signal thereof must be integrated in order to find an azimuth. Therefore, when a bias error involved in the measured value of the gyro sensor exists and increases with time, a large azimuthal error results.

On the other hand, in a geomagnetism sensor, errors develop due to an offset magnetization effect and the $\mu$ (mu)

effect when that constituent member of a mobile object to which this sensor is attached is made of a magnetic material. Herein, the "offset magnetization effect" is the phenomenon in which the constituent member is magnetized. The "$\mu$ effect" is the phenomenon that, when the shape of the constituent member of the magnetic material surrounding the geomagnetism sensor is asymmetric, the error is caused in the geomagnetism sensor by the asymmetry. The factors of these errors are not considered in the prior-art techniques mentioned above (Official Gazettes of Japanese Patent Applications Laid-open No. 219610/1989 and No. 188316/1991). The prior art therefore has the problem that, when both the errors are large, a satisfactory accuracy is not attained in the measurement of the azimuth.

The fourth issue pertains to the attitude control of a signal receiving antenna which is employed in a radio navigation system or the like.

By way of example, a signal required for positioning based on the radio navigation is normally received at a high sensitivity by controlling the attitude of the antenna, so that the performance of the navigation can be enhanced. Heretofore, the azimuthal change of a mobile object itself has been detected independently of navigation processing, and it has been utilized for the attitude control. It is obvious, however, that the attitude control of the antenna can be similarly carried out by utilizing the azimuth or position of the mobile object obtained by the navigation processing, and the position of a satellite which sends the signal to-be-received and whose position is known beforehand. Nevertheless, these information items are not utilized, which incurs the problem that redundant parts are present in the architecture of the system.

The fifth issue pertains to an azimuth sensor included in a navigation system, likewise to the third issue stated above. In particular, it pertains to error characteristics peculiar to a geomagnetism sensor and a gyro sensor which constitute the azimuth sensor.

The geomagnetism sensor generates noise for a short term in an environment of disturbed magnetic-field which is affected by a high-voltage cable, a building, etc., but it produces comparatively correct azimuths over a long term. In contrast, the gyro sensor is not susceptible to a magnetic-field environment at all and produces correct relative azimuthal changes for a short term, but it cumulates azimuthal errors with the lapse of time due to a drift (fluctuation in an angular velocity bias) over a long term.

With the intention of solving such a drawback, by way of example, a method wherein sensor signals are subjected to a filtering process is employed in the example disclosed in the official gazette of Japanese Patent Application Laid-open No. 219610/1989. More specifically, the situation of the magnetic-field environment is detected from the difference between the amounts of azimuthal changes of the geomagnetism sensor and the gyro sensor every unit time, and the value of a filter gain is regulated in accordance with the detected situation in order to bring a filter output nearer to an azimuth detected by the geomagnetism sensor (hereinbelow, this azimuth shall be called the "geomagnetic azimuth").

A similar method is taught by the example disclosed in the official gazette of Japanese Patent Application Laid-open No. 188316/1991 wherein a Kalman filter process is introduced for calculating the filter gain. In this prior-art technique, the noise components of the geomagnetism sensor and the gyro sensor are determined from, for example, the variance values of the azimuthal data of the respective sensors in the straight traveling mode of a mobile object. Thereafter, the filter gain which is weighted with respect to an azimuth determined by the sensor of less noise is calculated on the basis of the values of the noise components in accordance with a Kalman filter algorithm.

Qualitatively, both these prior-art techniques adopt a method wherein, on the basis of the characteristics of the respective constituent sensors of the azimuth sensor, the gyro sensor is weighted for the short term, and the geomagnetism sensor is gradually weighted more over the long term. Additionally, the former technique determines the rate of convergence on the geomagnetic azimuth (the filter gain) from the difference between the amounts of the azimuthal changes of both the sensors, while the latter technique determines it from the variance values of the data of both the sensors in the straight traveling mode. That is, the rate at which the filter output is converged on the geomagnetic azimuth is determined from only the output data of the geomagnetism sensor and the gyro sensor.

In the navigation system, however, the rate of convergence on the geomagnetic azimuth is closely relevant to car velocity data. More specifically, in the case where the convergence on the geomagnetic azimuth in a navigation system in which a traveling position is calculated on occasion from an estimated azimuth and a traveling distance obtained by integrating a car velocity, the convergence with respect to the traveling distance ought to be considered, not the convergence with respect to the lapse of time. As the car velocity is higher, thus further increasing the traveling distance, an accurate traveling azimuth is required more quickly.

In this regard, the prior-art examples have the problem that, as an extreme example, even in both a case where the vehicle as the mobile object is at a standstill, that is, where an azimuthal error does not lead to a positional error, and a case where the vehicle is traveling at a high velocity, that is, where even a slight azimuthal error leads to a large positional error, the rate of the convergence on the geomagnetic azimuth is kept identical as long as the noise characteristics of the geomagnetism sensor and the gyro sensor remain unchanged.

Moreover, in the former prior-art example explained above, the method of calculating the filter gain from the difference between the amounts of the azimuthal changes of both the sensors is not a precise method, and the occurrence of an azimuthal error attributable to this fact is inevitable.

On the other hand, in the latter prior-art example, the Kalman filter algorithm is adopted as a reasonable frame for determining the filter gain. A chance for altering the filter gain, however, is limited only to an occasion where the statistical process has been permitted by collecting the data in the straight traveling mode. That is, the filter gain is determined at a very low frequency and it can not really be called a "real-time value". Conversely, the use of an inappropriate filter gain is continued until an appropriate filter gain has been determined owing to the permitted statistical process. This incurs the problem that the position detecting precision of the navigation system worsens.

Another problem lies in the method of the statistical process for estimating the sensor noise. Some components of the sensor noise are peculiar to the respective sensors. By way of example, offset magnetization noise is involved in the geomagnetism sensor, and it can develop into a large offset error in the sensor output in a moment. In the case of the gyro sensor, unidirectional azimuthal errors cumulate gradually.

Further, in either of the prior-art examples, the corresponding one of these noise components is not modeled at all. In the prior art, the very azimuthal data items delivered from the sensor are statistically processed to calculate the variance values, from which the filter gain is obtained. With this method, in the case where the noise peculiar to each sensor as stated above has occurred, it cannot be properly dealt with. As a result, it might even be the cause of developing a large azimuthal error.

In the above, the drawbacks of the prior-art examples in the filter processes applied to the estimation of the azimuth have been described. The fifth issue, however, is not restricted to the azimuth estimation. It is a common issue even in a case where a certain specified physical quantity relevant to navigation processing is similarly estimated using outputs from sensors, for example, a case where the position of the mobile object is estimated.

SUMMARY OF THE INVENTION

The principal object of the present invention is to provide a navigation system which enhances a positioning accuracy without employing any sensor of high precision. Concretely, this object can be divided into the following five objects which correspond to the five issues explained above, respectively:

The first object of the present invention is to provide a navigation system in which the measurement error of a sensor mounted in the navigation system is estimated using a range signal or a range rate signal transmitted from at least one satellite, and a high positioning accuracy can be normally maintained using the estimated measurement error and a measured value.

The second object of the present invention is to provide a navigation system in which the errors of a plurality of sensors mounted in the navigation system are estimated from the measured values of the respective sensors, and a positional accuracy can be heightened using the estimated sensor errors and the measured values.

The third object of the present invention is to provide a navigation system in which errors are corrected in correspondence with the error factors of an azimuth sensor, and an azimuth can be obtained with high accuracy.

The fourth object of the present invention is to provide a navigation system in which the attitude of a signal receiving antenna attached to a mobile object carrying the navigation system thereon can be controlled by utilizing a position or an azimuth obtained through navigation processing.

The fifth object of the present invention is to provide a navigation system in which models peculiar to various sensors are made, whereby sensor noise components are evaluated properly and promptly to obtain positional information of higher accuracy.

As the first expedient of the present invention, the first object can be accomplished by a navigation system having traveling situation measurement means including at least one of turning angular velocity measurement means for measuring a turning angular velocity of a mobile object, velocity measurement means for measuring a traveling velocity of the mobile object, and azimuth measurement means for measuring a traveling azimuth of the mobile object range measurement means are further included in the traveling situation measurement means for receiving a radio wave signal which contains predetermined information and which is sent from a transmitting station, and measuring at least one of a distance from the transmitting station to the mobile object and a change rate of the distance. The system includes error estimation means for accepting the outputs from the traveling situation measurement means, and estimating an error relevant to at least one of the physical quantities measured by the traveling situation measurement means position calculation means are included in the system for accepting the output of the error estimation means, correcting a measured value of the physical quantity whose error has been estimated, and calculating a current position of the mobile object by the use of, at least, the corrected measured value.

In the first expedient according to the present invention, in the navigation system having the traveling situation measurement means including at least one of the turning angular velocity measurement means for measuring the turning angular velocity of the mobile object, the velocity measurement means for measuring the traveling velocity of the mobile object, and the azimuth measurement means for measuring the traveling azimuth of the mobile object. The range measurement means receives the radio wave signal which contains the predetermined information and which is sent from the transmitting station, thereby measuring at least one of the distance from the transmitting station to the mobile object and the change rate of the distance.

Here, the range measurement means is adapted to receive the radio wave signal from the transmitting station such as GPS satellite or transmitting earth station. In the case where the transmitting station is the GPS satellite, the number of such GPS satellites from which the radio wave signals can be received may well be three or less.

Subsequently, the error estimation means estimates the error of at least one of the physical quantities measured by the traveling situation measurement means, by the use of the outputs from the traveling situation measurement means. Lastly, in this expedient, the position calculation means corrects the measured value of the physical quantity whose error has been estimated, by the use of the estimated error, and it calculates the position of the mobile object by the use of, at least, the corrected measured value.

As the second expedient, the second object can be accomplished by a navigation system having traveling situation measurement means including at least one of position measurement means for measuring a current position of a mobile object, turning angular velocity measurement means for measuring a turning angular velocity of the mobile object, and azimuth measurement means for measuring a traveling azimuth of the mobile object. Velocity measurement means is further included in the traveling situation measurement means, for measuring a traveling velocity of the mobile object. The system further includes: error estimation means for accepting the outputs from the traveling situation measurement means, and estimating an error relevant to at least one of the physical quantities measured by the traveling situation measurement means; and position calculation means for accepting the output of the error estimation means, correcting a measured value of the physical quantity whose error has been estimated, and calculating the current position of the mobile object by the use of, at least, the corrected measured value.

The construction of the second expedient according to the present invention consists in that the traveling situation of the mobile object, including the velocity thereof, being measured without employing the range measuring function in the first expedient.

In the second expedient, in the navigation system having the traveling situation measurement means for measuring at least one of the position, turning angular velocity and azimuth of the mobile object, the velocity measurement means further included in the traveling situation measurement means measures the velocity of the mobile object. Thereafter, the error estimation means estimates the error of at least one of the physical quantities measured by the traveling situation measurement means, by the use of the outputs from the traveling situation measurement means. Lastly, the position calculation means corrects the measured value of the physical quantity whose error has been estimated, by the use of the output of the error estimation means, and it calculates the position of the mobile object by the use of, at least, the corrected measured value.

As the third expedient, the third object can be accomplished by a navigation system having, at least, turning angular velocity measurement means and azimuth measurement means for measuring a traveling azimuth of a mobile object. This system comprises turning angular velocity error estimation means for estimating an error of the turning angular velocity measurement means by the use of outputs from the turning angular velocity measurement means and the azimuth measurement means; and traveling azimuth calculation means for correcting the measured value of the turning angular velocity measurement means by the use of the output of the turning angular velocity error estimation means, and calculating the traveling azimuth of the mobile object from the corrected measured value and the output of the azimuth measurement means.

The third object can also be accomplished by a navigation system having, at least, turning angular velocity measurement means and azimuth measurement means for measuring a traveling azimuth of a mobile object. The system comprises azimuth error estimation means for estimating an error of the azimuth measurement means by the use of outputs from the turning angular velocity measurement means and the azimuth measurement means; and traveling azimuth calculation means for correcting the measured value of the azimuth measurement means by the use of the output of the azimuth error estimation means, and calculating the traveling azimuth of the mobile object from the corrected measured value and the output of the turning angular velocity measurement means.

The third expedient, consists in the present invention being applied to only the azimuth detection.

In this expedient, in the navigation system having, at least, the turning angular velocity measurement means and the azimuth measurement means, the turning angular velocity error estimation means estimates the measurement error of the turning angular velocity measurement means by the use of the outputs of the turning angular velocity measurement means and the azimuth measurement means. Alternatively, the azimuth error estimation means estimates the measurement error of the azimuth measurement means by the use of the outputs of the turning angular velocity measurement means and the azimuth measurement means. Subsequently, the traveling azimuth calculation means corrects the measured value of the turning angular velocity measurement means or the azimuth measurement means by the use of the estimated error, and it calculates the traveling azimuth of the mobile object from the corrected measured value and the output of the turning angular velocity measurement means or the azimuth measurement means.

As the fourth expedient, the fourth object can be accomplished by a navigation system wherein a current position and a traveling azimuth of a mobile object are acquired. The system of this expedient comprises a directional antenna which receives a radio wave signal from a transmitting station for sending the radio wave signal, and antenna attitude control means for controlling an attitude of the antenna so as to cancel that change in a relative positional relationship between the transmitting station and the antenna which arises with a movement of the mobile object, in accordance with the acquired position and traveling azimuth so that the antenna can always receive the radio wave signal in spite of the movement of the mobile object.

In the fourth expedient according to the present invention, in the navigation system wherein the current position and traveling azimuth of the mobile object are acquired, the antenna attitude control means calculates an azimuthal vector from the current position of the mobile object to the transmitting station such as a satellite or a transmitting earth station, by utilizing the acquired position and traveling azimuth of the mobile object, and it controls the attitude of the antenna so that the antenna can always receive the signal from the transmitting station in spite of the movement of the mobile object.

As the fifth expedient, the fifth object can be accomplished by a navigation system having a velocity sensor for detecting a velocity of a mobile object, and at least one further sensor for detecting a physical quantity other than the velocity in relation to a motion of the mobile object, wherein a current position of the mobile object is obtained by the use of the outputs from the velocity sensor and the further sensor. The system of the fifth expedient comprises filter process means for submitting the output of the at least one further sensor to a filter process endowed with predetermined filter characteristics, and calculating an estimative value of the predetermined physical quantity from the processed result; sensor error estimation means for estimating an error of the output of the at least one further sensor from at least one of an output value of the at least one further sensor and the estimative value calculated by the filter process means; and filter gain calculation means for accepting the output from the sensor error estimation means, and calculating a filter gain which serves to adjust the filter characteristics of the filter process means.

The fifth object can also be accomplished by a navigation system having a plurality of sensors for detecting a plurality of physical quantities expressive of a motion of a mobile object, respectively, wherein a current position of the mobile object is obtained by the use of the outputs from the respective sensors. This system comprises filter process means for submitting the output of at least one of the plurality of sensors to a filter process endowed with predetermined filter characteristics, and calculating an estimative value of the predetermined physical quantity from the processed result; sensor error estimation means for receiving as its input at least one of the output of the at least one sensor and the estimative value delivered as the output of the filter process means, and estimating an error of the at least one sensor; and window process means for determining window characteristics from the output of the sensor error estimation means, and excluding any abnormal value of that input of the filter process means which is supplied from the sensor having had its error estimated, in accordance with the determined window characteristics.

In the fifth expedient of the present invention, in the navigation system having the velocity sensor for detecting the velocity of the mobile object, and at least one further sensor for detecting the physical quantity other than the velocity in relation to the motion of the mobile object, wherein the current position of the mobile object is obtained by the use of the outputs from the velocity sensor and the further sensor; the filter process means submits the output of the further sensor to the filter process endowed with the predetermined filter characteristics, and it calculates the estimative value relevant to the physical quantity which expresses the motion of the mobile object and which is other than the velocity, by the use of the processed result.

Using at least either of the output of the further sensor other than the velocity sensor and the estimative value delivered from the filter process means, the sensor error estimation means can properly estimate the output error of the further sensor.

On the basis of the output of the sensor error estimation means, the filter gain calculation means calculates the filter gain which adjusts the filter characteristics of the filter process means.

Using the filter gain thus calculated, the characteristics of the filter process means are appropriately adjusted to enhance the accuracy of the estimative value which is finally output. Accordingly, when the estimative value determined in this way is utilized, the position or azimuth of the mobile object can be determined with a high accuracy.

It is also possible to employ the construction in which the filter gain calculation means is replaced with the window process means. The window process means determines the window characteristics by the use of the output of the sensor error estimation means, and it excludes any abnormal value of the output of the further sensor in accordance with the determined window characteristics.

Owing to the adoption of the window process means for excluding the abnormal value by the use of the result of the sensor error estimation as stated above, the accuracy of the estimative value which is finally output from the filter process means can be enhanced. Accordingly, when the estimative value determined in this way is utilized, the position or azimuth of the mobile object can be determined with a high accuracy.

BRIEF DESCRIPTION OF THE DRAWINGS

FIG. 35 is an equation modeling the time change of the position and velocity of the automobile.

FIGS. 36 and 37 are equations for calculating approximated values of the acceleration.

FIGS. 38 and 39 are equations modeling the clock bias.

FIGS. 40 and 41 are equations modeling the GPS range output.

FIG. 42 is an equation modeling the gyro error.

FIG. 43 is an equation modeling the gyro output.

FIGS. 44 and 45 are equations modeling the car velocity sensor error.

FIG. 46 is an equation modeling car velocity sensor output.

FIGS. 47 to 50 are equations modeling the geomagnetism sensor error.

FIGS. 51 and 52 are equations modeling geomagnetism sensor output.

FIG. 53 is an equation which define the state variables.

FIG. 54 is the state equation.

FIG. 55 is the observational equation.

FIGS. 56 and 57 are equations which define the observed variables.

FIGS. 58 to 63 are equations of the expanded Kalman filter.

FIGS. 64 and 65 are equations which define the state variables.

FIGS. 66 and 67 are the state equations.

FIGS. 68 and 69 are equations which define the observed variables.

FIGS. 70 to 72 are the observational equations.

FIG. 73 is an equation modeling the azimuthal output.

FIG. 74 is an equation which defines the observed variables.

FIG. 75 is an equation calculating D value in the step 91 in FIG. 9.

FIG. 76 is an equation modeling the car velocity sensor output of the Embodiment 3.

FIG. 77 is an equation modeling the car velocity sensor output of the Embodiment 3 at a different time from the equation shown in FIG. 76.

FIG. 78 is an equation describing the relationship between the geomagnetism sensor output and the offset magnetization.

FIG. 79 is an equation modeling the geomagnetism sensor output.

FIG. 80 is an equation modeling the geomagnetism sensor output at a different time from the equation shown in FIG. 79.

FIGS. 81 and 82 are equations calculating the horizontal azimuth and elevation angle.

FIG. 83 is an equation calculating the traveling azimuth of the car.

FIG. 84 is an equation which defines the State-variables to-be-estimated.

FIG. 85 is an equation which defines the observed variables.

FIG. 86 is the state equation.

FIG. 87 is an equation which defines the observed variables;

FIG. 88 is an equation calculating the measurement noise.

FIGS. 89 and 90 are equations for calculating the geomagnetic-azimuthal-circle radius error.

DESCRIPTION OF THE PREFERRED EMBODIMENTS

First of all, the functions of navigation systems to which the first to third expedients in the present invention are applied shall be outlined.

Figure 1:
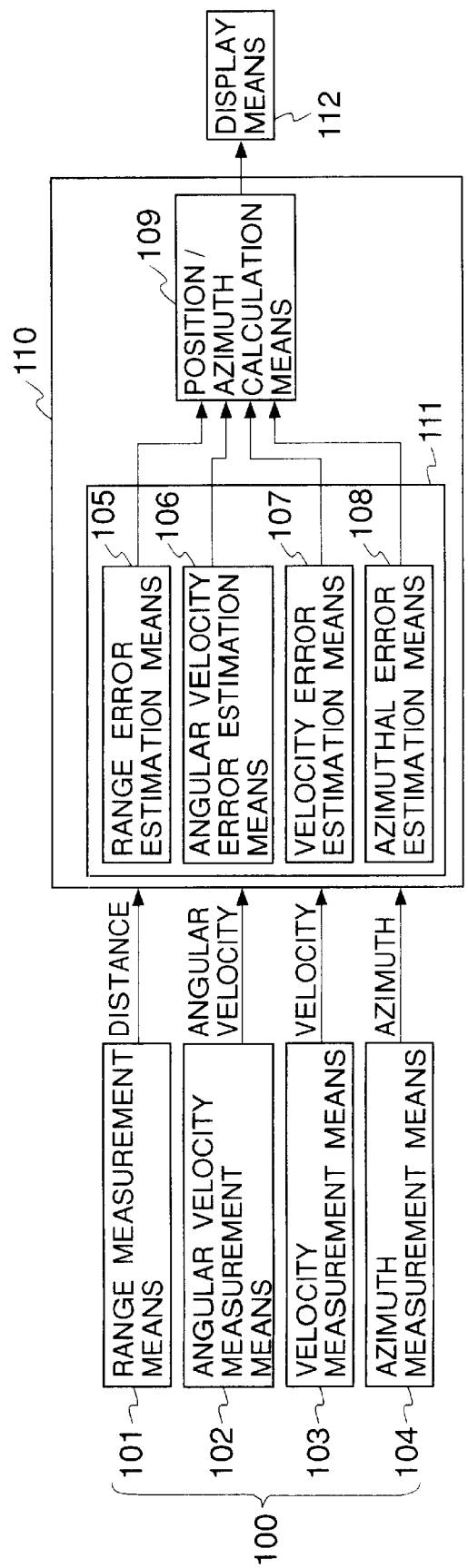
FIG. 1 is a block arrangement diagram showing one embodiment of the present invention equipped with range measurement means.

The navigation system based on the first expedient of the present invention is installed on a mobile object. As illustrated in FIG. 1, it comprises a measurement unit 100, a signal processing unit 110 for processing signals delivered from the measurement unit 100, and display means 112 for displaying results processed by the signal processing unit 110.

The measurement unit 100 includes range measurement means 101 for receiving a signal sent from at least one satellite or earth station and then measuring at least one of a pseudo range (range) and the change rate thereof (range rate), angular velocity measurement means 102 for measuring the angular velocity of the mobile object at the turn thereof, velocity measurement means 103 for measuring the moving velocity of the mobile object, and azimuth measurement means 104 for measuring the traveling azimuth of the mobile object.

The signal processing unit 110 includes an error estimation portion 111 for estimating errors involved in the output signals of the measurement unit 100, and position/azimuth calculation means 109 for calculating the position and azimuth of the mobile object on the basis of outputs from the error estimation portion 111.

The error estimation portion 111 includes range error estimation means 105 for estimating the error of the output signal of the range measurement means 101, angular velocity error estimation means 106 for estimating the error of the output signal of the angular velocity measurement means 102, velocity error estimation means 107 for estimating the error of the output signal of the velocity measurement means 103, and azimuthal error estimation means 108 for estimating the error of the output signal of the azimuth measurement means 104. The position/azimuth calculation means 109 corrects the respective errors on the basis of the output signals (hereinbelow, termed the "measured values") from the individual measurement means 101, 102, 103 and 104 and the output signals from the individual error estimation means 105, 106, 107 and 108, whereupon it calculates the position and azimuth of the mobile object on which the navigation system of this embodiment is installed.

The position of the mobile object calculated by the signal processing unit 110 is displayed by the display means 112. Besides, the positioning accuracy can be heightened more in such a way that the signal processing unit 110 is further succeeded by map matching means for performing a map matching process by utilizing the calculated position of the mobile object and other information, e. g., the azimuth already obtained, and that the processed result of the map matching means is displayed by the display means 112.

The above navigation system in accordance with the first expedient of the present invention will be detailed as Embodiment 1 later in this application.

Figure 2:
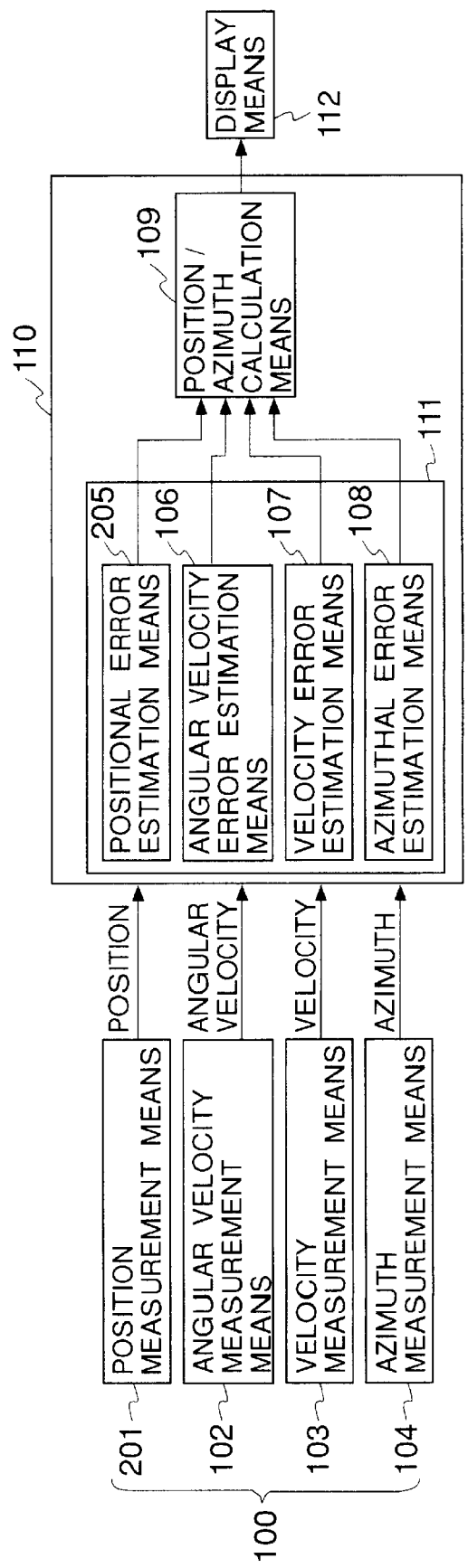
FIG. 2 is a block arrangement diagram showing one embodiment of the present invention equipped with position measurement means.

As illustrated in FIG. 2, the navigation system in accordance with the second expedient of the present invention is so constructed that, in the first expedient stated above (refer to FIG. 1), the range measurement means 101 is replaced with position measurement means 201 for directly measuring the position of the mobile object.

The position measurement means 201 receives a signal from a satellite or a ground station, and measures at least one of a pseudo range and the change rate thereof. It has a hardware construction similar to that of the range measurement means 101. Here, the difference between the position measurement means 201 and the range measurement means 101 is that the position measurement means has the additional function of calculating the position of the mobile object by receiving signals sent from four or more GPS satellites.

The above navigation system in accordance with the second expedient will be detailed as Embodiment 3 and Embodiment 5 later.

Figure 3:
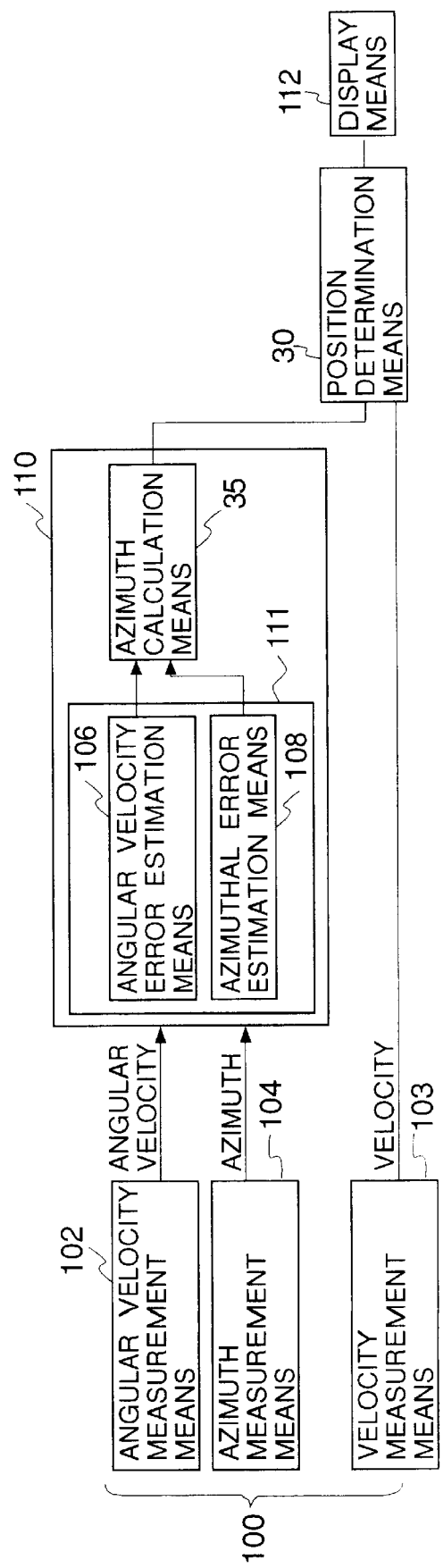
FIG. 3 is a block arrangement diagram showing one embodiment in which the present invention is applied to measure an azimuth.

The third expedient according to the present invention further enhances an azimuth determining function of the navigation system. As illustrated in FIG. 3, this navigation system is a simplified version of the navigation systems shown in FIG. 1 and FIG. 2. It comprises a measurement unit 100 for measuring an azimuth of a mobile object, a signal processing unit 110 for performing processes for the azimuth on the basis of output signals from the measurement unit 100, position determination means 30 for determining the position of the mobile object by utilizing an output signal from the signal processing unit 110 and an output single from velocity measurement means 103, and display means 112 for displaying the determined position of the mobile object.

The measurement unit 100 includes angular velocity measurement means 102 for measuring the azimuthal change of the mobile object, azimuth measurement means 104 for measuring the traveling azimuth of the mobile object, and velocity detection means 103 for detecting the moving velocity of the mobile object.

The signal processing unit 110 determines the traveling azimuth of the mobile object, and it includes an error estimation portion 111 and an azimuth calculation means 35. The error estimation portion 111 includes angular velocity error estimation means 106 for estimating the error of the output signal from the angular velocity measurement means 102, and azimuthal error estimation means 108 for estimating the error of the output signal from the azimuth measurement means 104.

In this third expedient, the position of the mobile object is determined by the position determination means 30 by using the azimuthal information delivered from the signal processing unit 110 and the velocity information delivered from the velocity measurement means 103. The mobile-object position thus determined is displayed on the display means 112.

The above navigation system in accordance with the third expedient will be described as Embodiment 2 in detail.

The measurement means usable in the first to third expedients explained above include, for example, systems or devices described below.

The range measurement means 101 utilizes a radio wave signal from a transmitting station to measure a pseudo range from the transmitting station to a mobile object carrying a receiver for receiving the radio wave signal or to measure the change rate of the pseudo range, thereby determining the pseudo range from the position of the known transmitting station to that of the mobile object. Transmitting stations utilizable for the above purpose at present include in positioning systems such as GPS (GLOBAL POSITIONING SYSTEM), GLONASS and LORAN-C (LONG RANGE NAVIGATION-C), and those which send radio beacon signals.

The GPS determines a position on the basis of signals sent from a plurality of satellites revolving around the earth, and it is utilized as a navigation system for aeroplanes, space vehicles, automobiles, etc. The GLONASS administrated and operated by the former Soviet Union, is a positioning system employing satellites similarly to the GPS. The LORAN-C is a positioning system used for ships, etc. As to the systems using radio beacon signal, the radio beacon signal is locally transmitted from a radio wave "lighthouse" installed on the ground, so as to indicate a sending position; it is accordingly known by receiving the signal that the mobile object lies near the transmitting station such as the radio wave "lighthouse" which is sending the radio beacon signal. The radio beacon signals are chiefly utilized for detecting the positions of automobiles and aeroplanes.

Referring to FIG. 2, the position measurement means 201 calculates and obtains the current position of a mobile object by receiving a radio wave signal transmitted from a transmitting station, the position of which is known. This position measurement means 201 may be a GPS receiver which is widely utilized in the GPS, or the like. The receiver of this type is employed in navigation systems for aeroplanes, space vehicles, automobiles, etc.

The angular velocity measurement means 102 measures the turning angular velocity of a mobile object, and it is equipped with a mechanical gyro sensor, an oscillatory gyro sensor, an optical-fiber gyro sensor, or the like. It is used in navigation systems for aeroplanes, space vehicles, automobiles, etc.

In a case where a pertinent mobile object is a vehicle having wheels, such as an automobile or a train, the velocity measurement means 103 is equipped with a car velocity sensor of photoelectric or electromagnetic type which produces a pulse signal corresponding to the rotational frequency of the rotating wheel. Besides, where a pertinent mobile object is an aeroplane, the velocity measurement means 103 is equipped with a sensor which measures the velocity of the mobile object by utilizing the variation of an air pressure acting on the mobile object.

The azimuth measurement means 104 is equipped with a geomagnetism sensor for detecting a geomagnetic field (geomagnetism) so as to find an absolute azimuth, as the most representative construction thereof. Alternatively, it may well have a construction in which a change in the absolute position of a mobile object, in other words, a velocity output is obtained from the output of the GPS receiver explained above, thereby finding the absolute traveling azimuth of the mobile object. An embodiment which comprises the azimuth measurement means 104 utilizing the velocity output based on the GPS, will be described as Embodiment 5 later.

In the embodiments to be detailed below, an automobile shall be assumed as the mobile object. Besides, the GPS receiver which receives the GPS signal shall be assumed as the range measurement means 101. It shall also be assumed that the angular velocity measurement means 102 includes the gyro sensor, that the velocity measurement means 103 includes the car velocity sensor, and that the azimuth measurement means 104 includes the geomagnetism sensor.

Embodiment 1

This embodiment consists of a navigation system which has a fundamental construction as shown in FIG. 1, and in which a signal processing unit 110 is implemented by a Kalman filter. That is, range error estimation means 105, angular velocity error estimation means 106, velocity error estimation means 107 and azimuth error estimation means 108 which are included in an error estimation portion 111, and position calculation means 109 are implemented by a Kalman filter.

Figure 13:
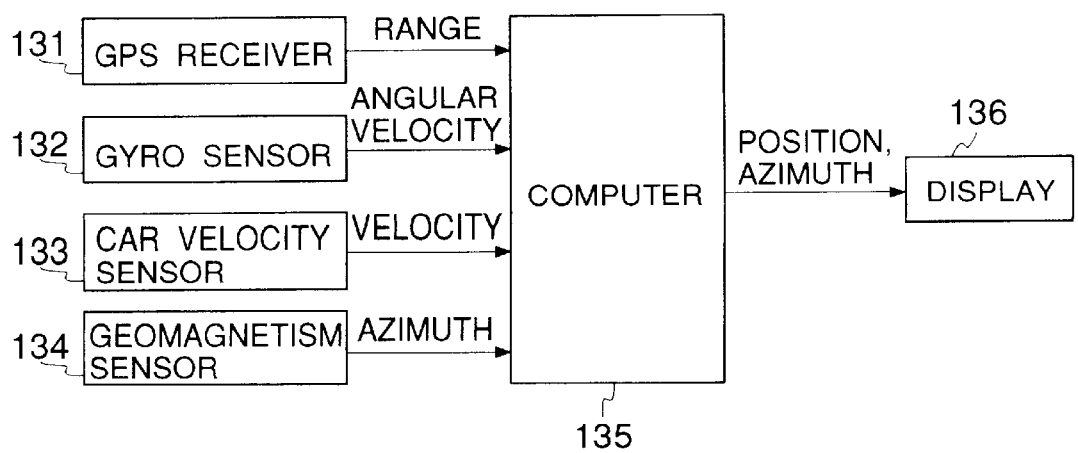
FIG. 13 is a block arrangement diagram showing the hardware architecture of a navigation system.

The hardware architecture of this embodiment is illustrated in FIG. 13. As shown in the figure, it includes as a measurement unit 100, a GPS receiver 131 which receives a signal from a GPS satellite so as to measure a range or a range rate, a gyro sensor 132 which measures the turning angular velocity of a mobile object carrying the navigation system thereon, a car velocity sensor 133 which measures the velocity of the mobile object, and a geomagnetism sensor 134 which measures the traveling azimuth of the mobile object.

Here, the GPS receiver 131 corresponds to range measurement means 101 shown in FIG. 1. It is capable of receiving the GPS signal from at least one satellite which sends the GPS signal (the "GPS satellite"), and it need not be a device which determines a position on the basis of signals sent from three or four GPS satellites.

Outputs from the measurement unit 100 (hereinbelow, called the "sensors") are processed by a locator 135 which fulfills the functions of the signal processing unit 110 shown in FIG. 1, whereby the position of an automobile being the mobile object is obtained. The locator 135 is implemented by a microcomputer, and it calculates the position of the mobile object by processing which will be explained below. Further, the obtained position is displayed on a display device 136 which corresponds to display means 112 shown in FIG. 1.

Now, the Kalman filter which implements the error estimation portion 111 and the position calculation means 109 in the locator 135 will be explained.

In the estimation employing the Kalman filter, it is usually required to model the time change of a quantity to-be-estimated (a state variable), as well as the relationship between the state variable and a quantity measurable as a sensor output (an observed variable).

First, the position of an automobile and the error factors of the individual sensors (GPS receiver 131, gyro sensor 132, car velocity sensor 133 and geomagnetism sensor 134), which are chiefly estimated in navigation processing for finding the position of the mobile object, will be set as the state variables to-be-estimated, and the time changes thereof will be modeled. Next, the relationships between the observed variables and the state variables will be expressed as models.

In this embodiment, the time changes of the position and velocity of the automobile are modeled in accordance with the equation shown in FIG. 35.

Here, when the acceleration of the car in the second term of the right-hand side of the equation shown in FIG. 35 is given, the position and velocity thereof at the next time can be computed. The acceleration of the car is measured by the sensors mounted thereon. By way of example, the acceleration is obtained through the equations shown in FIGS. 36 and 37. Those equations calculate approximate values of the acceleration by using the output of the car velocity sensor 133 and the azimuth output of the gyro sensor 132.

Of course, when acceleration sensors for two axes (an x-axis and a y-axis) are mounted, the acceleration can be directly measured instead of the approximate computations mentioned above. This model expresses the motion of the automobile being the mobile object and determines the position, and it shall be called the "car motion model". Incidentally, the car shall be assumed as the mobile object in this embodiment and the ensuing embodiments.

In the case of measuring the pseudo range (the range) from the GPS satellite to the GPS receiver 131 and the change rate thereof (the range rate) by the use of the GPS signal, the clock error of the GPS receiver 131 (so-called "clock bias") is involved as the main error factor. In order to express the behavior of the clock bias, a clock drift being the first derivative term needs to be considered besides constant terms.

The clock drift of a general receiver is assumed to be 10 [ppm] (which corresponds to about 26 [seconds] as a mean offset in one month). The clock bias is rendered 0 (null) by setting the clock of the receiver right at a certain point of time. Nevertheless, after 100 [seconds], the clock of the receiver undergoes a clock error of 10 [microseconds] due to the clock drift of 10 [ppm], and the measurement error of the range becomes as large as 3 [km]. In the navigation system of this embodiment, however, the measurement error of the range should desirably be suppressed to several [m] or so. Accordingly, the estimation of the clock drift is important for an accurate range measurement.

The model of the clock bias with the clock drift taken into consideration is defined in accordance with the equations shown in FIGS. 38 and 39.

This model expresses the error factors within the GPS receiver 131, and shall be called the "GPS error model" below.

Information items which are directly obtained from one GPS satellite, are the range and the range rate. The relationships among these information items and the position and velocity of the car will be modeled.

Here, the range is the pseudo range with the influence of the clock error of the receiver 131 added to the actual distance between the GPS satellite and the receiver 131. The range rate is obtained by differentiating the above range. The relationships among the range and range rate based on the ith satellite and the position and velocity of the receiver 131 mounted on the car are modeled as the equations shown in FIGS. 40 and 41.

This model expresses the range output of the GPS receiver 131, and shall be called the "GPS range output model".

The gyro sensor 132 is an angular velocity sensor, the error factor of which is the bias thereof. Under the assumption that the bias is substantially constant in a short time period, it is modeled as the equation shown in FIG. 42.

This model expresses the error factor of the gyro sensor 132, and shall be called the "gyro error model" below.

The relationship between the output of the gyro sensor 132 and the velocity of the car being the mobile object is modeled. The output of the gyro sensor 132 indicating the angular velocity of the car is integrated, and the integrated result is set as a "gyro azimuth". The difference between the gyro azimuth and the true azimuth becomes the product of the bias and a time period for integrating the output of the gyro sensor 132. That is, the gyro azimuth is modeled as the equation shown FIG. 43.

This model expresses the output of the gyro sensor 132, and shall be called the "gyro output model" below.

The car velocity sensor 133 is a sensor which measures the velocity of the car from the rotational frequency of the care tires. The error factors of the sensor 133 include a scale factor error ascribable to a tire diameter change and a bias ascribable to slip. Under the assumption that the scale factor and the bias are substantially constant in a short time period, they are respectively modeled as the equations shown in FIGS. 44 and 45.

These models express the error factors of the car velocity sensor 133, and shall be called the "car velocity sensor error models".

The output of the car velocity sensor 133 indicates a distance which the car has advanced in a sampling interval. The relationship between the output of the car velocity sensor 133 and the velocity of the car is modeled. The sensor output is modeled on the basis of the velocity, the scale factor error and the bias, in accordance with the equation shown in FIG. 46.

This model expresses the output of the car velocity sensor 133, and shall be called the "car velocity sensor output model".

The main error factors of the geomagnetism sensor 134 are the offset magnetization and the $\mu$ (mu) effect of the body of the car (hereinbelow, the $\mu$ effect shall be termed the "car body effect"). The offset magnetization is the phenomenon where the part of the car body to which the geomagnetism sensor 134 is attached becomes magnetized and gives rise to a large azimuthal error. This corresponds to the fact that the center of an azimuthal circle depicted by the output of the geomagnetism sensor 134 moves. On the other hand, the car body effect is an effect which the car body made of a magnetic material exerts on a geomagnetic field, and it is a phenomenon in which the azimuthal circle deforms into an ellipse.

Each component of the offset magnetization and the car body effect can be described by two parameters. Under the assumption that the time changes of these parameters are small, the components are modeled in accordance with the equations shown in FIGS. 47 to 50.

These models express the behavior of the error factors (the offset magnetization and the car body effect) of the geomagnetism sensor 134, and shall be called the "geomagnetism sensor error models" below.

The relationship between the output of the geomagnetism sensor 134 and the velocity of the car is modeled as the equations shown in FIGS. 51 and 52.

The x- and y-axial outputs of the geomagnetism sensor 134 are determined by the traveling azimuth of the car. In turn, when the traveling azimuth of the car is defined to be tangential to the traveling locus of this car, it can be expressed by applying a function "arctan" to the ratio of the traveling velocity components of the mobile object. This model expresses the output of the geomagnetism sensor 134, and shall be called the "geomagnetism sensor output model" below.

A state equation and an observational equation will be made below by the use of the car motion model, the error models for the individual sensors and the output models for the respective sensors as explained above. The state equation expresses the time changes of the state variables, while the observational equation describes the relationships between the observed variables and the state variables.

The state variables in this embodiment are given by the equation shown in FIG. 53 which is a vector of 15 dimensions in which the car position information and sensor errors to-be-estimated are put together. Here, a superscript T contained in the vector expressive of the state variables indicates that the line vector is a string vector. For the sake of brevity, however, the time k is omitted. Also in the ensuing description, the time k shall be omitted on occasion.

The state equation is set as equations shown in FIG. 54.

Here, letter v denotes system noise. On the other hand, the observational equation is set by putting the output models of the respective sensors together, as the equation shown in FIG. 55.

Here, the observed variables y and observed noise w are respectively given by the equations shown in FIGS. 56 and 57.

The observed variables y are given by a vector in which the outputs of the respective sensors are arrayed. The GPS receiver 131 is capable of receiving the signal/signals from n GPS satellite/satellites (n being one or more). In this model, the degrees of the observed variables shall change in accordance with the number of such GPS satellites. Besides, the relationships between the observed variables and the state variables are expressed by a nonlinear function h.

The Kalman filter computes the above-mentioned state equation and observational equation so as to estimate the position of the car. Since the observational equation computed here is nonlinear, the algorithm of an expanded Kalman filter is applied. The algorithm of the expanded Kalman filter is given by the following recursion formulae shown in FIG. 58 to FIG. 63.

The Kalman filter calculates the optimal estimative values x(k|k) and predictive values x(k|k−1) of the state variables x(k), and estimative-error covariance matrices P(k|k) and P(k|k−1) corresponding to the values x(k|k) and x(k|k−1), respectively.

Here, letter V denotes the covariance matrix of the system noise v, and letter W that of the observed noise w. Letter H denotes a Jacobian determinant in the predictive values x(k|k−1) of the function h. Incidentally, the repetitive operations of the Kalman filter have the form of the recursion formulae, and they can be easily implemented by known computer software.

Figure 4:
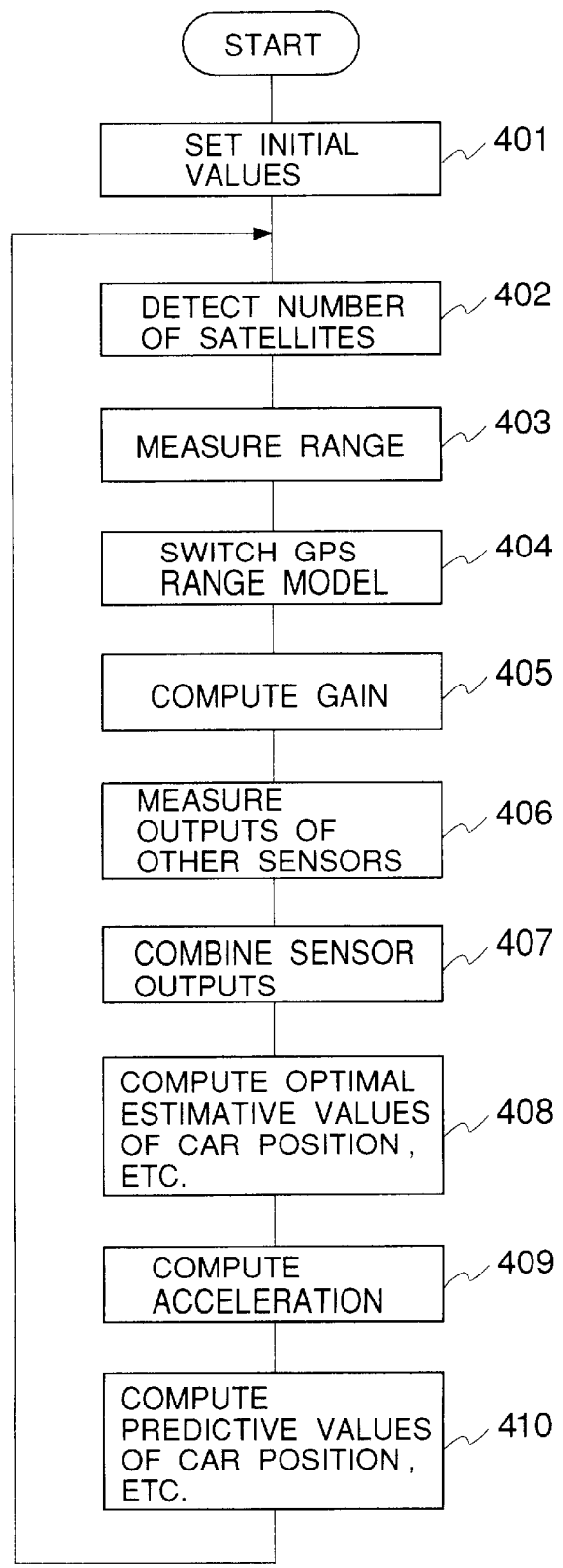
FIG. 4 is a flow chart showing a processing method in the case where the embodiment depicted in FIG. 1 is implemented by a Kalman filter.

Processing steps in the navigation system according to this embodiment which employs the above algorithm of the expanded Kalman filter, will be explained in conjunction with a flow chart of FIG. 4.

First, the initial values of the predictive values including the position of the car being the mobile object, and those of the error covariance matrices are set as indicated by the equation shown in FIG. 58 (step 401). Subsequently, the number of GPS satellites from which the GPS signals are currently receivable is checked (step 402), and these GPS signals are received by the GPS receiver 131 so as to measure the range and the range rate (step 403). On this occasion, the GPS range output model is altered to change the degrees of the observed variables y and nonlinear function h, in accordance with the number of GPS satellites from which the signals are receivable (step 404).

After the form of the function h has been determined, the gain K of the Kalman filter is computed by the equation shown in FIG. 59 (step 405). Those outputs of the sensors which are other than the output of the GPS receiver 131 obtained before, are measured (step 406). Besides, the sensor outputs are combined using the function h and the predictive values x (step 407).

Owing to the above, the observed variables y are obtained. The optimal estimative values of the car position and sensor errors, and the error covariance matrix are computed in accordance with the equations shown in FIGS.

60 and 61 (step 408). The acceleration of the car is computed from the outputs of the car velocity sensor 133 and gyro sensor 132 in accordance with the equations shown in FIGS. 36 and 37 (step 409). Using the acceleration computed here, the predictive values and the error covariance matrix corresponding thereto are computed in accordance with the equations shown in FIGS. 62 and 63 (step 410). The current position of the car can be found by iterating the above series of steps.

Figure 5:
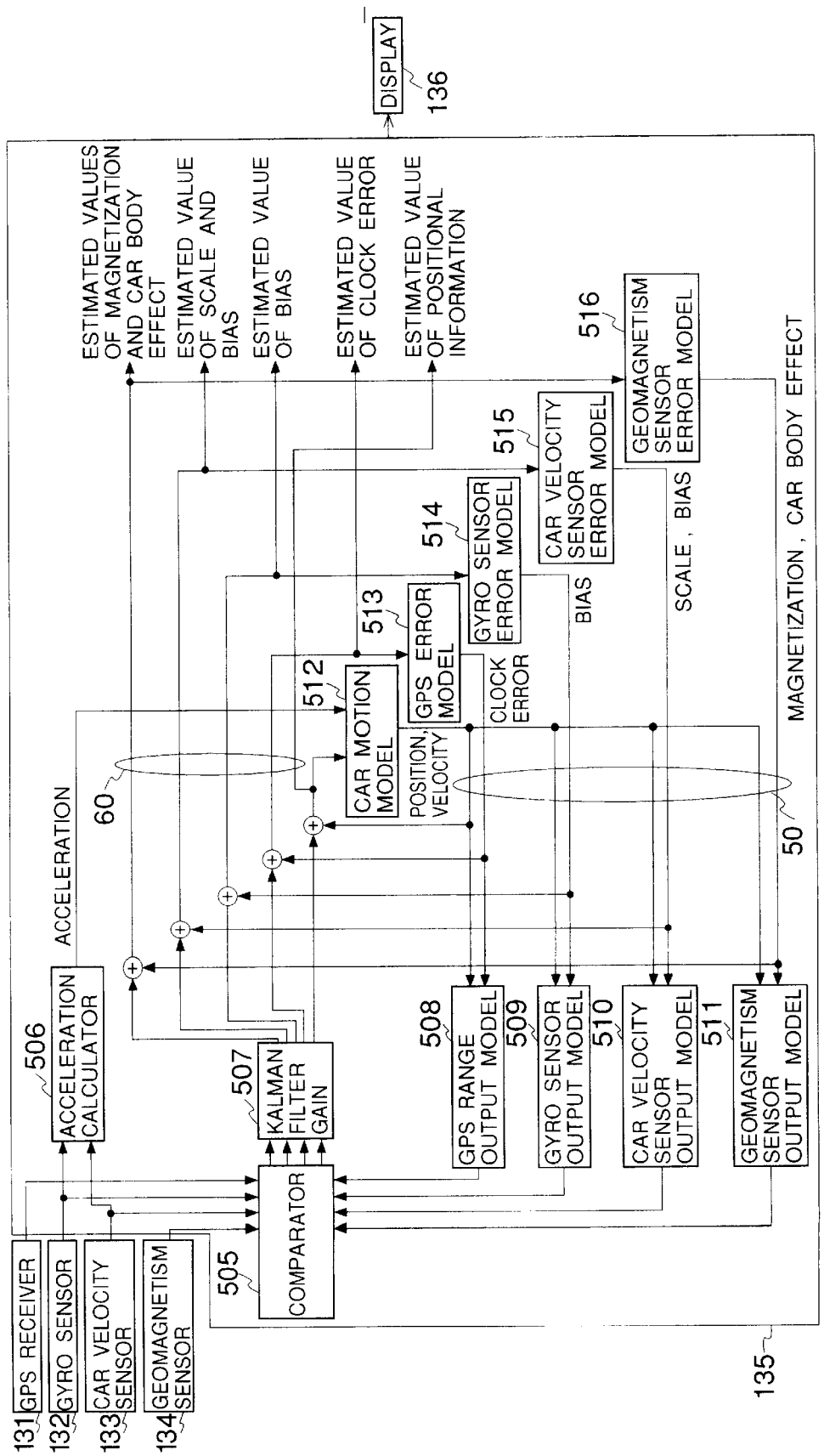
FIG. 5 is a block diagram for explaining the processing method in the case of FIG. 4.

The Kalman filter process explained above is implemented by a process in the locator 135 as shown in FIG. 5.

Referring to FIG. 5, in the Kalman filter process, the predictive values 50 at the next time are first computed using the models of the respective sensors.

More specifically, the predictive value 50 of the positional information of the car is computed using the car motion model 512, from the acceleration of the car obtained from the measurement outputs of the gyro sensor 132 and car velocity sensor 133 by an acceleration calculator 506, as well as the optimal estimative value 60 of the positional information obtained last. The predictive value 50 of the clock error is computed from the optimal estimative value 60 thereof obtained last, by the use of the GPS error model 513. The predictive value 50 of the gyro bias is computed from the optimal estimative value 60 thereof obtained last, by the use of the gyro sensor error model 514. The predictive value 50 of the car velocity sensor error is computed from the optimal estimative values 60 of the scale factor error and the bias obtained last, by the use of the car velocity sensor error model 515. The predictive values 50 of the offset magnetization and the car body effect are computed from the optimal estimative values 60 thereof obtained last, by the use of the geomagnetism sensor error model 516.

Subsequently, the outputs of the sensors are combined in pseudo fashion by the use of the corresponding sensor output models 508~511. The combined outputs are to be collated with the actual measurement outputs of the respective sensors by a comparator 505 later. The outputs which are obtained by the combinations, include the GPS output corresponding to the output of the GPS receiver 131, the gyro sensor output corresponding to the output of the gyro sensor 132, the car velocity sensor output corresponding to the output of the car velocity sensor 133, and the geomagnetism sensor output corresponding to the output of the geomagnetism sensor 134.

The GPS output is combined from the predictive values 50 of the positional information and the clock error computed using the car motion model 512 and the GPS error model 513, by utilizing the GPS range output model 508. The gyro sensor output is combined from the predictive values 50 of the positional information and the bias computed using the car motion model 512 and the gyro error model 514, by utilizing the gyro sensor output model 509. The car velocity sensor output is combined from the predictive values 50 of the positional information and the car velocity sensor error computed using the car motion model 512 and the car velocity sensor error model 515, by utilizing the car velocity sensor output model 510. The geomagnetism sensor output is combined from those predictive values 50 of the positional information and the offset magnetization as well as the car body effect which have been respectively computed using the car motion model 512 and the geomagnetism sensor error model 516, by utilizing the geomagnetism sensor output model 511.

Lastly, the optimal estimative values 60 are computed. More specifically, the differences between the actual outputs of the GPS receiver 131, gyro sensor 132, car velocity sensor 133 and geomagnetism sensor 134 and the combined outputs obtained from the last predictive values are respectively calculated by the comparator 505, thereby computing the estimative errors of the individual sensor outputs. The predictive values 50 obtained before are respectively added to the products between the computed estimative errors and the Kalman filter gain 507, thereby computing the estimated value of the positional information, that of the clock error, that of the bias, that of the car velocity sensor error, and that of the offset magnetization as well as the car body effect. The optimal estimative values at each time are respectively obtained by iterating the above computations, and the positional information of the car is sent to and displayed on the display device 136.

In this embodiment, owing to the calculation processing explained above, the error factors of the GPS receiver 131, gyro sensor 132, car velocity sensor 133 and geomagnetism sensor 134 are estimated, and the position and velocity of the mobile object are computed while the errors are being corrected. Estimated as the sensor error factors are the clock error of the GPS receiver 131, the bias of the gyro sensor 132, the scale factor error and bias of the car velocity sensor 133, and the offset magnetization and car body effect of the geomagnetism sensor 134.

It is difficult, with only the outputs of the individual sensors, to estimate the error factors, and to calibrate the sensors in correspondence with the estimated error factors so as to hold the precisions of the sensors. However, when the plurality of sensors are simultaneously corrected during the traveling of the mobile object as in this embodiment, navigation processing of higher precision is realized without using high precision any sensor. Further, since no high precision sensor, namely, no expensive sensor, need be employed, it is possible to suppress the overall cost of the sensors of the navigation system.

The performance of the navigation system of this embodiment was numerically simulated. At that time, the cumulation of errors as noted in the conventional inertial navigation was not observed. It was observed that this embodiment has enhanced the positioning accuracy by about 10 times compared with the navigation system utilizing the GPS, by the calibrations of the error factors based on the Kalman filter. Moreover, it has been verified that the errors of the car velocity sensor 133 and the gyro sensor 132 can be respectively estimated within relative errors of 10 [%] and 50 [%] in the construction of this embodiment.

Embodiment 2

This embodiment consists in application of the third expedient in the present invention as illustrated in FIG. 3, and the hardware architecture thereof is the same as in Embodiment 1 (refer to FIG. 13). The measurement unit 100 of this embodiment is configured of the gyro sensor 132, the geomagnetism sensor 134, the car velocity sensor 133 and the GPS receiver 131. Further, this embodiment includes the locator 135 which executes processes to be explained below, and the display device 136 which displays the car position calculated by the locator 135.

Figure 6:
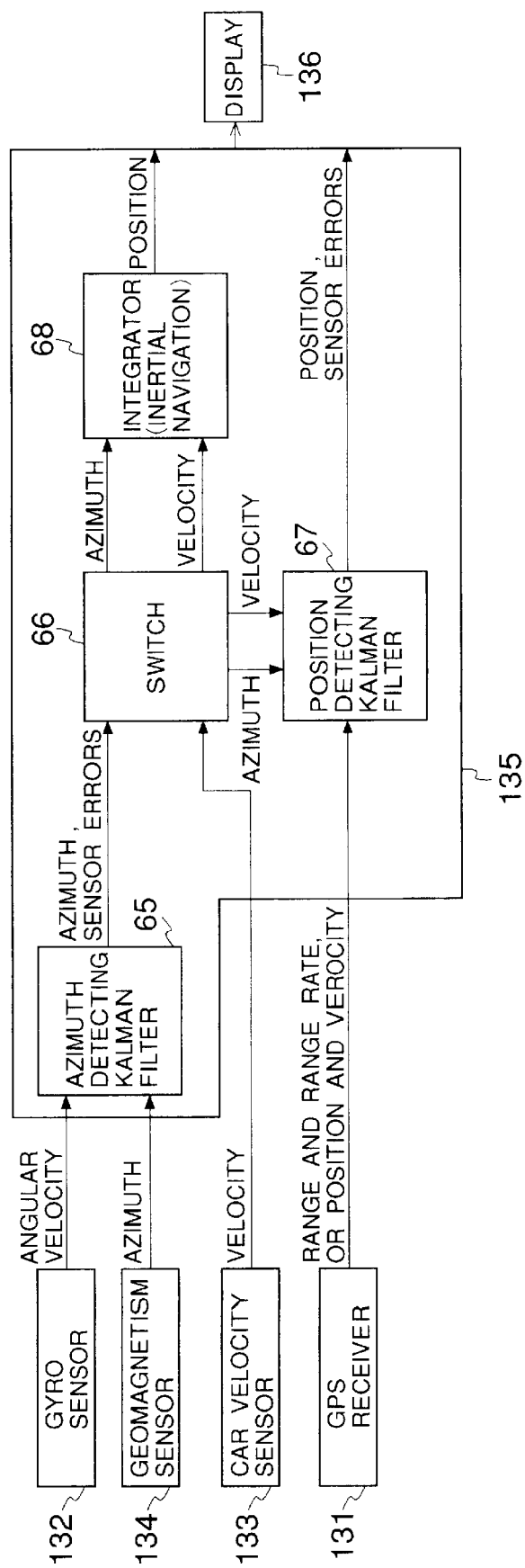
FIG. 6 is a block arrangement diagram showing the construction of one embodiment which employs a Kalman filter for the detection of an azimuth, and which has the function of changing-over an integrator and a Kalman filter for the detection of a position.

As shown in FIG. 6, the functional block arrangement of the locator 135 is different from that in Embodiment 1. Here in Embodiment 2, the locator 135 includes an azimuth detecting Kalman filter 65 which receives the signals from the gyro sensor 132 and geomagnetism sensor 134 and calculates the azimuth as well as the sensor errors, and a switch 66 which receives the signals from the azimuth detecting Kalman filter 65 and the car velocity sensor 133 and changes-over the output destinations thereof on occasion. Further, the locator 135 includes an integrator 68 which receives the signals from the switch 66 so as to calculate the position of the car by the inertial navigation, and a position detecting Kalman filter 67 which receives the signals from the GPS receiver 131 and the signals from the switch 66 so as to calculate the position as well as the sensor errors.

This embodiment has the construction which prevents the positioning accuracy from worsening even when hardly any signal can be received from any GPS satellite due to topography or surrounding buildings. Even in the case where hardly any signal can be received from any GPS satellite, the gyro sensor 132 and the geomagnetism sensor 134 are normally measuring the angular velocity and azimuth of the mobile object in correspondence with the traveling motion thereof, respectively. In this embodiment, these signals are used to heighten the precision of the navigation system.

Of course, the gyro sensor 132 and the geomagnetism sensor 134 respectively undergo errors in the measurements. In this embodiment, therefore, the factors of the errors are calibrated by adopting the third expedient of the present invention explained above (refer to FIG. 3).

Concretely, when hardly any GPS signal can be received from any GPS satellite, the azimuth is estimated from the outputs of the gyro sensor 132 and geomagnetism sensor 134 by the azimuth detecting Kalman filter 65. Further, the estimated azimuth and the output of the car velocity sensor 133 are passed through the switch 66, and the velocity is integrated therefrom by the integrator 68. Thus, the position of the car is found.

On the other hand, when the GPS signal can be received from at least one GPS satellite, the GPS receiver 131 produces information items on a distance from each individual GPS satellite (a range and a range rate), or it produces positional information items (a position and a velocity) calculated from the receivable signals of the GPS satellites on condition that the number of such GPS satellites is at least four. Thus, the position of the car is estimated by the position detecting Kalman filter 67 from the output information items of the GPS receiver 131, the output of the azimuth detecting Kalman filter 65, and the output of the car velocity sensor 133.

The switch 66 which accepts the outputs of the azimuth detecting Kalman filter 65 and the velocity sensor 133, is controlled for the change-over by the use of that information on the number of the GPS satellites sending the receivable signals which is output from the GPS receiver 131.

The two Kalman filters for use in this embodiment; the azimuth detecting Kalman filter 65 and the position detecting Kalman filter 67 have models (state equations and observational equations) as explained below.

The state variables of the azimuth detecting Kalman filter 65 and those of the position detecting Kalman filter 67 are respectively set as equations shown in FIGS. 64 and 65.

Under these conditions, the state equations are respectively set as equations shown in FIGS. 66 and 67.

In addition, the observed variables of the azimuth detecting Kalman filter 65 and those of the position detecting Kalman filter 67 are respectively set as equations shown in FIGS. 68 and 69.

Here, it is assumed that the number of GPS satellites sending the receivable signals is n (n being one or more).

The observational equation of the azimuth detecting Kalman filter 65 is defined by altering the geomagnetism output model and gyro output model of Embodiment 1 with respect to the azimuth, as the equations shown in FIGS. 70 to 72.

The model expressed by these formulae indicates the change of the azimuth, and shall be called the "azimuthal change model" below. Besides, the relationship between the azimuth estimated by the azimuth detecting Kalman filter 65 and the velocity of the car can be modeled as the equations shown in FIG. 73.

This model expresses the traveling azimuth change of the car, and shall be called the "azimuthal output model" below.

The observational equation of the position detecting Kalman filter 67 can be formed using the equation shown in FIG. 73 mentioned above and the sensor output model of Embodiment 1. Since both the two observational equations explained above are nonlinear, they are computed using the algorithm of the expanded Kalman filter in the same manner as in Embodiment 1.

Figure 7:
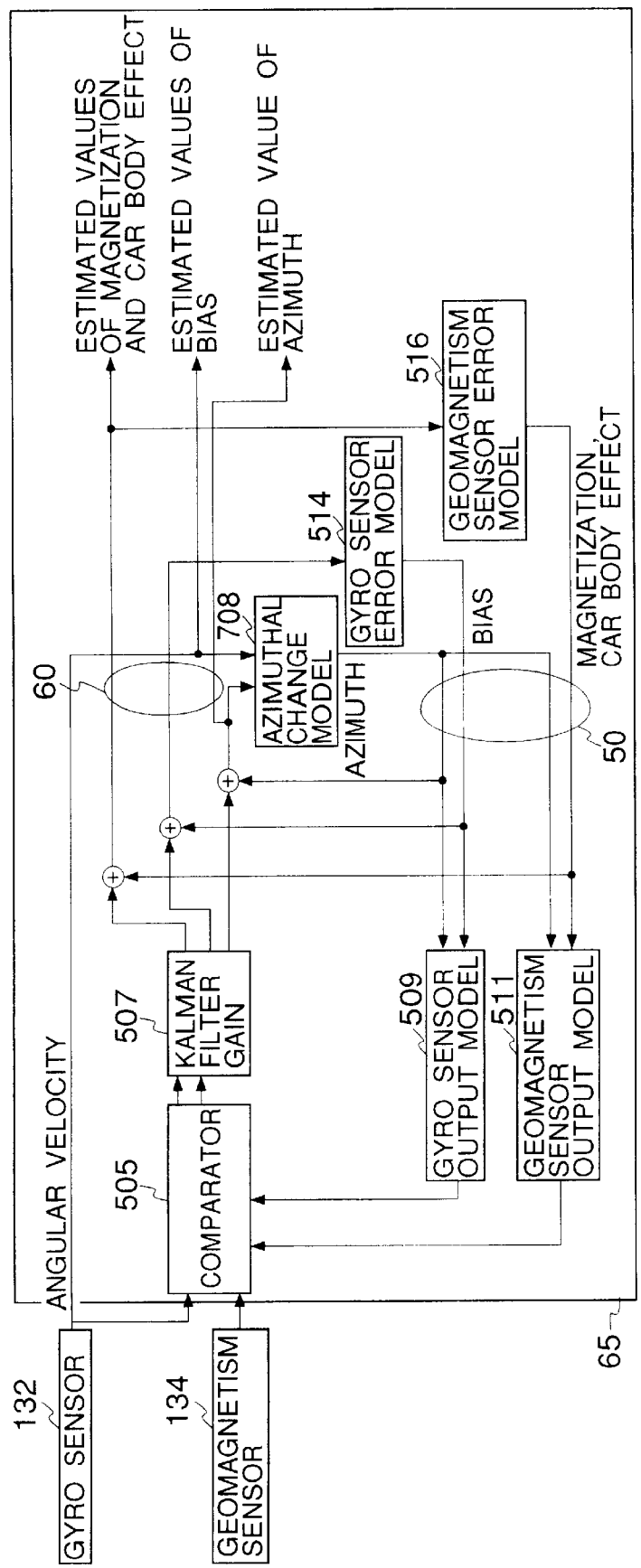
FIG. 7 is a block diagram for explaining the processing method of the azimuth detecting Kalman filter in the embodiment depicted in FIG. 6.

The process of the azimuth detecting Kalman filter 65 in this embodiment is as illustrated by a block diagram in FIG. 7. The operations of the Kalman filter 65 will now be explained. In this embodiment, the same constituents as in Embodiment 1 shall have the identical reference numerals assigned thereto, and the operations thereof shall be omitted from the detailed explanation.

First, predictive values 50 at the next time concerning the respective models are computed using the models assumed above. More specifically, the predictive value 50 of the traveling azimuth of the car being the mobile object is computed from the angular velocity output of the gyro sensor 132 and the optimal estimative value 60 of the azimuth obtained last, by the use of the azimuthal change model indicated at numeral 708. The predictive value 50 of the gyro sensor bias is computed from the optimal estimative value 60 thereof obtained last, by the use of the gyro sensor error model 514. The predictive values 50 of the offset magnetization and the car body effect are computed from the optimal estimative values 60 thereof obtained last, by the use of the geomagnetism sensor error model 516.

Subsequently, the outputs of the sensors are combined in pseudo fashion by the use of the corresponding sensor output models defined above. The gyro sensor output is combined from the predictive values 50 of the azimuth and the bias computed using the azimuthal change model 708 and the gyro sensor error model 514, by utilizing the gyro sensor output model 509. The geomagnetism sensor output is combined from those predictive values 50 of the azimuth and the offset magnetization as well as the car body effect which have been respectively computed using the azimuthal change model 708 and the geomagnetism sensor error model 516, by utilizing the geomagnetism sensor output model 511.

Lastly, the optimal estimative values 60 are computed. More specifically, the differences between the actual outputs of the gyro sensor 132 and geomagnetism sensor 134 and the combined outputs thereof are respectively calculated by the comparator 505, thereby computing the estimative errors of the individual sensor outputs. The predictive values 50 obtained before are respectively added to the products of the computed estimative errors and the Kalman filter gain 507, thereby computing the estimated value of the azimuth, that of the bias, that of the car velocity sensor error, and that of the offset magnetization as well as the car body effect.

Owing to the iteration of the above computations, the optimal estimative values 60 at each time can be respectively obtained to calculate the azimuth of the car being the mobile object.

Figure 8:
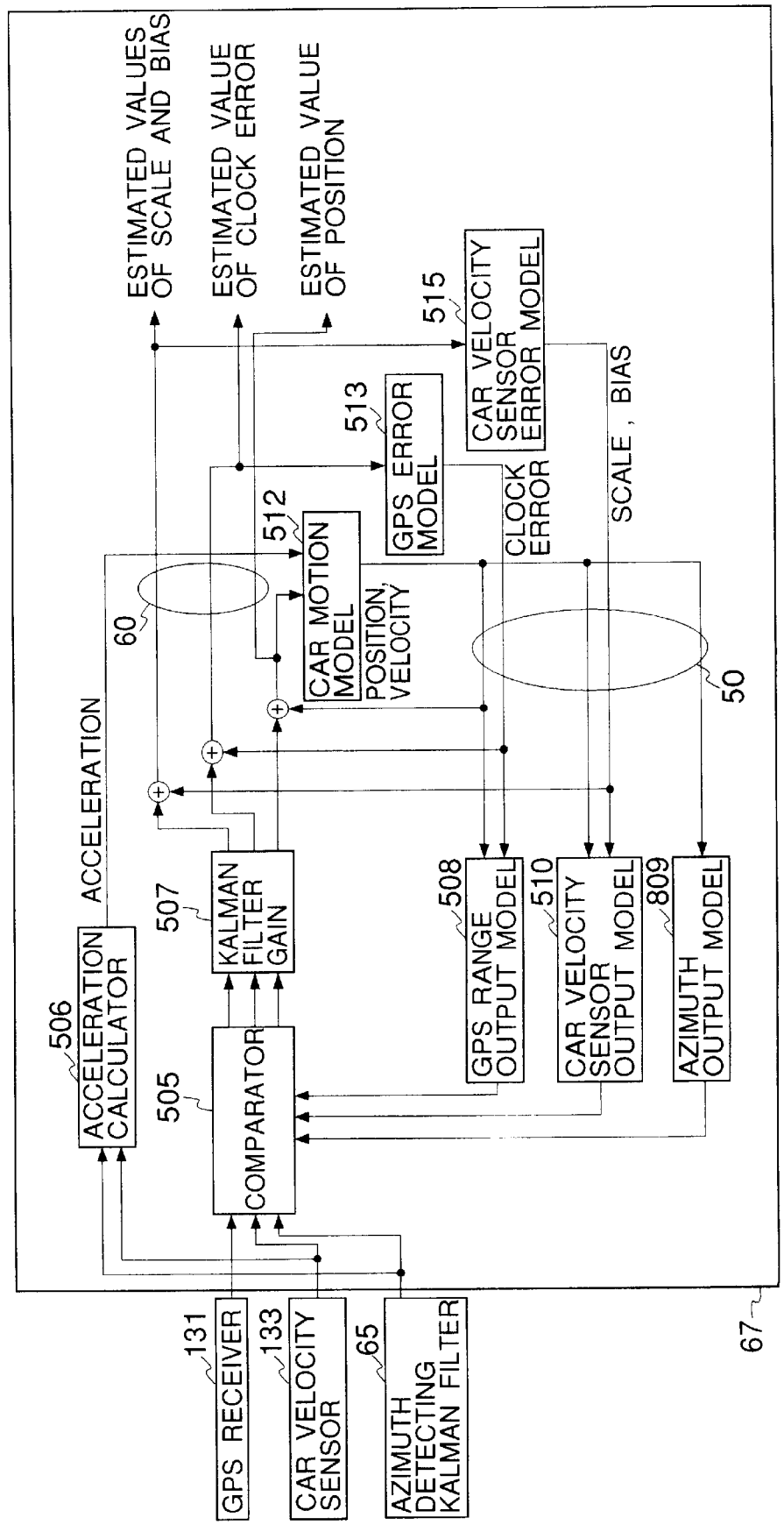
FIG. 8 is a block diagram for explaining the processing method of the position detecting Kalman filter in the embodiment depicted in FIG. 6.

The process of the position detecting Kalman filter 67 in this embodiment is illustrated by a block diagram in FIG. 8, and the operations thereof will now be explained.

In the same manner as in the azimuth detecting Kalman filter 65, predictive values 50 are first computed using the respective models. Concretely, the predictive values 50 of the positional information items such as the position and velocity of the car are computed using the car motion model 512, from the acceleration of the car obtained from the outputs of the car velocity sensor 133 and azimuth detecting Kalman filter 65 by the acceleration calculator 506, and the optimal estimative values 60 of the positional information obtained last. The predictive value 50 of the clock error is computed from the optimal estimative value 60 thereof obtained last, by the use of the GPS error model 513. The predictive value 50 of the car velocity sensor error is computed from the optimal estimative values 60 of the scale factor error and the bias obtained last, by the use of the car velocity sensor error model 515.

Subsequently, the outputs of the sensors are combined in pseudo fashion by the use of the corresponding sensor output models defined above. The output of the GPS receiver 131 is combined from the predictive values 50 of the positional information and the clock error respectively computed using the car motion model 512 and the GPS error model 513, by utilizing the GPS range output model 508. The output of the car velocity sensor 133 is combined from the predictive values 50 of the positional information and the car velocity sensor error respectively computed using the car motion model 512 and the car velocity sensor error model 515, by utilizing the car velocity sensor output model 510. The output of the azimuth detecting Kalman filter 65 is combined from the predictive value 50 of the velocity computed using the car motion model 512, by utilizing the azimuthal output model indicated at numeral 809.

Lastly, the optimal estimative values 60 are computed. More specifically, the differences between the actual outputs of the GPS receiver 131, car velocity sensor 133 and azimuth detecting Kalman filter 65 and the combined outputs thereof are respectively calculated by the comparator 505, thereby computing the estimative errors of the individual sensor outputs. The predictive values 50 obtained before are respectively added to the products of the computed estimative errors and the Kalman filter gain 507, thereby computing the estimated value of the position, that of the clock error and that of the car velocity sensor error.

Owing to the iteration of the above computations, the optimal estimative values 60 at each time can be respectively obtained to calculate the position of the car.

Incidentally, the position detecting Kalman filter 67 may well use positional information items (a position and a velocity) obtained by a method in which the position of the mobile object is determined by means of the GPS receiver 131 by receiving GPS signals from four or more GPS satellites (hereinbelow, the method shall be called the "single-point location"). In this case, observed variables have a form shown in FIG. 74.

The position and velocity contained in the above observed variables are obtained in such a way that the position and velocity of the state variables are measured in the presence of measurement noise by the GPS single-point location. Accordingly, an observational equation can be defined easily.

Besides, only an azimuth can be detected at a high accuracy when the combination of the azimuth detecting Kalman filter 65, gyro sensor 132 and geomagnetism sensor 134 is employed. Accordingly, a construction which comprises these sensors and the Kalman filter 65 in combination can be used by itself as an general azimuth sensor for aeroplanes and vehicles.

In this embodiment, only the azimuth is normally detected by the Kalman filter 65 of simple structure. In the case where no signal is receivable from any GPS satellite, the position is obtained by integrating the output of the car velocity sensor 133 by the use of the detected azimuth. On the other hand, in the case where the signal is receivable from at least one GPS satellite, the position of the car is computed by the position detecting Kalman filter 67 which is supplied with the detected azimuth, the output of the GPS receiver 131 and the output of the car velocity sensor 133. Accordingly, the position can be found through the required minimum computation in accordance with the reception state of the signal/ signals from the GPS satellite/satellites.

In an experimental example of this embodiment, a traveling locus was calculated using an azimuth obtained by the combination of the azimuth detecting Kalman filter 65, gyro sensor 132 and geomagnetism sensor 134 in the case where no signal was received from any GPS satellite. The traveling locus is indicated by a solid line in FIG. 14. For the sake of comparisons, a traveling locus calculated when an azimuth was obtained by only the geomagnetism sensor 134 employed in this embodiment, and a traveling locus calculated when an azimuth was obtained by only the gyro sensor 132 are also indicated by a broken line and by a dot-and-dash line in FIG. 14, respectively.

Figure 14:
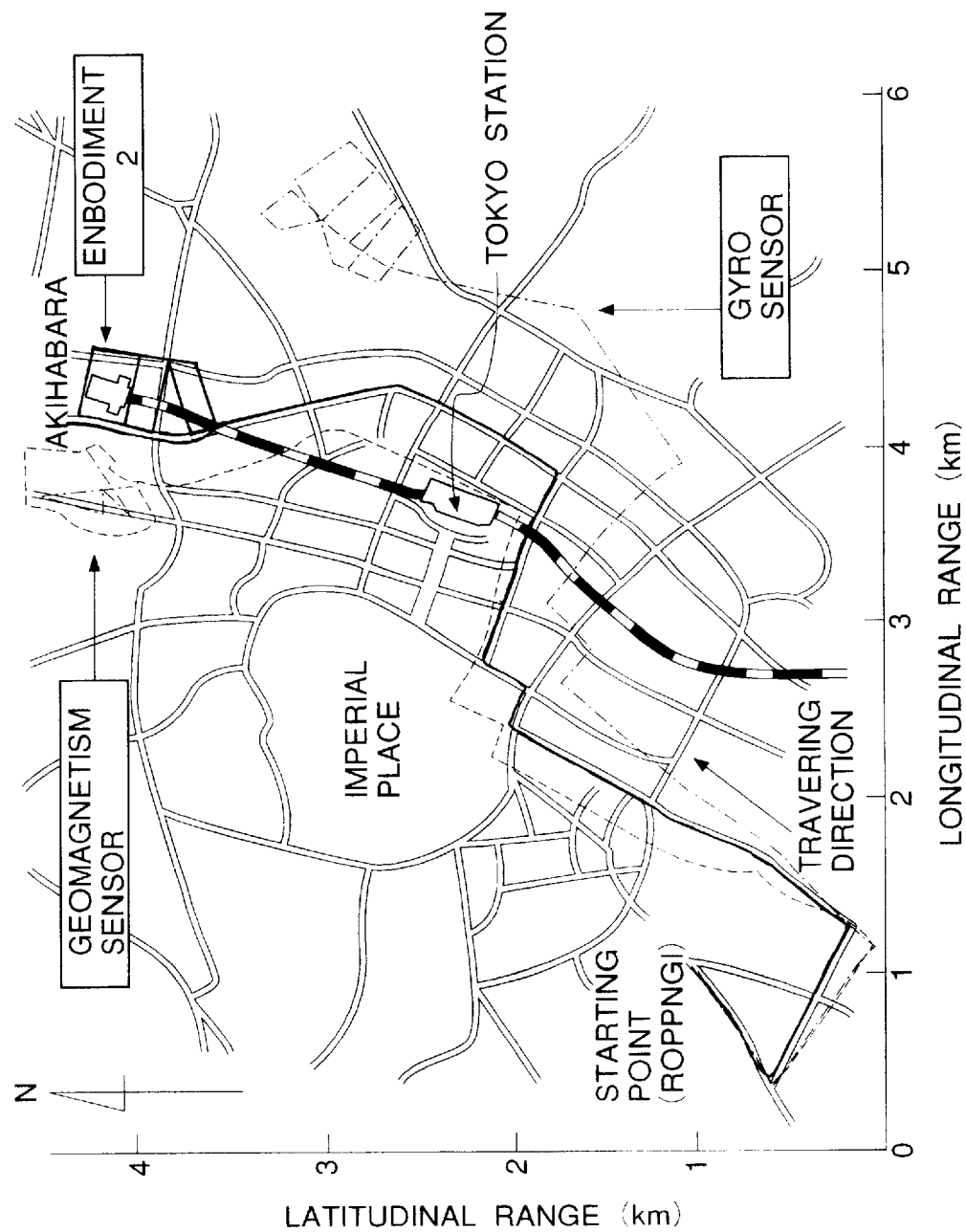
FIG. 14 is a diagram for explaining the effect of one embodiment in the present invention.

As can be clearly seen from the traveling loci shown in FIG. 14, the traveling locus of the mobile object can be obtained with accuracy when, as in this embodiment, the geomagnetism sensor 134 and gyro sensor 132 are employed, and the azimuth detecting Kalman filter 65 is used for correcting the errors of both the sensors on the basis of the outputs thereof. Here in the example of this embodiment, an azimuthal error was 3 to 5 [degrees] on average. In contrast, when the azimuth was obtained by only either of the geomagnetism sensor 134 and the gyro sensor 132 so as to calculate the traveling locus on the basis of the obtained azimuth, the calculated traveling locus became very inaccurate due to the error peculiar to the corresponding sensor.

Embodiment 3

This embodiment has a fundamental construction as shown in FIG. 2. In this embodiment, position measurement means 201 has the positioning function of performing the so-called "single-point location" in which the position of a mobile object is determined from GPS signals sent from four GPS satellites. Concretely, the navigation system of this embodiment employs the GPS receiver 131 in Embodiment 1 as is endowed with the aforementioned positioning function. The hardware architecture of Embodiment 3, other than the specified GPS receiver 131, is the same as that of Embodiment 1 (refer to FIG. 13).

Here, Embodiment 3 will be described as to an example in which sensor errors can be estimated by applying a calculational method, different from the Kalman filter process, to part of the error estimation portion 111.

In this embodiment, the velocity error estimation means 107 estimates the error of the car velocity sensor (133 in FIG. 13) from the output of this car velocity sensor and the output of the velocity of the mobile object calculated using the GPS signals. Besides, the azimuthal error estimation means 108 estimates the error of the geomagnetism sensor (134) from the output of this geomagnetism sensor and the GPS velocity output mentioned above.

The other error estimation means, namely the positional error estimation means 205 and the angular velocity error estimation means 106, may be implemented by the Kalman filter in the same manner as in Embodiment 1, or may well be constructed so as to execute calculational processes by the method of Embodiment 3 different from the Kalman filter process.

In this embodiment, the position/azimuth calculation means 109 is further comprised for receiving signals from the error estimation portion 111 and then calculating the position of the car. The basic process of the position calculation means 109 is the same as the process in Embodiment 1 illustrated in the block diagram of FIG. 5. Here in Embodiment 3, however, the car velocity sensor output model 510, geomagnetism sensor output model 511, car velocity sensor error model 515 and geomagnetism sensor error model 516 are omitted from the illustration of FIG. 5. Instead, the estimative values of the offset magnetization and car body effect and those of the scale factor and bias are respectively calculated by the velocity error estimation means 107 and the azimuthal error estimation means 108 to be explained below. Thus, the errors of the individual sensors are corrected in the same manner as in Embodiment 1. Now, the details of such points of difference will be explained.

First, an example of the process of the velocity error estimation means 107 accepting the output from the car velocity sensor 133 will be explained in conjunction with a flow chart of FIG. 9.

The car velocity sensor 133 sometimes undergoes errors which cannot be expressed by the car velocity sensor output model (refer to equations shown in FIG. 56) explained in Embodiment 1, due to the temporary slip of the wheel of the car, etc. Also, large errors are sometimes involved in the velocity output (the "GPS velocity output") which is obtained from the temporal change of the position calculated by the single-point location in the GPS receiver 131, due to the multipath of the signal of the GPS satellite attributable to the presence of buildings, etc.

In order to eliminate abnormal values ascribable to these errors, the car velocity sensor output is compared with the velocity of the mobile object on a plane as has been computed from the GPS velocity output. The comparison is indicated by the equation shown in FIG. 75.

Figure 9:
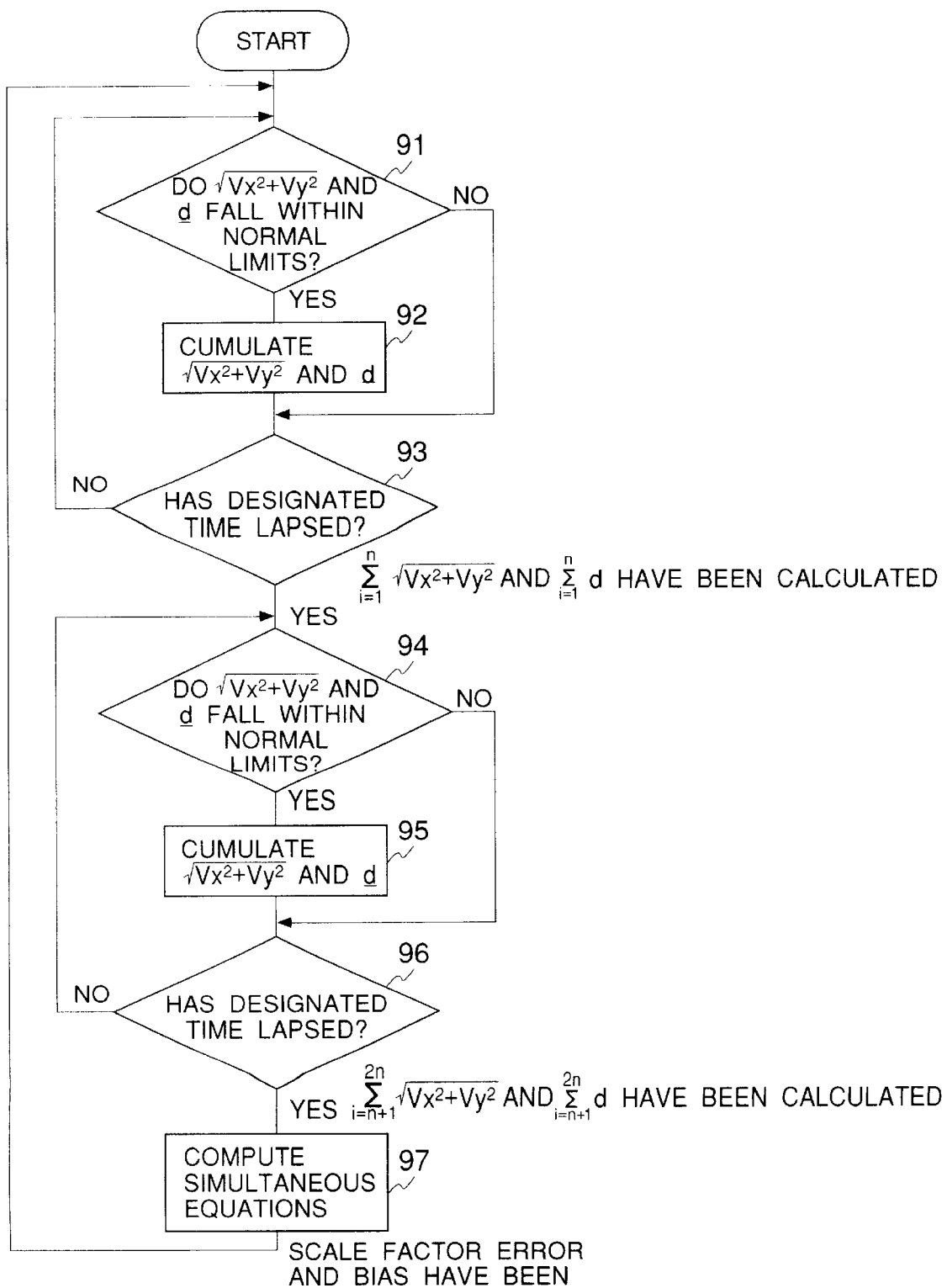
FIG. 9 is a flow chart showing a processing method in the case where velocity error estimation means is implemented by an averaging process.

When the difference D exceeds a predetermined magnitude, it is judged that either the car velocity sensor output or the GPS velocity output has the abnormal value, and both the outputs at this time are eliminated (step 91 in FIG. 9).

The main error factors of the car velocity sensor 133 are the scale factor error, the bias and the measurement noise as stated in Embodiment 1. Among them, the scale factor error and the bias are assumed to hardly change over a short time period. Besides, since the measurement noise is basically random noise, the temporal average value thereof can be assumed to be 0 (null). In this embodiment, the measurement errors of the car velocity sensor output are relieved through an averaging process for a predetermined time period by utilizing the assumptions.

Owing to the averaging process based on the sensor outputs from which the abnormal values have been eliminated (steps 92 and 93), the car velocity sensor output model of this embodiment becomes as the equation shown in FIG. 76.

The equation given above contains the two unknown numbers of the scale factor error and the bias in the single formula. In order to form simultaneous equations, the summation of the sensor outputs is computed while the abnormal values in the sensor outputs are being eliminated (step 94) by processing only the sensor outputs at a different time in the above way for a predetermined time period. Thus, the equation shown in FIG. 77 is obtained (steps 95 and 96).

Here, when the equations shown in FIGS. 76 and 77 are solved as the simultaneous equations, the scale factor error "Sod" and bias "Bod" of the car velocity sensor 133 can be obtained (step 97).

Over a long term, the scale factor error and bias of the car velocity sensor 133 fluctuate. Therefore, the above series of processing steps are iterated every predetermined time interval so as to obtain the newest values for these two physical quantities.

Figure 10:
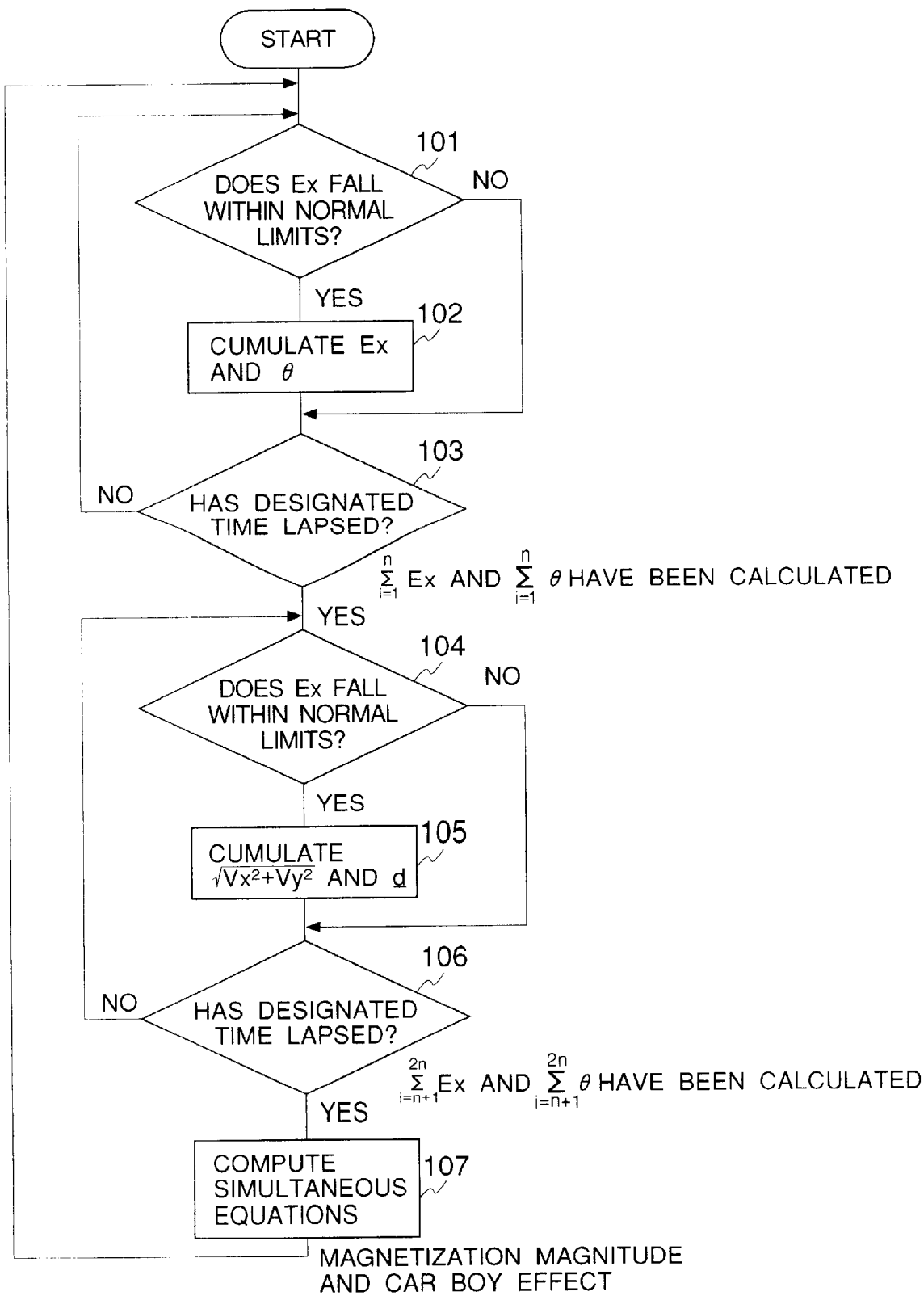
FIG. 10 is a flow chart showing a processing method in the case where azimuthal error estimation means is implemented by an averaging process.

Next, an example of the process of the azimuthal error estimation means 108 accepting the output from the geomagnetism sensor 134 will be explained in conjunction with a flow chart of FIG. 10. The error of the geomagnetism sensor 134 is estimated by the process similar to that of the error of the car velocity sensor 133 illustrated in FIG. 9.

When the mobile object passes on or near a railway or an iron bridge, noise of high level develops in the geomagnetism sensor 134 on account of the magnetic influence of the railway or iron bridge.

On the other hand, when the magnitude of a geomagnetic field is computed ideally from the geomagnetism sensor output and the offset magnetization, the relationship shown in FIG. 78 ought to hold true.

Here, the magnitude M ought to become equal to about 30 [microteslas] in Japan. Accordingly, when the magnitude of the computed geomagnetic field deviates from the magnitude M by a certain specified value or more, the corresponding geomagnetism sensor output may be regarded as the abnormal value. In this embodiment, a predetermined value is set as the threshold value of the geomagnetism sensor output, and any output value of or above the threshold value is eliminated as the abnormal value (step 101 in FIG. 10).

The error factors of the geomagnetism sensor 134 are the offset magnetization, the car body effect and the measurement noise as stated in Embodiment 1. The components of the geomagnetism sensor output are independent in the X-axial direction and Y-axial direction, and only a method of estimating the X-axial components of the offset magnetization and car body effect shall be explained below. A similar process may also be executed for the Y-axial components.

The offset magnetization and the car body effect hardly change over a short time period. Besides, since the measurement noise is basically random, the average value thereof is assumed to be 0 (null). The measurement errors of the geomagnetism sensor output are relieved through an averaging process for a predetermined time period by utilizing the above properties. More specifically, while any abnormal value is being eliminated at the step 101, the averaging process is executed using the other geomagnetism sensor outputs. Then, the geomagnetism sensor output model of this navigation system becomes as the equation shown in FIG. 79 (steps 102 and 103).

Incidentally, an averaging process on the right-hand side of the equation shown in FIG. 79 utilizes the velocity outputs which correspond to the positional change of the car and which are calculated by the GPS receiver 131. In addition, a function "arctan" expressive of an azimuth as is contained in the right-hand side of the equation shown in FIG. 79 may well be replaced with an azimuth which is obtained by cumulating the angular velocity outputs of the gyro sensor 132 for the time period of the averaging process.

The equation shown in FIG. 79 contains the two unknown numbers of the offset magnetization and the car body effect. In order to form simultaneous equations, the summation of the outputs of the geomagnetism sensor 134 is computed while the abnormal values in the sensor outputs are being eliminated (step 104) by processing the sensor outputs at a different time in the above way for a predetermined time period. Thus, the equation shown in FIG. 80 is obtained (steps 105 and 106).

Here, when the equations shown in FIGS. 79 and 80 are solved as the simultaneous equations, the X components "Rx" and "Mx" of the offset magnetization and car body effect of the geomagnetism sensor 134 can be obtained, respectively (step 107).

On the other hand, the Y components "Ry" and "My" of the offset magnetization and car body effect can be obtained by executing a process similar to the above in relation to the Y components, respectively.

Over a long term, the offset magnetization and car body effect of the geomagnetism sensor 134 fluctuate. Therefore, the above series of processing steps are iterated every certain time interval.

In this embodiment, the error factors of the car velocity sensor 133 and geomagnetism sensor 134 are respectively computed by the averaging processes from which the abnormal values have been eliminated, by utilizing the velocity outputs delivered from the GPS receiver 131. Thus, the scale factor error and bias of the car velocity sensor 133 and the offset magnetization and car body effect of the geomagnetism sensor 134 can be respectively calculated by the simple computations. When the respective sensor outputs are corrected using the calculated error factors, the position of the car being the mobile object can be accurately determined.

Embodiment 4

This embodiment consists in the application of the fourth expedient of the present invention. According to the navigation system of this embodiment, in a car on which the navigation system is installed, the attitude of a directional antenna which is attached to the car so as to receive a radio wave signal from an ground station or a satellite station is controlled, thereby enhancing the function of the navigation system for receiving the radio wave signal.

Figure 11:
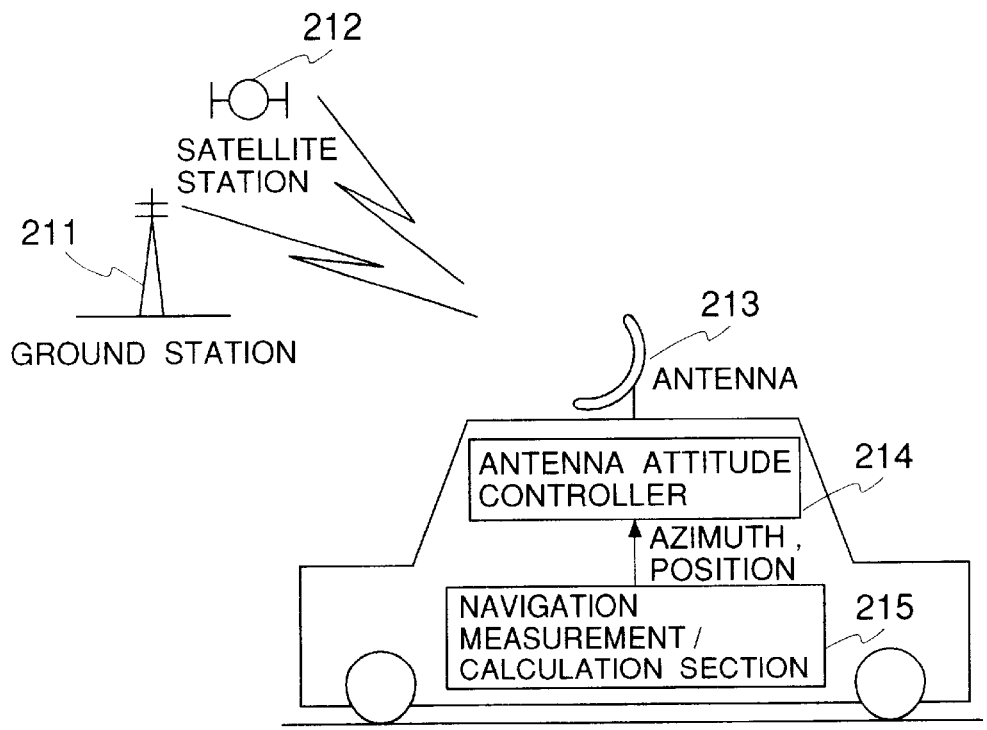
FIG. 11 is an explanatory diagram showing the construction of one embodiment which includes an antenna attitude controller having the present invention applied thereto.

As illustrated in FIG. 11, this embodiment comprises the directional antenna 213 which is mounted on the car and which receives the radio wave from the ground station 211 or satellite station 212. Further, it comprises a navigation measurement/calculation section 215 which measures the traveling situation of the car and calculates the position and azimuth thereof and which has a construction as explained in Embodiment 1 by way of example, and an antenna attitude controller 214 which controls the attitude of the antenna 213 by the use of the calculated position and traveling azimuth.

Here, the radio wave signal to be received by the antenna 213 may be a signal required for navigation processing, such as a radio wave signal sent from a GPS satellite. Alternatively, it may well be a TV (television) wave signal in, e. g., satellite broadcasting or TV broadcasting.

The antenna attitude controller 214 has a construction capable of adjusting a rotation within a horizontal plane and an elevation angle, namely, a wave angle. In a case where the transmitting station 211 or 212 is far and where the azimuth thereof as viewed on the ground is known, the antenna attitude controller 214 accepts the outputs from the navigation measurement/calculation section 215 and rotates the antenna 213 so as to compensate for the turning motion of the car. Thus, the antenna 213 is normally directed toward the transmitting station 211 or 212.

Besides, in a case where the position of the transmitting station 211 or 212 is known, the attitude of the antenna 213 to be assumed is computed from the current position of the car and the position of the transmitting station 211 or 212 by the navigation measurement/calculation section 215, and the antenna 213 is brought into the computed attitude by the antenna attitude controller 214. Concretely, letting (x, y, z) denote a vector which indicates the azimuth from the car to the transmitting station as computed from the current position of the car and the position of the transmitting station, the horizontal azimuth and elevation angle to be assumed by the antenna 213 are respectively calculated by the equations shown in FIGS. 81 and 82.

In this embodiment, the attitude of the antenna 213 is controlled by iterating the computations every predetermined interval.

As explained above, according to this embodiment, the attitude of the antenna 213 can be controlled using the azimuth and position obtained for the purpose of navigation, and the reception state thereof can be normally held favorable in spite of the movements of the car.

Embodiment 5

This embodiment exemplifies the application of the second expedient of the present invention, and consists in a navigation system, in which a velocity output from a GPS receiver 131 (in FIG. 13) is utilized for azimuth measurement means.

The construction of this embodiment is such that the geomagnetism sensor 134 being the azimuth measurement means is omitted from the construction illustrated in FIG. 13. Accordingly, sensors included in a measurement unit 100 (in FIG. 1) in this embodiment are the GPS receiver 131, car velocity sensor 133 and gyro sensor 132. In addition, the remaining construction of this embodiment is substantially the same as that of Embodiment 1.

In a case where the GPS receiver 131 is capable of receiving signals from four or more GPS satellites, it can measure the position and velocity of a mobile object by the single-point location. When the velocity output measured by the GPS receiver 131 (the "GPS velocity output") is utilized, the traveling azimuth of the car can be calculated as the equation shown in FIG. 83.

In this embodiment, the position of the car and the errors of the sensors are calculated by a Kalman filter by utilizing the traveling azimuth based on the GPS velocity output. State variables to-be-estimated are given by the equation shown in FIG. 84.

A state equation is formed from the GPS error model, car velocity sensor error model and gyro sensor error model which have been explained in Embodiment 1.

On condition that the GPS signals from the four or more GPS satellites are receivable, observed variables are given by the equation shown in FIG. 85.

If only the GPS signals from at most three GPS satellites are receivable, the GPS azimuth cannot be obtained. Therefore, the number of degrees of the observed variables decreases.

The locator 135 in this embodiment includes the Kalman filter which is such that the geomagnetism sensor error model 516 and the geomagnetism sensor output model 511 are omitted from the block arrangement (refer to FIG. 5) of the locator 135 in Embodiment 1.

An observational equation is formed from the GPS output model, car velocity sensor output model and gyro sensor output model which have been explained in Embodiment 1.

Figure 12:
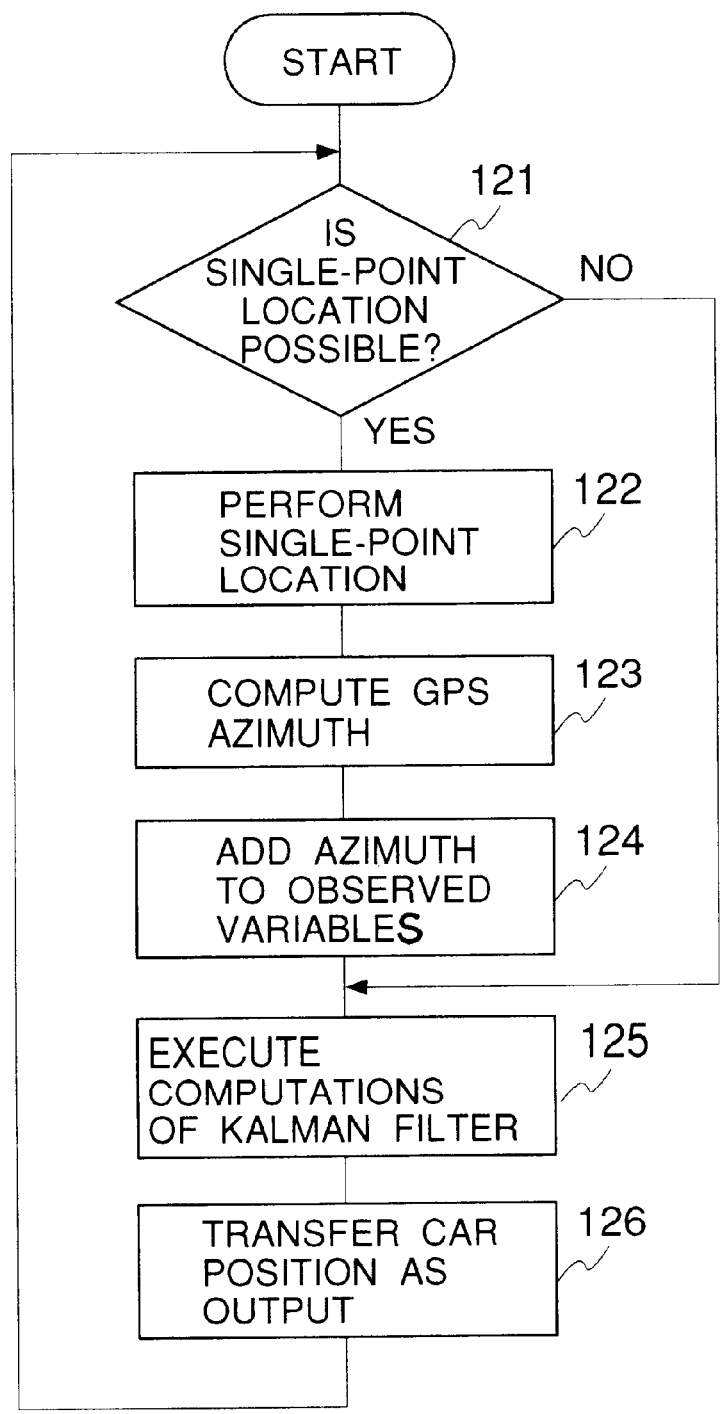
FIG. 12 is a flow chart showing the processing method of one embodiment which utilizes an azimuth calculated from a GPS signal.

An example of processing steps in this embodiment will be explained in conjunction with a flow chart shown in FIG. 12.

First, the received signals of the GPS receiver 131 are accepted to judge if the GPS satellites from which the GPS signals are receivable number at least four, so the single-point location is possible (step 121). In a case where the single-point location is possible, the GPS azimuth defined by the equation shown in FIG. 83 is computed (steps 122 and 123). Further, the GPS azimuth is added to the observed variables (step 124).

Subsequently, that computational process of the Kalman filter in this embodiment in which the geomagnetism sensor error model and the geomagnetism sensor output model have been omitted is executed in the same manner as in Embodiment 1 (step 125). The position of the car thus obtained is displayed (step 126).

In a case where the single-point location has been judged impossible at the step 121, the GPS receiver 131 functions as the range measurement means 101 (refer to FIG. 1) in Embodiment 1. In this case, the position of the car is calculated by the Kalman filter by the use of the range signal and range rate signal sent from at least one GPS satellite.

The GPS receiver 131 is normally measuring the range signal and range rate signal. In this embodiment, the traveling azimuth can be calculated using the GPS velocity output determined by the single-point location, besides the range signals and range rate signals. Accordingly, the information items from the GPS satellites can be utilized more effectively to heighten the positioning accuracy of the navigation system.

In accordance with each of Embodiments 1 to 5, even when the single-point location which is performed using the signals from at least four GPS satellites is impossible, the position of the mobile object can be found with accuracy by the use of the signal/signals from one to three GPS satellite/satellites that is/are normally receivable.

Further, in each of Embodiments 1 to 5, the error factors of the individual measurement means are assumed, and the outputs of the respective measurement means are corrected using the errors estimated on the basis of the assumed error factors. Therefore, the position and azimuth of the mobile object can be normally determined at high accuracies without employing any high precision sensor.

Besides, in Embodiment 4, the antenna attitude is controlled using the position and azimuth of the mobile object determined from the output information items of the respective measurement means. Therefore, whenever the mobile object to which the antenna is attached moves, the favorable reception state of this antenna can be maintained.

Embodiment 6 (Embodiments 6-1 to 6-9)

There will now be described various embodiments of navigation systems to which the fifth expedient of the present invention is applied. By the way, in the ensuing embodiments, the same constituents as employed in any of Embodiments 1 to 5 shall have identical symbols assigned thereto and shall be omitted from detailed description.

Figure 32:
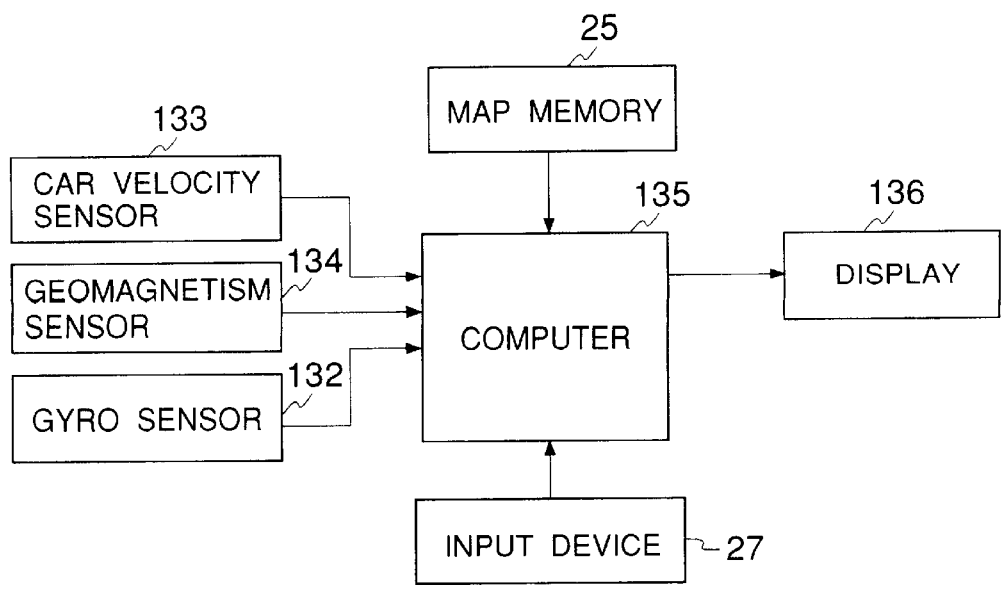
FIG. 32 is a block arrangement diagram showing the hardware architecture of a navigation system to which the present invention is applied.

As illustrated in FIG. 32, any of the ensuing embodiments comprises a car velocity sensor 133 for measuring the velocity of a mobile object, a geomagnetism sensor 134 for measuring the azimuth of the mobile object, and a gyro sensor 132 for measuring the turning angular velocity of the mobile object, and also a locator 135 in which processes to be explained below are performed using the output signals from the sensors 132, 133 and 134, thereby calculating the position of the mobile object.

Here, the sensors 132, 133 and 134 realize the measurement unit 100 in Embodiment 1 that measure the predetermined physical quantities concerning the motion of the mobile object, while the locator 135 realizes the signal processing unit 110 in Embodiment 1.

Further, any of the ensuing embodiments comprises a map memory 25 which stores map data therein, a display device 136 on which the position of the mobile object calculated by the locator 135 is displayed on a map read out of the map memory 25, and an input device 27 through which the initial position of the mobile object, etc. are entered.

In the block arrangement shown in FIG. 32, the geomagnetism sensor 134 and the gyro sensor 132 are employed as azimuth sensors, and the car velocity sensor 134 as a velocity sensor.

The map memory 25 stores the road map data of predetermined limits therein beforehand. Concrete examples usable as this map memory 25 are a semiconductor memory, a cassette tape, a CD-ROM (Compact Disk as Read Only Memory), an IC (Integrated Circuit) memory, and a DAT (Digital Audio Tape).

The display device 136 is basically the same as employed in any of the foregoing embodiments. More specifically, this display device 136 includes a CRT (Cathode-Ray Tube), a liquid-crystal display panel, or the like, and it displays the position of a vehicle being the mobile object on the road map of a region where the vehicle is traveling.

The locator 135 calculates the traveling azimuth of the vehicle from the output data of the geomagnetism sensor 134 and gyro sensor 132, and it also calculates the position of the vehicle from the calculated traveling azimuth and the output of the car velocity sensor 133. The locator 135 further includes a graphics processor, an image processing memory, or the like so as to control the operation of the display device 136. By way of example, it searches for the map region which is to be displayed by the display device 136, changes-over the reduced scales of the map, scrolls a displayed area, and causes the display device 136 to indicate the position of the vehicle.

The input device 27 includes a keyboard, a joystick, or the like, with which the operator of the navigation system can enter the initial position of the vehicle. This input device 27 may well have a construction which accepts, not only the initial position, but also other instructions from the operator relevant to navigation processing.

The fundamental processing operation which is common to the ensuing embodiments applying the fifth expedient of the present invention, will be explained in conjunction with a flow chart of FIG. 29.

First, the navigation system is initialized (step 200). Here, in a case where a Kalman filter is adopted as the filter process means of the locator 135 as will be stated later, it is also initialized. When the current spot of the mobile object is set through the input device such as keyboard 27 (step 202), it is displayed along with the surrounding map thereof on the display device 136 (step 204).

Subsequently, interrupts at steps 208 et seq. are allowed at a step 206, and the succeeding main loop is begun. In the main loop, the current position of the vehicle is obtained by integrating the traveling amount of every unit traveling distance and then adding such traveling amounts, and the map surrounding the obtained current spot is updated.

More specifically, the new vehicle position is computed by the interrupt process for calculating the traveling azimuth of the vehicle (step 208) and the interrupt process for integrating the traveling vector of the vehicle (step 210). Subject to the judgement that the vehicle position has moved ("YES" at a step 212), the current position of the vehicle and the surrounding map are updated (step 214).

In the interrupt process for the traveling azimuth calculation (step 208), the outputs from the sensors 134 and 132 for measuring the azimuth are loaded, and the azimuth is calculated by a filter process which is performed in the locator 135. The concrete operation of the step 208 will be explained in Embodiment 6-1 in which the Kalman filter is employed as the filter process means.

Figure 31:
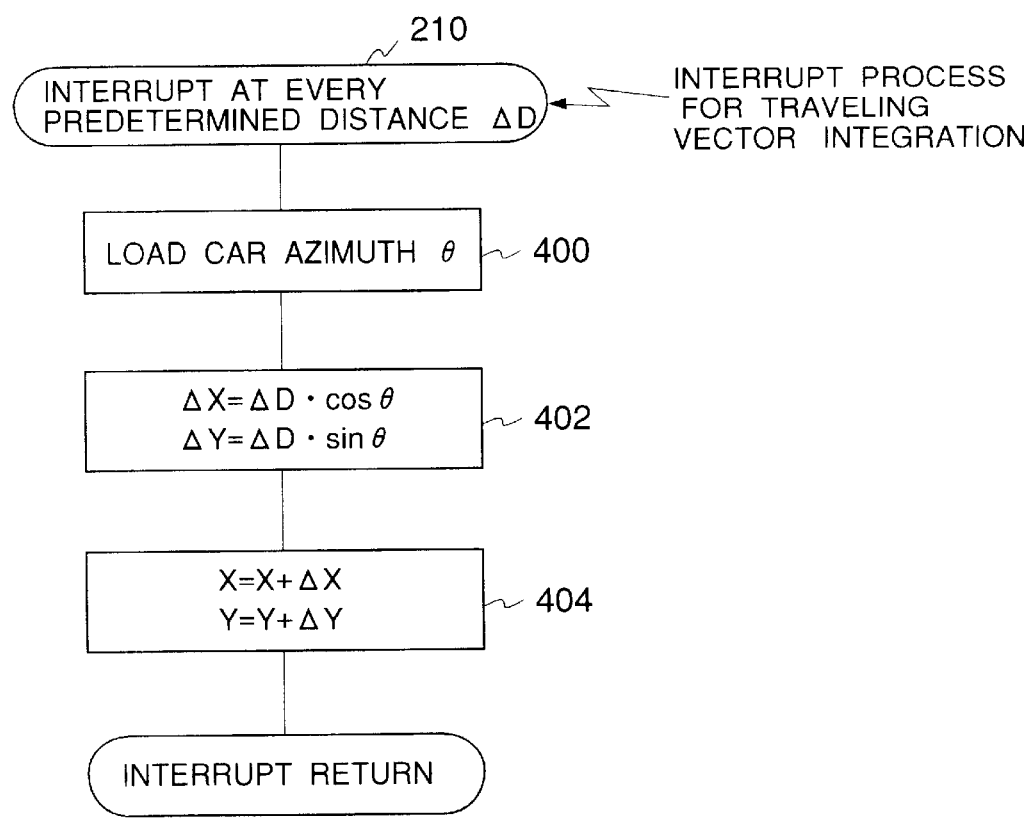
FIG. 31 is a flow chart showing a traveling vector integration interrupt process which is included in the processing flow of FIG. 29.

The steps of the interrupt process for the traveling vector integration (step 210) will now be explained with reference to FIG. 31. This process is performed each time the vehicle travels a predetermined distance $\Delta D$. The vehicle azimuth $\theta$ is loaded at the step 400. This vehicle azimuth $\theta$ is the traveling azimuth which has been calculated and stored by the process of the step 208 shown in FIG. 29.

The x-directional component $\Delta X$ and y-directional component $\Delta Y$ of the distance $\Delta D$ are calculated using the vehicle azimuth $\theta$ (step 402). Lastly, the calculated components $\Delta X$ and $\Delta Y$ are respectively added to the x-directional integral distance $X$ and y-directional integral distance $Y$ of the integrated traveling amount, thereby updating the integral distance of the vehicle (step 404).

Figure 29:
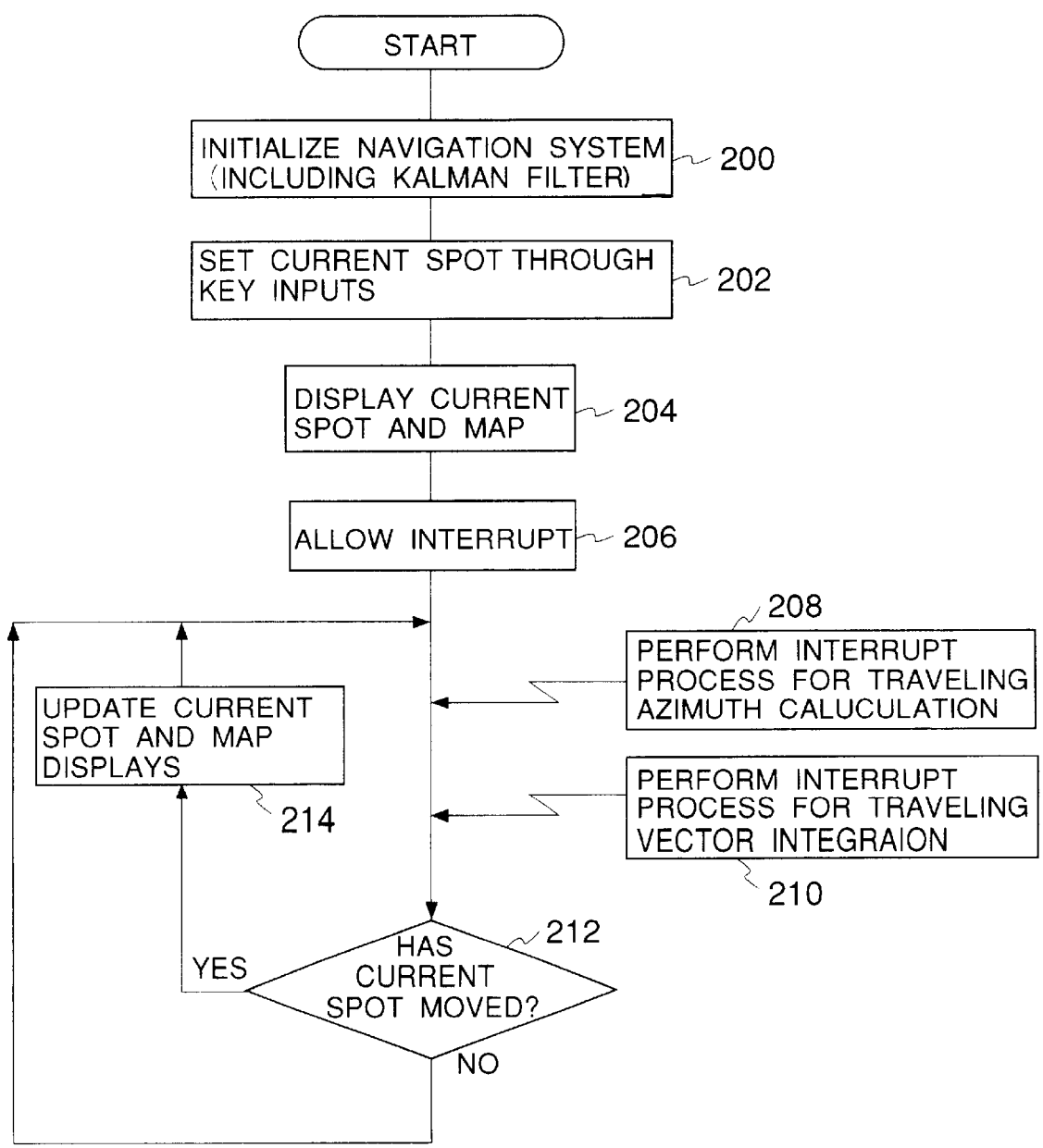
FIG. 29 is a flow chart for explaining the processing flow of a vehicular navigation system to which the present invention is applied.

Upon the completion of the above process, a coordinate position which has been calculated by the newest x-directional cumulation substep and y-directional cumulation substep is determined as the current position of the vehicle by the process shown in FIG. 29.

Figure 15:
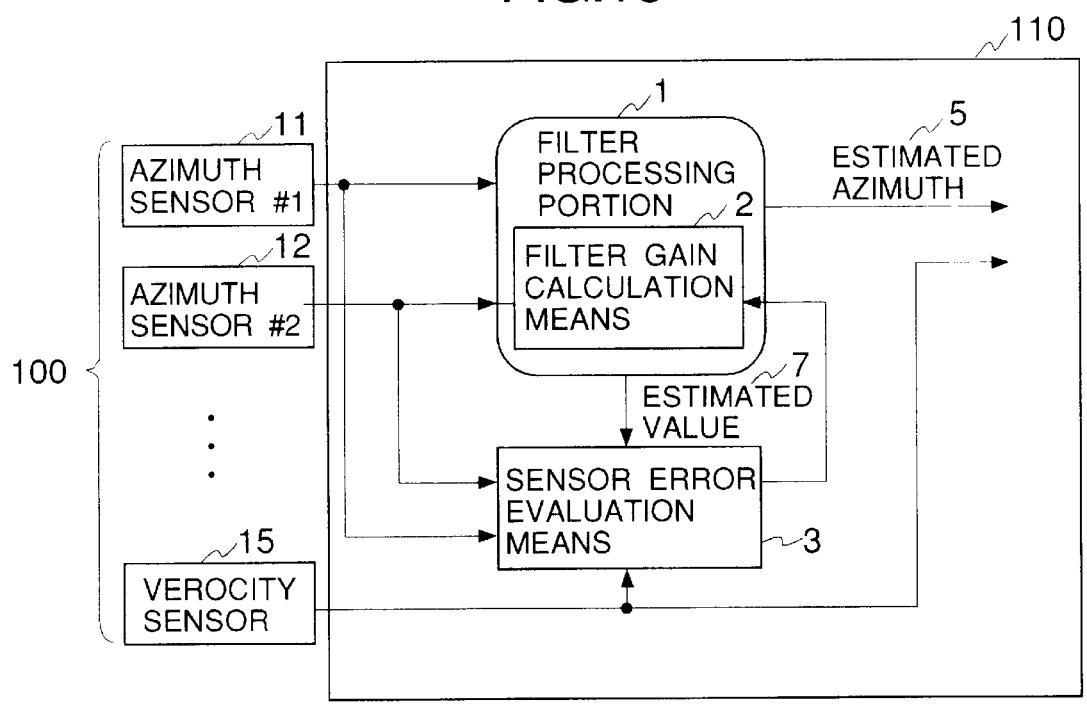
FIG. 15 is a block arrangement diagram showing a basic architecture which features the navigation system of the present invention.

Examples of functional block arrangements which feature the navigation systems in the ensuing embodiments applying the fifth expedient of the present invention, will be explained with reference to FIGS. 15, 16 and 17. The practicable embodiments to be described later have constructions in which the functional block arrangements are combined.

The first example of the functional block arrangement employs a filter processing portion 1 for the estimation of an azimuth. According to this example, as shown in FIG. 15, the locator 135 (refer to FIG. 32) of the navigation system includes the filter processing portion 1 which produces the outputs of the estimated azimuth 5 and an estimated value 7 containing the azimuth, filter gain calculation means 2 for determining a filter gain in the filter processing portion 1, a plurality of azimuth sensors 11 (azimuth sensor #1), 12 (azimuth sensor #2) . . . each of which detects the azimuth, and sensor error evaluation means 3 for evaluating the error of a velocity sensor 15 which detects a velocity. Here, the azimuth sensors 11 and 12 correspond to, for example, the geomagnetism sensor 134 and gyro sensor 132 in FIG. 32, respectively, while the velocity sensor 15 corresponds to, for example, the car velocity sensor 133.

In this example of the block arrangement, the filter processing portion 1 calculates the estimated azimuth 5 by the use of sensor signals delivered from the azimuth sensors 11, 12 . . . . The traveling position of the mobile object, that is the current position of the vehicle is calculated from the output 5 of the filter processing portion 1, and velocity data delivered from the velocity sensor 15 in synchronism with the output 5.

Besides, in this example, the sensor error evaluation means 3 accepts at least one input among the azimuth data, the velocity data, and the estimated value 7 of the filter output so as to evaluate the measurement errors of the azimuth sensors 11 and 12. Further, this example calculates the filter gain on the basis of the output of the sensor error evaluation means 3 by the filter gain calculation means 2, thereby enhancing the accuracy of the estimated azimuth 5 which is finally output.

Figure 16:
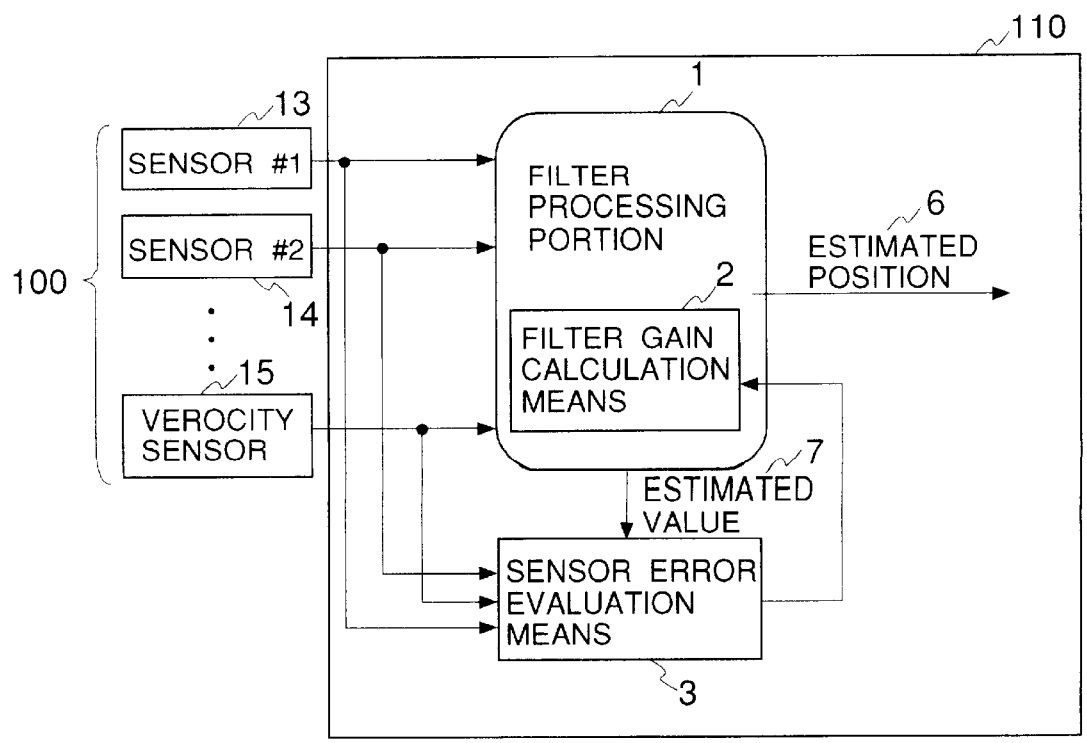
FIG. 16 is a block arrangement diagram showing another basic architecture which features the navigation system of the present invention.

FIG. 16 illustrates a featuring part in the second example of the functional block arrangement for the embodiments to which the fifth expedient of the present invention is applied. This example employs a filter processing portion 1 in order to obtain an estimated position 6. Unlike the preceding example (refer to FIG. 15) in which the constituent sensors 11, 12 . . . are restricted to the azimuth sensors, this example shown in FIG. 16 includes sensors 13 (sensor #1), 14 (sensor #2) . . . each of which measures any desired physical quantity other than a velocity which represents the motion of the mobile object.

In this example of the block arrangement, the filter processing portion 1 estimates the current position of the mobile object by the use of its inputs of the data of the desired physical quantities measured by the sensors 13, 14 . . . , and the velocity data of a velocity sensor 15, and it delivers the estimated result as the estimated position 6. This estimated position 6 is used as the current position of the vehicle in the navigation processing explained before.

In this example, sensor error evaluation means 3 accepts at least one input among the data from the sensors 13, 14 . . . , the velocity data, and an estimated value 7 from the filter processing portion 1 so as to evaluate the errors of the sensors 13, 14 . . . . In addition, this example calculates the filter gain of the filter processing portion 1 on the basis of the output of the sensor error evaluation means 3 by filter gain calculation means 2, thereby enhancing the accuracy of the estimated position 6 which is finally output.

Figure 17:
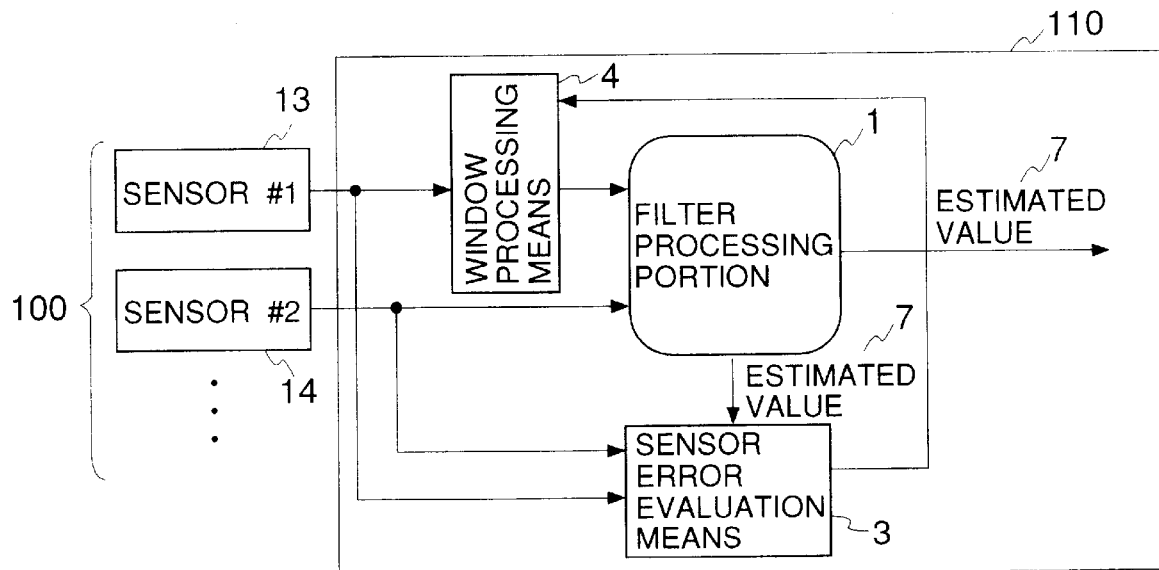
FIG. 17 is a block arrangement diagram showing still another basic architecture which features the navigation system of the present invention.

FIG. 17 illustrates a featuring part in the third example of the functional block arrangement for the embodiments to which the fifth expedient of the present invention is applied. This example estimates any desired physical quantities concerning the motion of the mobile object, by the use of a filter processing portion 1.

This example of the block arrangement comprises sensors 13 (sensor #1), 14 (sensor #2) . . . each of which measures any desired physical quantity involved in the motion of the mobile object, the filter processing portion 1 in which estimated values 7 relevant to the predetermined physical quantities such as an azimuth and a position are calculated using output signals from the sensors 13, 14 . . . , sensor error evaluation means 3 for accepting at least one input among the data of the respective sensors and the estimated values 7 of the filter processing portion 1 so as to evaluate the errors of these sensors, and window processing means 4 for excluding any abnormal value in the sensor outputs on the basis of the output of the sensor error evaluation means 3.

Owing to this example, the accuracy of the estimated value 7 to be finally output is enhanced.

In accordance with the fifth expedient of the present invention, the errors of the output signals from the various sorts of sensors included in the navigation system can be corrected and reduced by resorting to any of the functional block arrangements as stated above. Unlike the correction of the final stage, for example, the error correction of a map matching method in a vehicular navigation system, the effect of the error reduction prevents a similar error from developing again immediately after the correction.

Accordingly, the fifth expedient of the present invention becomes equivalent to employing sensors of high precision and can enhance the reliability of the whole system.

Usable as the sensors 13, 14 . . . which constitute the examples of the block arrangements shown in FIGS. 16 and 17 are the azimuth sensor and velocity sensor explained before, and the range measurement means 101 or position measurement means 201 employed in Embodiments 1 to 5. In the ensuing embodiments, the GPS receiver 131 employed in the foregoing embodiments shall be used.

Embodiment 6-1

Figure 18:
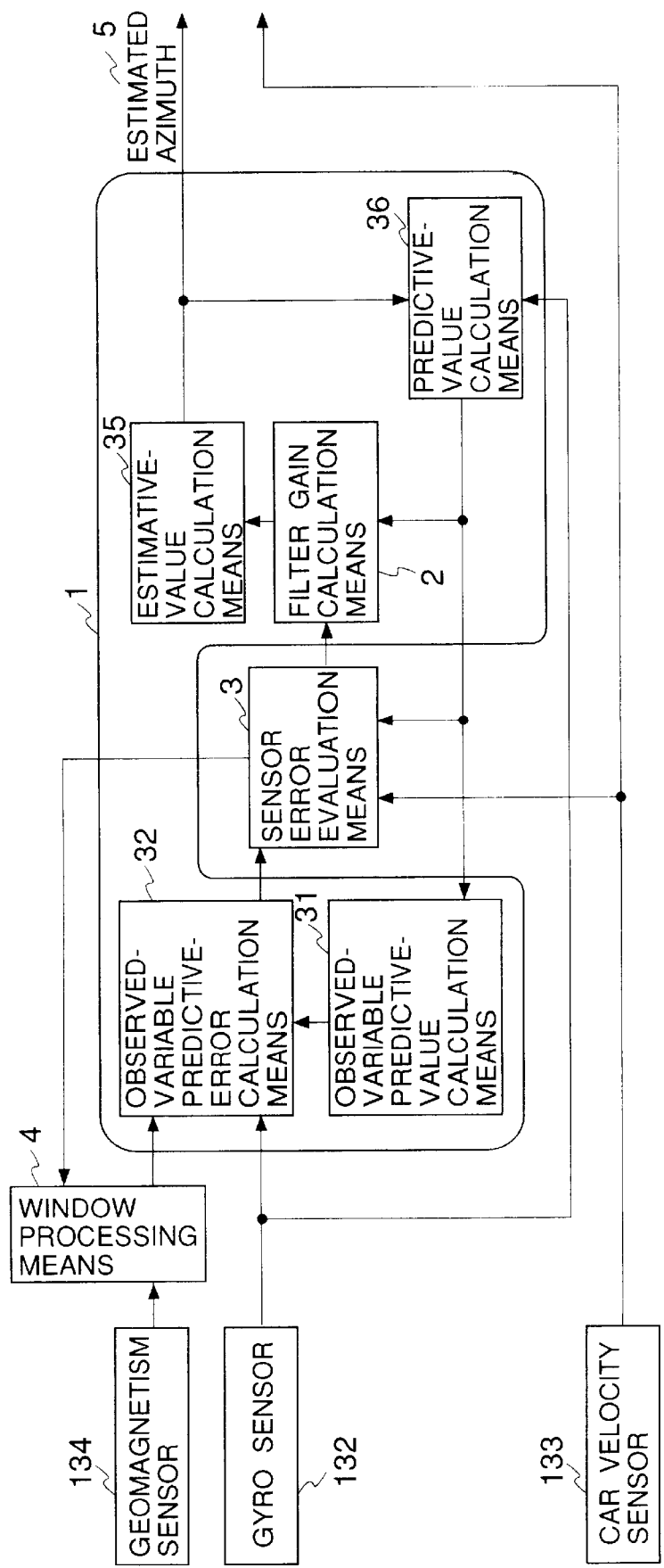
FIG. 18 is a block arrangement diagram showing that construction of one embodiment of the present invention in which the system architectures depicted in FIG. 15 and FIG. 17 are combined, and in which a Kalman filter process is applied to the detection of a traveling azimuth.

This embodiment has a construction which is illustrated in FIG. 18. It is a navigation system in which the featuring parts shown in FIGS. 15 and 17 are combined, and in which the filter processing portion 1 is implemented by a Kalman filter processing portion.

The hardware architecture of this embodiment is the same as the block arrangement in FIG. 32 referred to before. Here in this embodiment, the geomagnetism sensor 134 and the gyro sensor 132 are used as azimuth sensors, while the car velocity sensor 133 is used as a velocity sensor.

In the filter processing portion 1 (refer to FIG. 18) which is included in the locator 135 and which adopts a Kalman filter process, the relationships among the temporal changes of quantities to-be-estimated (state variables), state variables, and quantities measurable as sensor outputs (observed variables) need to be modeled.

In the ensuing description, the Kalman filter process in this embodiment shall first model the temporal changes of the state variables to-be-estimated which are set to consist of a traveling azimuth and the error factors of the employed azimuth sensors that are important in car navigation processing. It shall subsequently express the relationships between the observed variables and the state variables as a model.

The main error factors of the geomagnetism sensor 134 are the offset magnetization and $\mu$ (mu) effect of the body of a car (hereinbelow, the $\mu$ effect shall be termed the "car body effect"). The behavior of these error factors can be modeled by the geomagnetism sensor error model defined in Embodiment 1. Concretely, they are modeled using the equations shown in FIGS. 47 to 50 mentioned before.

Besides, one of the error factors of the gyro sensor 132 is an angular velocity bias, which can be modeled by the gyro sensor error model defined by the use of the equations shown in FIG. 42 in Embodiment 1.

The models of two Kalman filters (a state equation and an observational equation) will be explained. The state variables x of the Kalman filter for estimating the azimuth (hereinbelow, called the "azimuth estimating Kalman filter") are assumed to be defined by the equation shown in FIG. 64.

In addition, the state equation is set as shown in FIG. 86.

Here, system noise v(k) corresponds to the errors of the state variables attributed to the modeling of equations shown in FIG. 86.

The observational equation can be expressed by the equations shown in FIGS. 70, 71 and 72.

These equations can be put together as shown in FIG. 55.

Here, the observed variables y are given by the equation shown in FIG. 87, and measurement noise w becomes the equation shown in FIG. 88.

Here, in a case where the car body effect is not very influential as the error factor of the geomagnetism sensor 134, a simple method in which the components Rx and Ry expressive of the car body effect are denoted by a single state variable (estimative quantity) may well be resorted to.

The Kalman filter computes the above-mentioned state equation and observational equation so as to estimate the traveling azimuth of the car. Since the observational equation computed here is nonlinear, the algorithm of an expanded Kalman filter is applied. As in Embodiment 1, the expanded Kalman filter is given by the recursion formulae defined before and shown in FIGS. 58 to 63.

The Kalman filter calculates the optimal estimative values x(k|k) and predictive values x(k|k−1) of the state variables x(k), and estimative-error covariance matrices P(k|k) and P(k|k−1) corresponding to the values x(k|k) and x(k|k−1), respectively. In the equations shown in FIGS. 58 to 63, letter V denotes the covariance matrix of the system noise v, and letter W that of the observed noise w. Letter H denotes a Jacobian determinant in the predictive values x(k|k−1) of the function h. Incidentally, the repetitive operations of the Kalman filter have the form of the recursion formulae, and they can be easily implemented by computer software.

The estimation of the azimuth is done by utilizing the above algorithm of the expanded Kalman filter. The processing steps of the azimuth estimation will be explained in conjunction with the block diagram of FIG. 18 and a flow chart of FIG. 34. By the way, the determination of the position based on this embodiment is done in accordance with the flow chart of FIG. 29 referred to before.

First of all, in the initialization (step 200 in FIG. 29), the initial values of the predictive values and those of the error covariance matrices are set as indicated by the equation shown in FIG. 58. Thereafter, the flow enters the interrupt process (step 208 in FIG. 29) for calculating the traveling azimuth every predetermined time.

Figure 34:
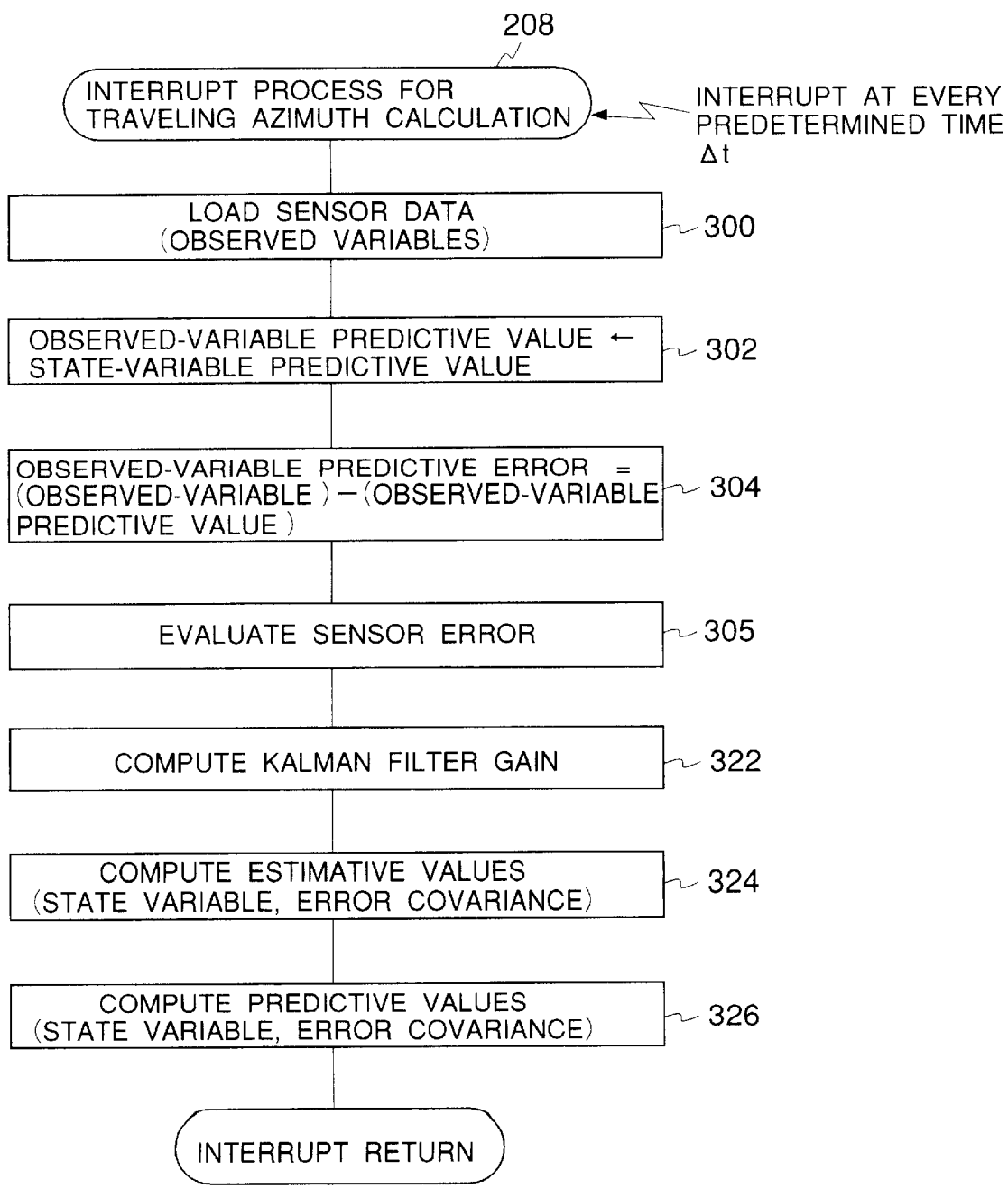
FIG. 34 is a flow chart showing the traveling azimuth calculation interrupt process which is included in the processing flow of FIG. 29.

This step 208 uses functional means shown in FIG. 18, and determines the azimuth in accordance with the flow shown in FIG. 34.

First, the measured data (observed variable) of each sensor is loaded (step 300). Subsequently, the predictive value of the observed variable is calculated by observed-variable predictive-value calculation means 31 by substituting the predictive value of the state variable into the aforementioned observational equation (step 302). Further, the predictive error of the observed variable is calculated from the difference between the calculated predictive value and the observed variable by observed-variable predictive-error calculation means 32 (step 304).

Next, the error of the sensor is evaluated using the observed-variable predictive error, the predictive value and the car velocity data by sensor error evaluation means 3 as will be explained below (step 305). Here, the observed-variable predictive error may well be replaced with the observed variable itself, and the predictive value with the estimative value.

Figure 20:
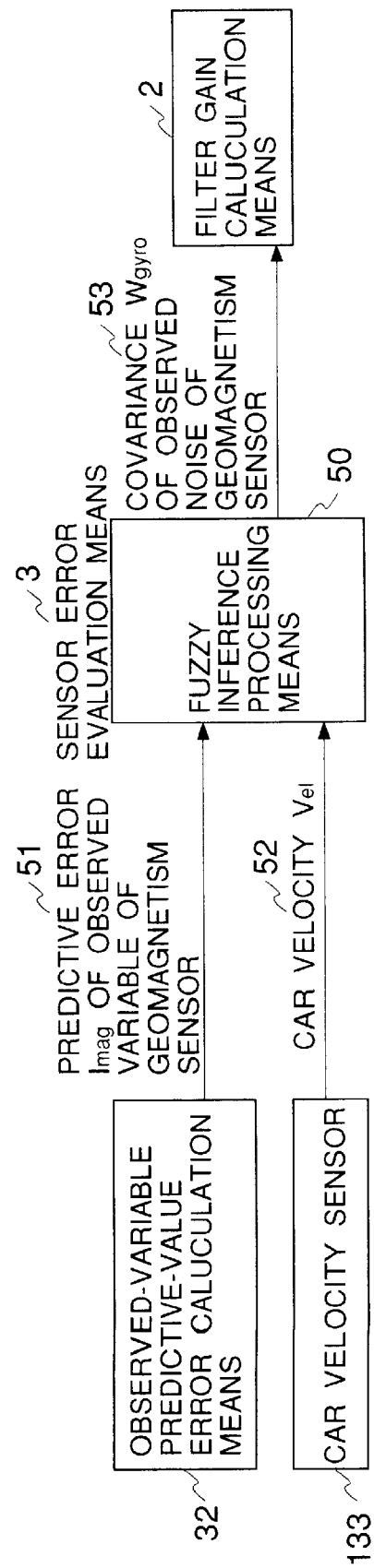
FIG. 20 is a block diagram showing an example of configuration of sensor error evaluation means included in the construction of FIG. 18.

As one example of the sensor error evaluation means 3, fuzzy inference processing means 50 as shown in FIG. 20 can be employed as the error evaluation means 3 for the geomagnetism sensor 134.

The fuzzy inference processing means 50 is supplied as its inputs with the observed-variable predictive error "Imag" 51 of the geomagnetism sensor 134 being the output of the observed-variable predictive error calculation means 32, and the output data "Vel" 52 of the car velocity sensor 133. Besides, the means 50 delivers the covariance "Wmag" 53 of the observed noise of the geomagnetism sensor 134 as its output to filter gain calculation means 2. In this case, the values of the inputs may well be the statistical magnitudes, for example the average values of the respective data items themselves, for a certain time period.

The qualitative relationships of the magnitude of the output 53 to the respective magnitudes of the inputs 51 and 52 will be expressed with a fuzzy theory below.

It is assumed that, as the input "Imag" 51 is greater, the noise of the geomagnetism sensor 134 will be higher. Therefore, the output "Wmag" 53 needs to be relatively increased. On the contrary, as the car velocity "Vel" 52 is higher, the convergent azimuth which is finally indicated by the geomagnetism sensor 134 needs to be converged at a higher velocity. Therefore, the output "Wmag" 53 needs to be relatively decreased.

Figure 21:
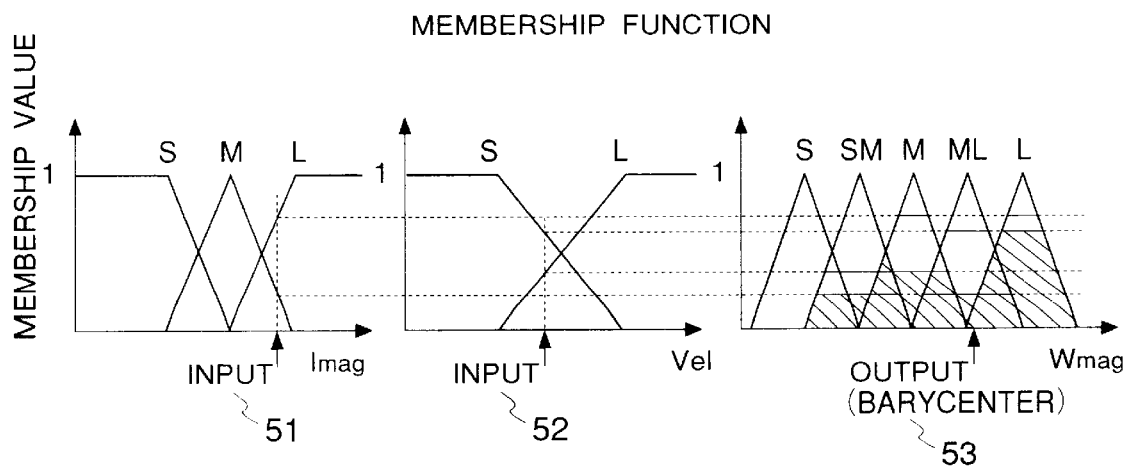
FIG. 21 is an explanatory diagram for elucidating the principle of fuzzy inference which is applied to the sensor error evaluation means depicted in FIG. 20.

The qualitative relationships are expressed as a fuzzy rule based on fuzzy labels of five stages as shown in the upper half of FIG. 21, and the fuzzy rule is quantized using membership functions as shown in the lower half of the figure. In the case of employing the MAX-MIN composite barycenter method as a fuzzy inference method by way of example, the output value 53 versus the respective input values 51 and 52 can be found as the barycentric position (the position of the center of mass) of a hatched area as shown in the lower half of FIG. 21.

In order to reduce the volume of operations, however, the fuzzy inference processing explained above may well be realized by a table lookup method. More specifically, in the table lookup method, the above calculative operations are executed beforehand, so as to write the results thereof into the memory of the computer constituting the locator 135, and the output value corresponding to the input values as stored in the memory is thereafter read out.

In the fuzzy inference processing means 50 exemplified above, the fuzzy variables are used as both the "if" clause and "then" clause of the fuzzy rule. In order to lighten an operational load for the barycenter computation, etc., however, the fuzzy inference may well be realized by an inference method (by Kanno et al.) wherein a linear equation is applied to only the "then" clause without using the fuzzy variable.

Further, the sensor error evaluation can also be realized in such a way that, in the sensor error processing means 3, the qualitative relationships explained before are quantitatively expressed simply by a certain relational equation without employing the fuzzy theory. Examples employing different means as the sensor error evaluation means 3 will be described in Embodiment 6-2 to Embodiment 6-7 later.

Subsequently, the gain of the Kalman filter is computed from the output of the sensor error evaluation means 3 and the predictive values by the filter gain calculation means 2 (step 322 in FIG. 34, equations shown in FIG. 59). Using the computed gain, the estimative values of the state variable and error covariance are computed by estimative-value calculation means 35 shown in FIG. 18 (step 324, the equations shown in FIGS. 60 and 61). The traveling azimuth to be obtained is computed as one (estimated azimuth 5 in FIG. 18) of the estimative values, and this estimated azimuth 5 is output.

The output of the sensor error evaluation means 3 is also used as the criterion of window processing means 4 shown in FIG. 18. By way of example, it becomes possible to eliminate noise at and above a certain predetermined level in the geomagnetism sensor 134.

The predictive values (of the state variable and error covariance) after the next predetermined time period are calculated on the basis of the computed estimative values and the output data of the gyro sensor 132 by predictive-value calculation means 36 shown in FIG. 18 (step 326 in FIG. 34, the equations shown in FIGS. 62 and 63), whereupon the interrupt process is ended.

Figure 19:
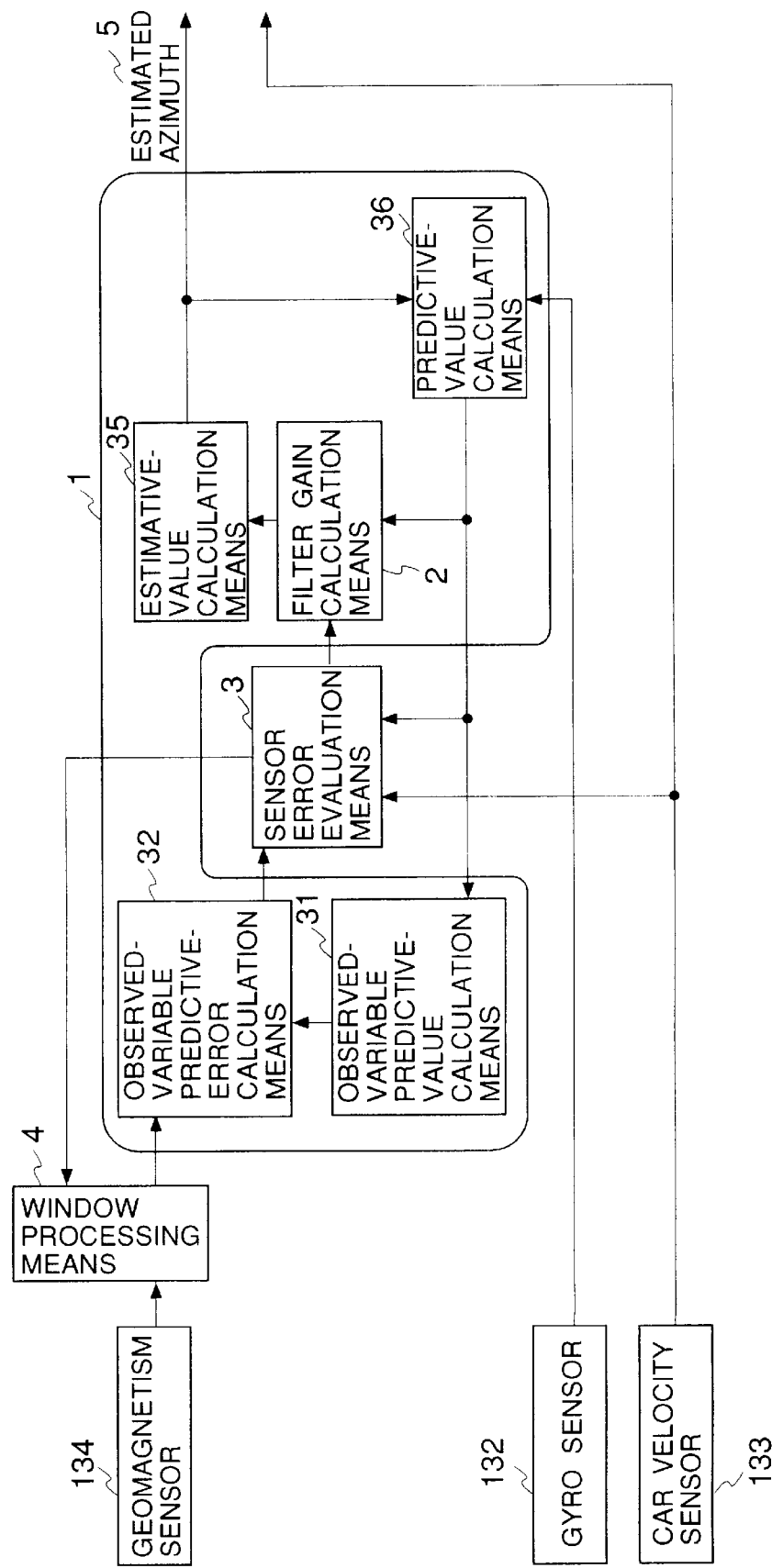
FIG. 19 is a block arrangement diagram showing the construction of one embodiment in which the construction depicted in FIG. 18 is partially altered.

This embodiment can also be modified into a block arrangement as shown in FIG. 19 in which the output of the gyro sensor 132 is used as only the azimuthal change quantity in the case of calculating the predictive values after the predetermined time period by the predictive-value calculation means 36, without being used as the observed variable.

According to this embodiment, the error of the geomagnetism sensor 134 can be appropriately evaluated by the processing steps explained above. Moreover, since the Kalman filter processing can be reasonably adapted to the evaluated result, the azimuth estimation of high accuracy is made possible.

Embodiment 6-2

This embodiment has the same construction as that of Embodiment 6-1 (refer to FIG. 32), and exemplifies an architecture including the gyro sensor 132 as the sensor which is the subject of sensor error evaluation means 3 (shown in FIG. 22 to be referred to below).

Likewise to Embodiment 6-1, this embodiment has the configuration of the functional means as shown in FIG. 18. FIG. 22 illustrates parts which are relevant to the inputs and output of the sensor error evaluation means 3 in this embodiment. Here, the fuzzy inference is applied to the error evaluation as in Embodiment 6-1.

The inputs of the sensor error processing means 3 (the fuzzy inference processing means 50) are the observed-variable predictive error "Igyro" 54 of the gyro sensor 132 being the output of the observed-variable predictive-error calculation means 32, and the output data "Vel" 52 of the car velocity sensor 133, while the output thereof to the filter gain calculation means 2 is the covariance "Wgyro" 55 of the observed noise of the gyro sensor 132. In this case, the values of the inputs 52 and 54 may well be the statistical magnitudes, for example, the average values of the respective data items themselves for a certain time period.

The qualitative relationships of the magnitude of the output 55 to the respective magnitudes of the inputs 54 and 52 will now be expressed with a fuzzy theory. It is assumed that, as the input "Igyro" 54 is greater, the noise of the gyro sensor 132 will be higher. Therefore, the output "Wgyro" 55 needs to be relatively increased. On the contrary, as the car velocity "Vel" 52 is higher, the convergent azimuth which is finally indicated by the geomagnetism sensor 134 needs to be converged at a higher velocity. Therefore, the output "Wgyro" 55 needs to be relatively increased.

The qualitative relationships are expressed as a fuzzy rule in the same manner as in FIG. 21 (the relationship of the output 55 to the car velocity data 52 becomes just reverse to the corresponding relationship in FIG. 21), and the fuzzy rule is quantized using membership functions as explained before. Then, the filter gain adapted to the actual error of the gyro sensor 132 can be selected.

Thus, according to this embodiment, the accuracy of the estimated azimuth can be heightened.

Embodiment 6-3

Figure 23:
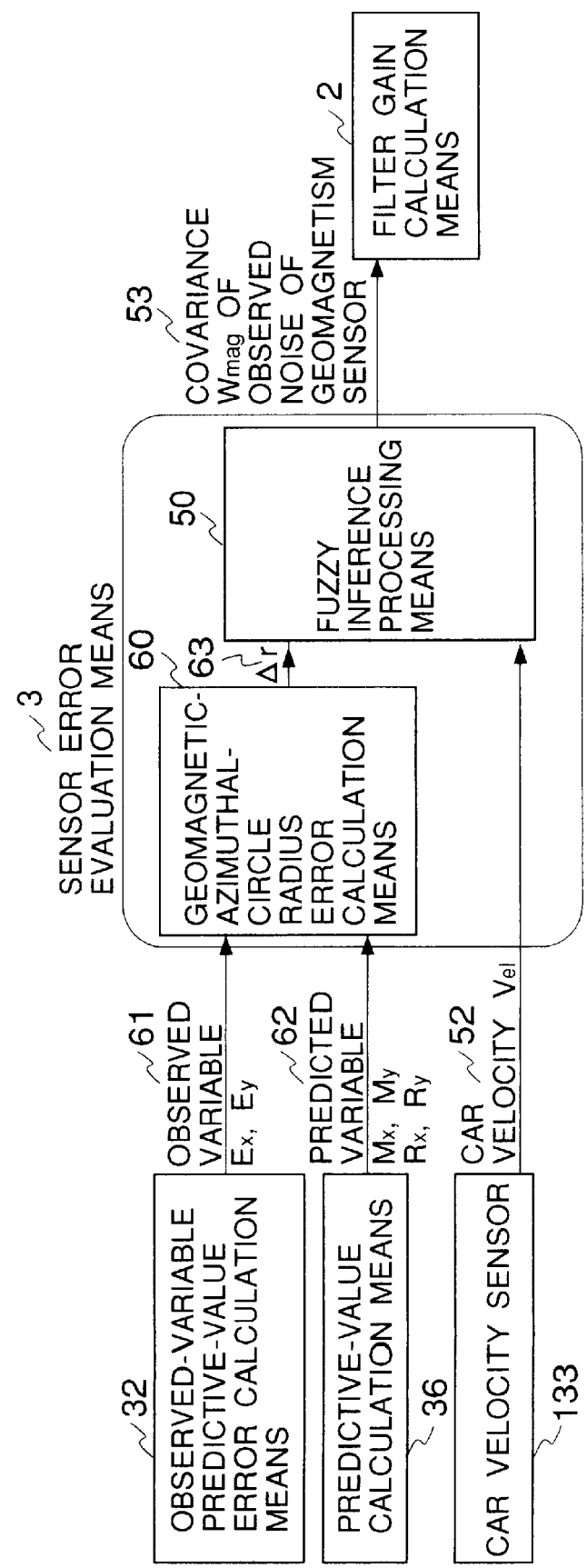
FIG. 23 is a block diagram showing still another example of configuration of the sensor error evaluation means included in the construction of FIG. 18.

This embodiment has a hardware architecture (refer to FIG. 32) and a functional block arrangement (refer to FIG. 18) which are similar to those of Embodiment 6-1. As shown in FIG. 23, however, sensor error evaluation means 3 employs fuzzy inference (processing means 50) for the evaluation of the error of the geomagnetism sensor 134, and it further includes means 60 for calculating the error of the radius of a geomagnetic azimuthal circle.

The inputs and output of the sensor error evaluation means 3 in this embodiment have relationships as illustrated in FIG. 23. The inputs employed here consist of that observed variable 61 (components "Ex" and "Ey") of the geomagnetism sensor 134 as which the input of the observed-variable predictive-error calculation means 32 is directly supplied, predictive values 62 (offset magnetization components "Mx" and "My", and car body effect components "Rx" and "Ry") which are contained in the outputs of the predictive-value calculation means 36, and the output data "Vel" 52 of the car velocity sensor 133. On the other hand, the output of the sensor error evaluation means 3 to the filter gain calculation means 2 is the covariance "Wmag" 53 of the observed noise of the geomagnetism sensor 134. In this case, the values of the inputs 61, 62 and 52 may well be the statistical magnitudes, for example, the average values of the respective data items themselves for a certain time period.

In this embodiment, the geomagnetic-azimuthal-circle radius error calculation means 60 uses the inputs of the observed variable 61 and predictive values 62 to calculate the geomagnetic-azimuthal-circle radius error "Δr" 63 in accordance with the equations shown in FIGS. 89 and 90.

Here, the equation shown in FIG. 89 obtains the error with reference to the geomagnetic-azimuthal-circle radius estimated by the Kalman filter. Besides, the equation shown in FIG. 90 is set with reference to the horizontal component of geomagnetism (30 [microteslas]) in Japan, by way of example.

The fuzzy inference as explained in Embodiment 6-1 is done using the error 63 thus calculated, and the car velocity data 52.

As in Embodiment 6-1, it is assumed that, as the geomagnetic-azimuthal-circle radius error 63 obtained in the above way is greater, the noise of the geomagnetism sensor 134 will be higher. Therefore, the output "Wmag" 53 needs to be relatively increased. On the contrary, as the car velocity "Vel" 52 is higher, the convergent azimuth which is finally indicated by the geomagnetism sensor 134 needs to be converged at a higher velocity. Therefore, the output "Wmag" 53 needs to be relatively decreased. The qualitative relationships are expressed as a fuzzy rule in the same manner as in FIG. 21, and the fuzzy rule is quantized using membership functions as explained before. Then, the estimative azimuth can be determined with a high accuracy.

It is also possible to form a fuzzy theory which is supplied as inputs with the error 63 of the geomagnetic-azimuthal-circle radius, and the predictive error "Imag" 51 of the observed variable of the geomagnetism sensor as shown in FIG. 20.

Embodiment 6-4

This embodiment is a navigation system which has the same hardware architecture (refer to FIG. 32) and functional block arrangement (refer to FIG. 18) as in Embodiment 6-1, and in which the sensor error evaluation means 3 is utilized for correcting the offset magnetization of the geomagnetism sensor 134.

Figure 24:
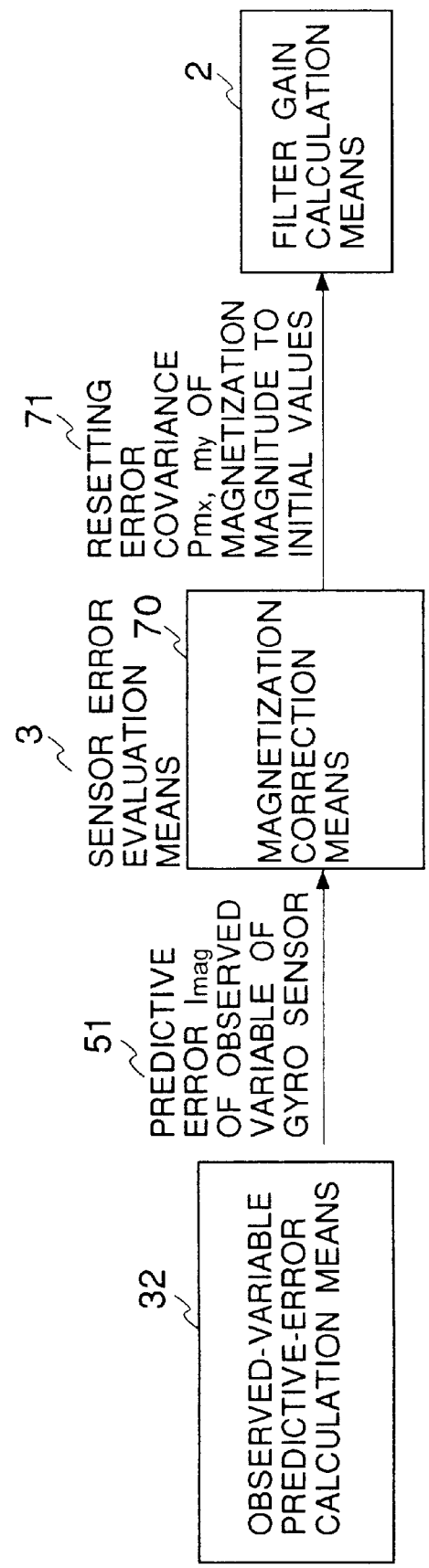
FIG. 24 is a block diagram showing yet another example of configuration of the sensor error evaluation means included in the construction of FIG. 18.

The relationship between the input and output of the sensor error evaluation means 3 in this embodiment is illustrated in FIG. 24. Here, the input to offset-magnetization correction means 70 being the sensor error evaluation means 3 is that predictive error "Imag" 51 of the observed variable of the geomagnetism sensor 134 which is the output of the observed-variable predictive-error calculation means 32. On the other hand, the output which is delivered to the filter gain calculation means 2 is produced in such a way that, when the offset magnetization magnitude has changed greatly, the diagonal term "Pmx, my" 71 of the estimative-error covariance matrix contained in the equations shown in FIGS. 58 to 63 as corresponds to the offset magnetization magnitude is reset to the initial value thereof.

The offset magnetization is the phenomenon where the car body to which the geomagnetism sensor 134 is attached magnetizes to incur a great azimuthal error. This corresponds to the fact that the center of an azimuthal circle, which is depicted by the output of the geomagnetism sensor 134, moves. In such a case, a large error also steadily develops in the observed-variable predictive error "Imag" 51 which is set as the input. Therefore, the observed-variable predictive error "Imag" 51 is detected so as to judge if the correction of the offset magnetization is necessary. That is, the offset magnetization may be corrected only in a case where the error at or above a predetermined level has continued for a certain time period.

With the Kalman filter process in Embodiment 6-1, the large change of the offset magnetization magnitude induces large estimative errors in the offset magnetization components "Mx" and "My" which are estimated as the state variable. In order to reestablish the proper estimation of the offset magnetization magnitude when the offset-magnetization correction has been judged necessary, the error covariance "Pmx, my" of the offset magnetization components may be reset to a large value (for example, the initial value) as employed for the output here in this embodiment.

Owing to the offset-magnetization correction means 70 explained above, this embodiment can detect the large change of the offset magnetization magnitude even when such a change has occurred at a railroad crossing or the like. Further, according to this embodiment, the offset magnetization magnitude can be properly estimated by the above correcting method, so the azimuth estimation of high accuracy is ensured at all times.

Moreover, this embodiment is not restricted to the diagonal term "Pmx, my" of the estimative-error covariance matrix corresponding to the offset magnetization magnitude, but it can similarly handle the diagonal term corresponding to all the other estimative magnitudes. In other words, it is also possible to employ a construction in which, when the diagonal term corresponding to all the estimative magnitudes in the error covariance matrix of the estimative values has decreased to or below a certain predetermined level, or each time a certain predetermined time interval lapses, the diagonal term is reset to a value (for example, the initial value) larger than its value on that occasion.

Embodiment 6-5

Figure 25:
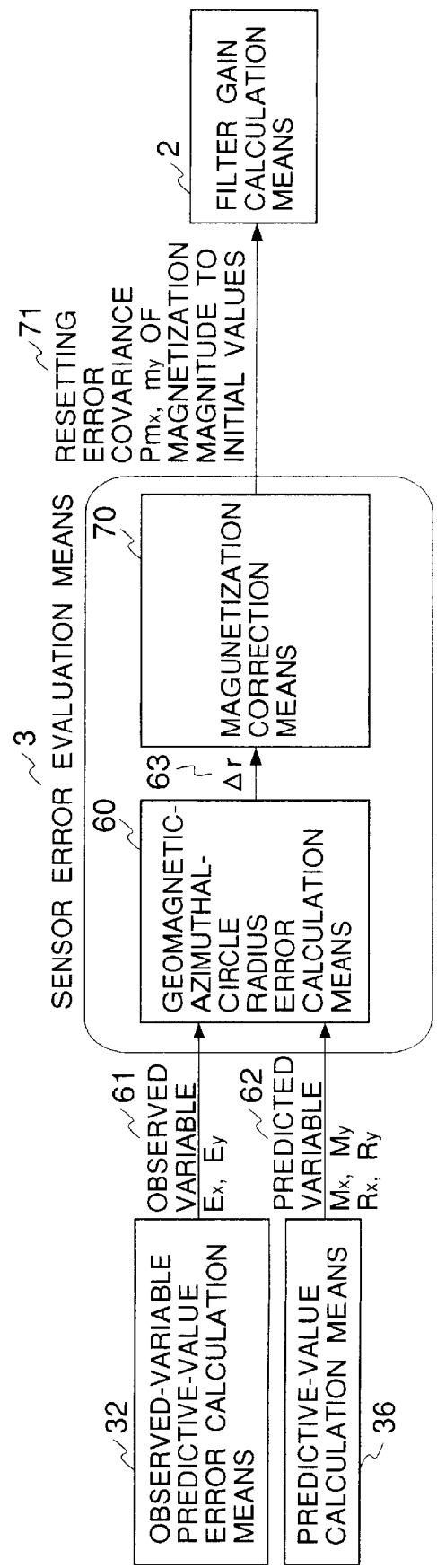
FIG. 25 is a block diagram showing a further example of configuration of the sensor error evaluation means included in the construction of FIG. 18.

This embodiment is a navigation system comprising sensor error evaluation means 3 which has input/output relationships as illustrated in FIG. 25. It is another example in which the sensor error evaluation means 3 corrects the offset magnetization as in Embodiment 6-4 (shown in FIG. 24), and the fundamental construction thereof is similar to that of Embodiment 6-4 (refer to FIGS. 18 and 32).

The point of difference of this embodiment from Embodiment 6-4 consists in detecting the change of the offset magnetization magnitude. In this embodiment, the geomagnetic-azimuthal-circle radius error calculation means 60 shown in FIG. 23 is applied for a method of detecting the change of the offset magnetization magnitude.

The offset magnetization components "Mx" and "My" come to involve large estimative errors due to the large change of the offset magnetization magnitude. Accordingly, a large error also develops in the geomagnetic-azimuthal-circle radius which is calculated using the offset magnetization components. Likewise to Embodiment 6-4, this embodiment corrects the offset magnetization upon detecting the fact that the error of the aforementioned radius at or above a predetermined level continues for a certain time period.

Either equations shown in FIG. 89 or equations shown in FIG. 90 may be employed for calculating the error 63 of the geomagnetic-azimuthal-circle radius. According to this embodiment, effects similar to those of Embodiment 6-4 can be expected.

Embodiment 6-6

Figure 26:
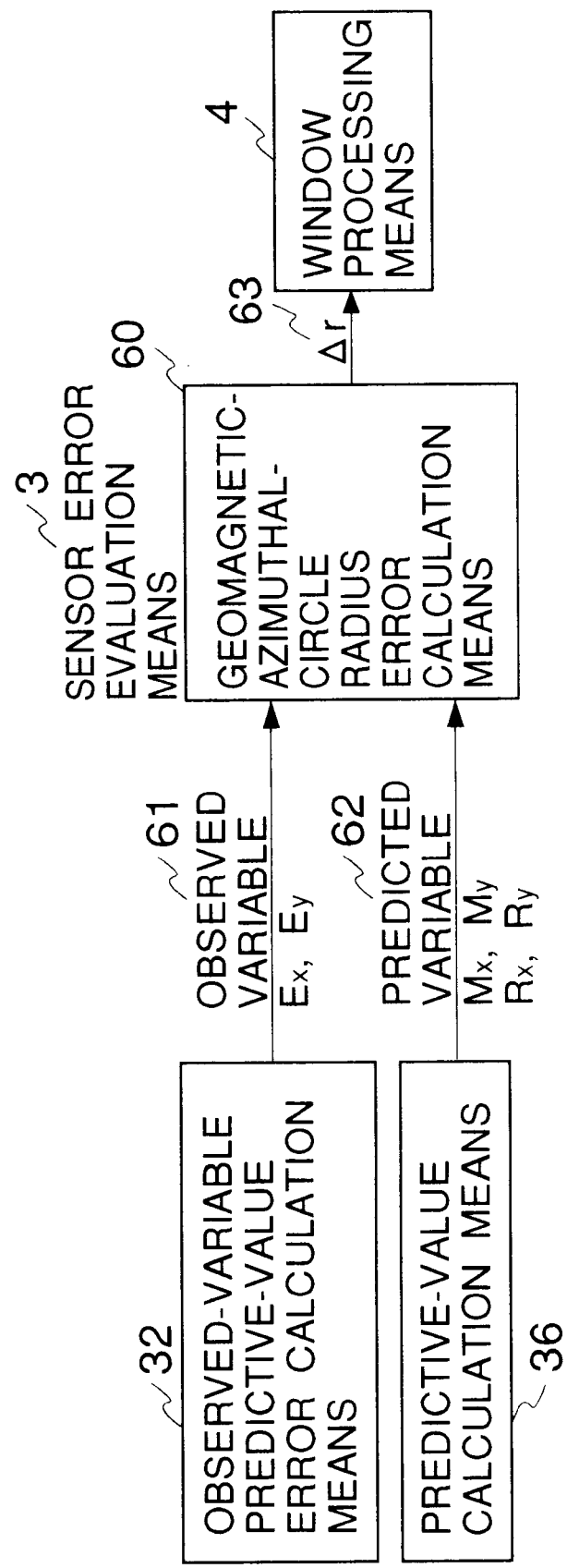
FIG. 26 is a block diagram showing a yet further example of configuration of the sensor error evaluation means included in the construction of FIG. 18.

This embodiment is such that, in Embodiment 6-1 (refer to FIG. 18), the sensor error evaluation means 3 controls the window processing means 4. It comprises the sensor error evaluation means 3 which has input/output relationships as illustrated in FIG. 26. Except for the input/output relationships shown in FIG. 26, the construction of this embodiment is the same as that of Embodiment 6-1.

With the construction of this embodiment, the geomagnetic-azimuthal-circle radius error calculation means 60 shown in FIG. 23 or 25 is applied for eliminating the burst noise of the geomagnetism sensor 134 (shown in FIG. 32), and that data of the geomagnetism sensor 134 which has the calculated error 63 of the predetermined level or above is eliminated by the window processing means 4. Incidentally, either equations shown in FIG. 89 or equations shown in FIG. 90 may be employed for the method of calculating the error 63 of the geomagnetic-azimuthal-circle radius.

According to this embodiment, the burst noise of the geomagnetism sensor 134 or the like can be instantly judged to eliminate the corresponding data by the window processing means 4. It is therefore possible to achieve enhancement in the accuracy of the estimated azimuth.

Embodiment 6-7

Although the sensor error evaluation means 3 in each of Embodiments 6-1 to 6-6 described above can be arranged alone, a plurality of such means 3 may well be arranged in combination. Since the combined arrangement can cope with different kinds of sensor errors, it is expected to enhance the accuracy of the azimuth still more.

Here in Embodiment 6-7, there will be described an example in which the combination of the constituents of the sensor error evaluation means 3 mentioned in the foregoing embodiments is comprised as composite sensor error evaluation means 3.

Figure 33:
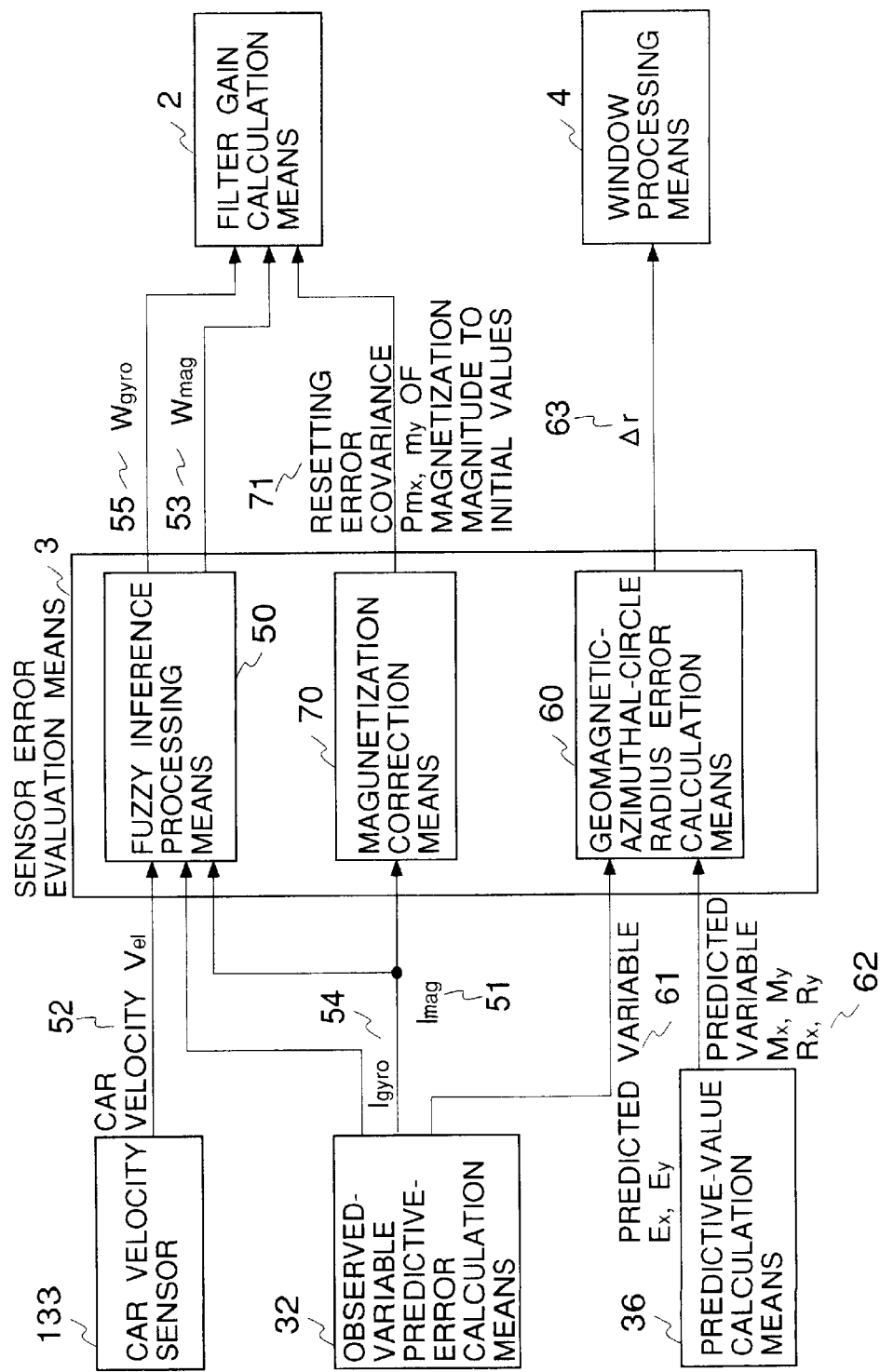
FIG. 33 is a block diagram showing an example of configuration of the sensor error evaluation means included in the construction of FIG. 18.

This embodiment has the same construction as that of Embodiment 6-1 (refer to FIG. 18) except that the composite sensor error evaluation means 3 has input/output relationships as shown in FIG. 33.

In this embodiment, the composite sensor error evaluation means 3 is configured of the fuzzy inference processing means 50, offset-magnetization correction means 70 and geomagnetic-azimuthal-circle error calculation means 60 which have been explained in Embodiments 6-1~6-6.

The inputs of the fuzzy inference processing means 50 consist of the observed-variable predictive error "Imag" 51 of the geomagnetism sensor 134 and the observed-variable predictive error "Igyro" 54 of the gyro sensor 132 as are the outputs of the observed-variable predictive-error calculation means 32, and the output data "Vel" 52 of the car velocity sensor 133. The outputs of the means 50 consist of the covariance "Wgyro" 55 of the observed noise of the gyro sensor 132, and the covariance "Wmag" 53 of the observed noise of the geomagnetism sensor 134. In this case, the values of the inputs 51, 52 and 54 may well be the statistical magnitudes, for example, the average values of the respective data items themselves for a certain time period.

The qualitative relationships of the magnitude of the output 53 to the respective magnitudes of the inputs 51 and 52, and those of the magnitude of the output 55 to the respective magnitudes of the inputs 52 and 54 are respectively expressed with fuzzy theories as in Embodiments 6-1 and 6-2.

The input of offset-magnetization correction means 70 is that predictive error "Imag" 51 of the observed variable of the geomagnetism sensor 134 which is the output of the observed-variable predictive-error calculation means 32. On the other hand, the output of the means 70 to the filter gain calculation means 2 is produced in such a way that, when the offset magnetization magnitude has changed to a large extent, the diagonal term "Pmx, my" 71 of the estimative-error covariance matrix contained in the equations shown in FIGS. 58 to 63 as corresponds to the offset magnetization magnitude is reset to the initial value thereof. Thus, likewise to Embodiment 6-4, this embodiment can instantly detect the large change of the offset magnetization magnitude even when such a change has occurred at a railroad crossing or the like. Further, the estimation process for the offset magnetization magnitude can be properly adjusted by the above method.

The inputs of the geomagnetic-azimuthal-circle radius error calculation means 60 consist of that observed variable 61 (components "Ex" and "Ey") of the geomagnetism sensor 134 as which the input of the observed-variable predictive-error calculation means 32 is directly supplied, and the predictive values 62 (offset magnetization components "Mx" and "My", and car body effect components "Rx" and "Ry") which are contained in the outputs of the predictive-value calculation means 36. On the other hand, the output of the means 60 is the error "Δr" 63 of the geomagnetic-azimuthal-circle radius. Herein, that data of the geomagnetism sensor 134 which has the calculated error 63 at the predetermined level or above is eliminated by the window processing means 4. Since the geomagnetic-azimuthal-circle radius error calculation means 60 and the window processing means 4 are utilized as in Embodiment 6-6, the burst noise of the geomagnetism sensor 134 or the like can be instantly judged to eliminate the corresponding data.

Figure 30:
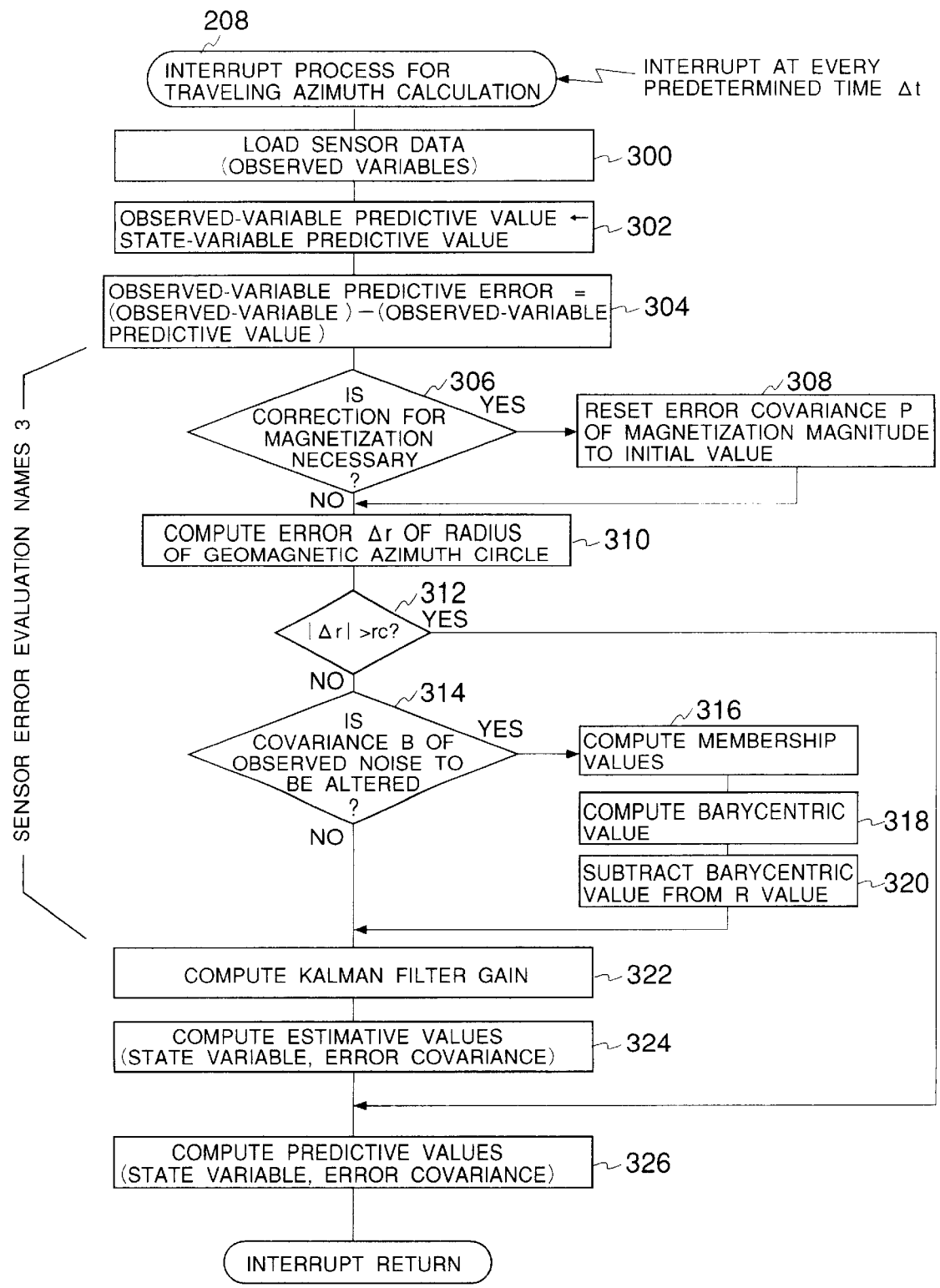
FIG. 30 is a flow chart showing a traveling azimuth calculation interrupt process which is included in the processing flow of FIG. 29.

The processing steps of the composite sensor error evaluation means 3 in this embodiment will be explained in conjunction with a flow chart of FIG. 30.

First, the offset-magnetization correction process explained in Embodiment 6-4 (shown in FIG. 24) is executed using the observed-variable predictive error obtained at the step 304 of the Kalman filter process. More specifically, whether or not the offset-magnetization correction explained before is necessary is judged at the step 306. Only when the judgement is "YES" here, the error covariance "Pmx, my" of the offset magnetization magnitude is reset to its initial value at the step 308. Thereafter, the error 63 of the geomagnetic-azimuthal-circle radius is computed in accordance with equations shown in FIG. 89 or equations shown in FIG. 90 at the step 310 (in the case of implementing the offset-magnetization correction means 70 in Embodiment 6-5, the step 310 may be executed earlier and shifted to the step 306).

Subsequently, using the computed error 63 of the geomagnetic-azimuthal-circle radius, the window process explained in Embodiment 6-6 (shown in FIG. 26) is executed at the step 312. That is, as described before, in the case where the magnitude of the geomagnetic-azimuthal-circle radius error 63 has become the certain level or above, the processing flow jumps to the step 326 by omitting the filter gain computation (step 322) and the estimative value computation (step 324).

Figure 22:
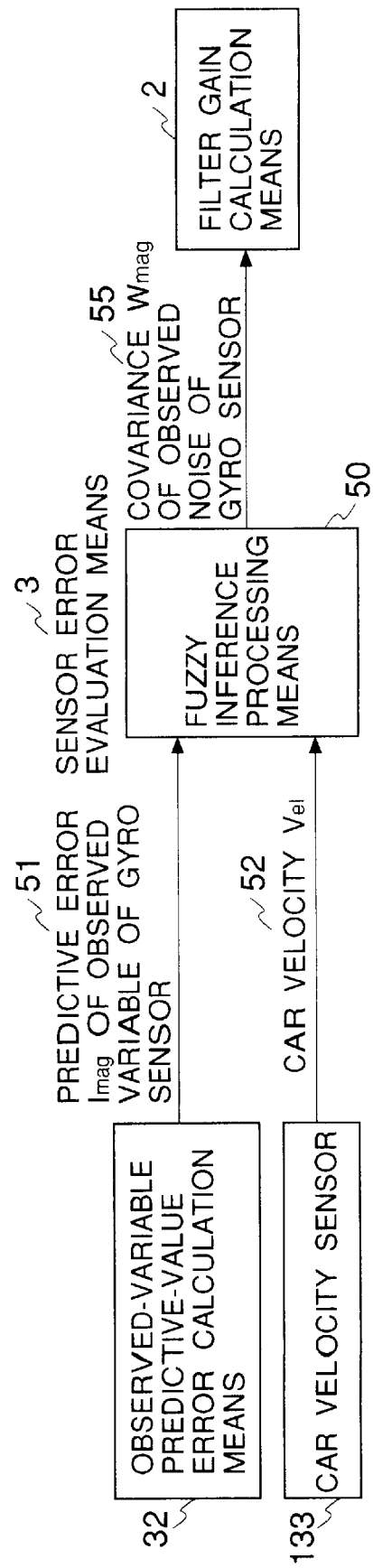
FIG. 22 is a block diagram showing another example of configuration of the sensor error evaluation means included in the construction of FIG. 18.

In the case where the above condition is not met at the step 312, this step is followed by the step 314 so as to control the covariance of the observed noise by the fuzzy inference as explained in Embodiments 6-1 to 6-3 (FIGS. 20, 22 and 23). In the case where the inputs to the fuzzy inference processing means 50 as mentioned before are the statistical magnitudes, the processing flow is shifted to the computation of the membership values (step 316) only when all the input values have become complete. Subsequently, the barycentric value is computed at the step 318, and the computed barycentric value is set as the covariance value of the observed noise at the step 320.

In the case where the covariance of the error of the offset magnetization magnitude (step 308) or the covariance of the observed noise (step 320) has been altered in the above flow of the processing steps, the Kalman filter gain is computed on the basis of the altered value at the step 322. Here, the influences of the sensor errors are taken into consideration, so that the accuracies of the estimations of the azimuth etc. can be enhanced.

Embodiment 6-8

Figure 27:
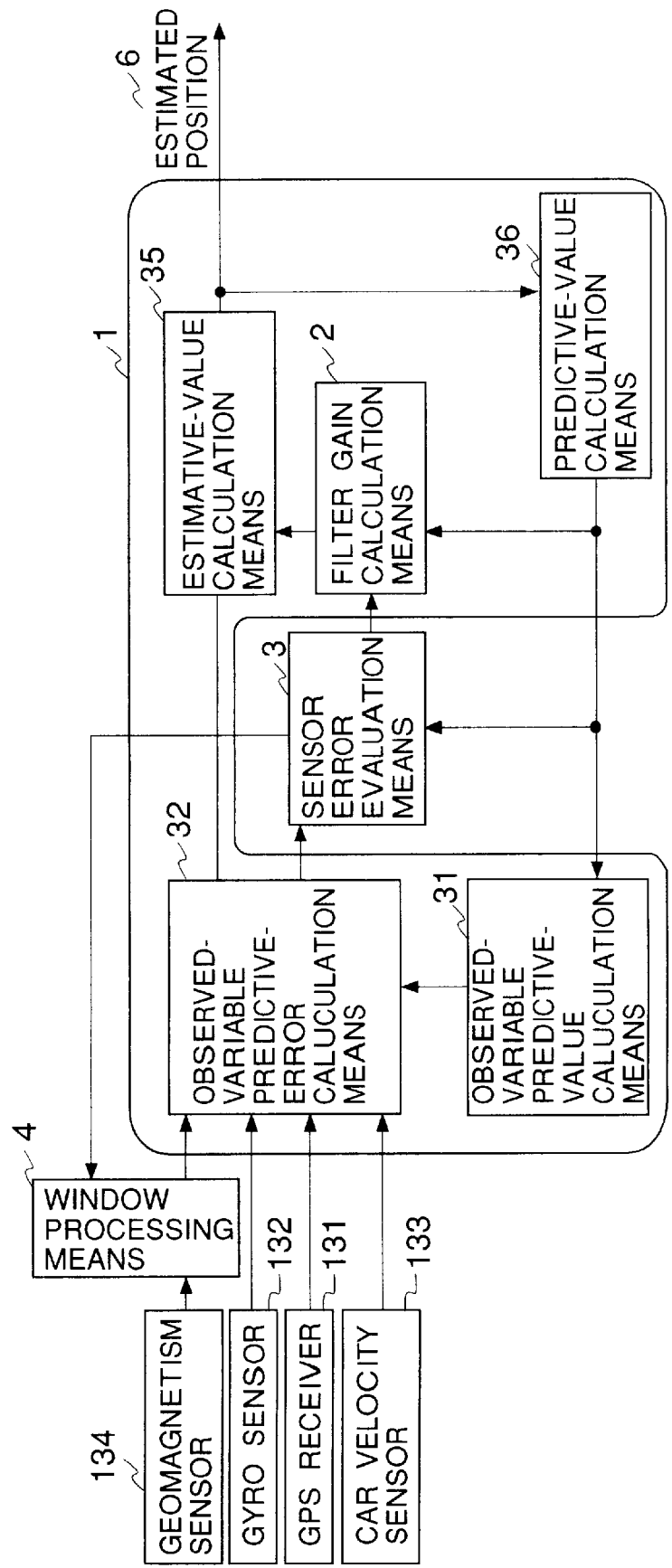
FIG. 27 is a block arrangement diagram showing that construction of one embodiment of the present invention in which a Kalman filter process is applied to the detection of a traveling azimuth based on the architecture depicted in FIG. 16.

As illustrated in FIG. 27, this embodiment comprises a filter processing portion 1, sensor error evaluation means 3, window processing means 4, a geomagnetism sensor 134, a gyro sensor 132, a GPS receiver 131 and a car velocity sensor 133. Here, the GPS receiver 131 is the same as that employed in Embodiment 1, and it can also be used as the sensor for measuring an absolute position, an absolute azimuth or a range.

This embodiment has the featuring architecture shown in FIG. 16, and it obtains the estimated position of the mobile object by the Kalman filter process which is performed with the output data of all the sensors including the car velocity data of the car velocity sensor 133.

In this embodiment shown in FIG. 27, the filter processing portion 1 estimates the position 6 of the mobile object by accepting, not only the data on the azimuth, but also the data on the position and the velocity.

Concretely, the estimation of the position is done besides the estimation of the azimuth explained in Embodiments 6-1 to 6-7, in such a way that a sensor output model and a sensor error model concerning the position of the mobile object, and a model for the motion of the mobile object are set likewise to those of the azimuth estimating method, and that a state equation and an observational equation are formed using the models.

Regarding the estimation of the position, it is possible to use, for example, the automobile motion model, GPS error model, GPS range model, car-velocity-sensor error model and car-velocity-sensor output model which have been defined in Embodiment 1, or the position detecting Kalman filter 67 (refer to FIG. 8) which has been defined in Embodiment 2.

Embodiment 6-9

This embodiment concerns the prior-art example disclosed in the official gazette of Japanese Patent Application Laid-open No. 219610/1989, and indicates that the fifth issue pertaining to the prior art can be improved merely by additionally supplying car velocity information to magnetic-field-environment detection means in the prior-art example as corresponds to sensor error evaluation means in the present invention.

Figure 28:
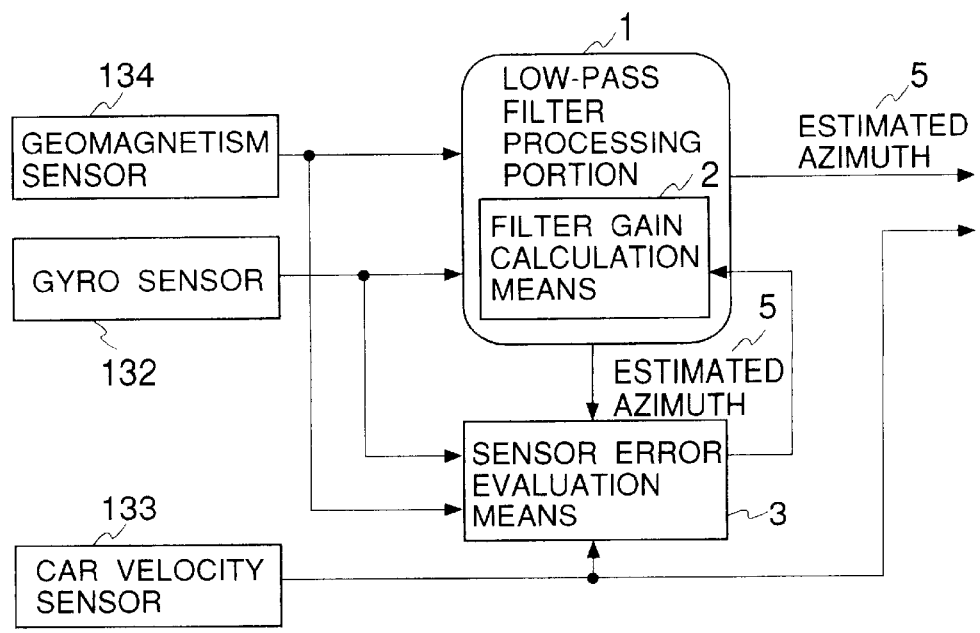
FIG. 28 is a block arrangement diagram showing the construction of one embodiment in which the present invention is applied to the low-pass filter method of a prior-art example, whereby the effect of car velocity data is added.

As illustrated in FIG. 28, this embodiment comprises a geomagnetism sensor 134, a gyro sensor 132, a car velocity sensor 133, a low-pass filter processing portion 80 which calculates an estimated azimuth 5 by accepting outputs from the geomagnetism sensor 134 and gyro sensor 132, and the sensor error evaluation means 3 for evaluating the errors of the geomagnetism sensor 134 and gyro sensor 132.

The low-pass filter processing portion 80 includes filter gain calculation means 2 for calculating a filter gain in accordance with the output of the sensor error evaluation means 3.

In operation, the low-pass filter processing portion 80 executes a filter process which is similar to the filter process in the prior-art example. More specifically, the filter process of the low-pass filter processing portion 80 is such that, while the detected result of the gyro sensor 132 is more heavily weighted for a short term, the weight is gradually shifted to the detected result of the geomagnetism sensor 134 for a long term.

Here, the rate or velocity of convergence on the detected result (geomagnetic azimuth) of the geomagnetism sensor 134 corresponds to the value of the filter gain of the low-pass filter processing portion 80.

In the prior-art example, the magnetic-field environment of the mobile object is detected from only the difference between the magnitudes of an azimuthal change having been respectively obtained from the data of the geomagnetism sensor 134 and gyro sensor 132, and the filter gain of the low-pass filter processing portion 80 is calculated in accordance with the detected result.

In contrast, in this embodiment, the sensor error evaluation means 3 is so constructed that the car velocity data from the car velocity sensor 133 is accepted, and that the filter gain to be calculated by the filter gain calculation means 2 is relatively enlarged in a case where the velocity of the car is judged from the accepted car velocity data to be high.

According to this embodiment, as the traveling velocity of the mobile object becomes higher, the convergence on the geomagnetic azimuth in the low-pass filter processing portion 80 is made quicker. It is therefore possible to obtain a traveling azimuth of higher accuracy in correspondence with the higher velocity and longer traveling distance of the mobile object.

According to each of the navigation systems of Embodiments 6-1 thru 6-8 to which the fifth expedient of the present invention is applied, the Kalman filter process in which the error characteristics of the sensor are modeled is adopted for calculating the predetermined estimative value, and the sensor error is evaluated using the sensor error parameters obtained during the filter process. It is therefore possible to evaluate the error more promptly and more accurately. Further, since the Kalman filter gain is altered using the result of the evaluation, the appropriate filter gain can be calculated in real time, and it is possible to obtain the estimative value of, e. g., positional information at a higher accuracy.

Moreover, in Embodiments 6-1 thru 6-9 to which the fifth expedient of the present invention is applied, the filter gain for the calculation of the estimative value is determined considering also the moving velocity of the mobile object. It is therefore possible to cope reasonably well with the nature of processing peculiar to the navigation system, namely that the traveling position of the mobile object must be calculated on occasion with the increase of the traveling distance, which is the quantity obtained by integrating the velocity of the mobile object.

What is claimed is:

1. A navigation system comprising at least a GPS sensor, turning angular velocity measurement means and azimuth measurement means for measuring a traveling azimuth of a mobile object, wherein said azimuth measurement means calculate the traveling azimuth from one of a vector velocity and a plurality of positions measured by the GPS sensor, the navigation system further comprising:

turning angular velocity error estimation means for estimating an error of the turning angular velocity measurement means by using output from the turning angular velocity measurement means and the azimuth measurement means; and traveling azimuth calculation means for correcting a measured value of the turning angular velocity measurement means by using output of the turning angular velocity error estimation means, and calculating the traveling azimuth of the mobile object from the corrected measured value and the output from the azimuth measurement means, wherein the turning angular velocity error estimation means includes a Kalman filter wherein at least one of state variables to-be-estimated is an error parameter included in a predetermined model equation for simulating output of the turning angular velocity measurement means.

2. The navigation system of claim 1 further comprising:

azimuth error estimation means for estimating an error of the azimuth measurement means by using the output from the turning angular velocity measurement means and the azimuth measurement means, the traveling azimuth calculation means correcting a measured value of the azimuth measurement means by using output of the azimuth error estimation means, besides correcting the measured value of the turning angular velocity measurement means by using the output of the turning angular velocity error estimation means, and calculating the traveling azimuth of the mobile object from corrected measured values, wherein the azimuth error estimation means includes a Kalman filter wherein at least one of state variables to-be-estimated is an error parameter included in a predetermined model equation for simulating output of the azimuth measurement means.

3. The navigation system of claim 2 wherein the traveling azimuth calculation means includes a Kalman filter using at least the traveling azimuth of the mobile object as a state variable to-be-estimated.

4. The navigation system of claim 3 wherein the mobile object includes a magnetic material in at least one of a plurality of constituent members, the azimuth measurement means includes a geomagnetism sensor attached to a predetermined position of the mobile object for measuring a geomagnetic field, and the azimuth error estimation means estimates a magnitude of at least one of a magnetization effect and a (Mu) effect, each being an error parameter included in a predetermined model equation for simulating output of the geomagnetism sensor.

5. The navigation system of claim 2 further comprising:

velocity measurement means for measuring a velocity of the mobile object; and first position calculation means for calculating a current position of the mobile object from the output of the velocity measurement means, and the traveling azimuth obtained by the traveling azimuth calculation means.

6. A navigation system for providing a current position and a traveling azimuth of a mobile object, comprising:

a directional antenna for receiving a radio wave signal from a transmitting station; and antenna attitude control means for controlling an attitude of the antenna so as to cancel any change in a relative positional relationship between the transmitting station and the antenna arising from movement of the mobile object, in accordance with the position and traveling azimuth of the mobile object, so that the antenna can always receive the radio wave signal in spite of the movement of the mobile object, wherein the current position and traveling azimuth of the mobile object are obtained by a system of claim 1.

7. A navigation system comprising at least a GPS sensor, turning angular velocity measurement means and azimuth measurement means for measuring a traveling azimuth of a mobile object, wherein said azimuth measurement means calculate the traveling azimuth from one of a vector velocity and a plurality of positions measured by the GPS sensor, the navigation system further comprising:

turning angular velocity error estimation means for estimating an error of the turning angular velocity measurement means by using output from the turning angular velocity measurement means and the azimuth measurement means;

wherein the turning angular velocity error estimation means includes a Kalman filter wherein at least one of state variables to-be-estimated is an error parameter included in a predetermined model equation for simulating output of the azimuth measurement means;

azimuth error estimation means for estimating an error of the azimuth measurement means by using the output from the turning angular velocity measurement means and the azimuth measurement means, the traveling azimuth calculation means correcting a measured value of the azimuth measurement means by using output of the azimuth error estimation means, besides correcting the measured value of the turning angular velocity measurement means by using the output of the turning angular velocity error estimation means, and calculating the traveling azimuth of the mobile object from corrected measured values, wherein the azimuth error estimation means includes a Kalman filter wherein at least one of state variables to-be-estimated is an error parameter included in a predetermined model equation for simulating output of the azimuth measurement means;

velocity measurement means for measuring a velocity of the mobile object;

first position calculation means for calculating a current position of the mobile object from the output of the velocity measurement means, and a traveling azimuth obtained by a traveling azimuth calculation means;

range measurement means for receiving a radio wave signal containing predetermined information sent from a transmitting station, and measuring at least one of a distance from the transmitting station to the mobile object and a change rate of the distance;

second position calculation means for calculating the current position of the mobile object by using output from the range measurement means, the traveling azimuth calculation means and the velocity measurement means;

signal changeover means for receiving the output of the traveling azimuth calculation means and the velocity measurement means, delivering both output to the first position calculation means on condition that the radio wave signal cannot be received, and delivering both output to the second position calculation means on condition that the radio wave signal can be received, wherein the second position calculation means includes an error estimation portion for estimating an error of at least one of the range measurement means and the velocity measurement means.

8. The navigation system of claim 7 wherein the second position calculation means includes a Kalman filter wherein at least one of state variables to-be-estimated is an error parameter included in a predetermined model equation for simulating output of the azimuth measurement means.

9. A navigation system for providing a current position and a traveling azimuth of a mobile object, comprising:

a directional antenna for receiving a radio wave signal from a transmitting station; and antenna attitude control means for controlling an attitude of the antenna so as to cancel any change in a relative positional relationship between the transmitting station and the antenna arising from movement of the mobile object, in accordance with the position and traveling azimuth of the mobile object, so that the antenna can always receive the radio wave signal in spite of the movement of the mobile object, wherein the current position and traveling azimuth of the mobile object are obtained by a system of claim 7.

* * * * *